(12) United States Patent
Siminoff

(10) Patent No.: US 12,063,458 B1
(45) Date of Patent: Aug. 13, 2024

(54) SYNCHRONIZING SECURITY SYSTEMS IN A GEOGRAPHIC NETWORK

(71) Applicant: Amazon Technologies, Inc., Seattle, WA (US)

(72) Inventor: James Siminoff, Pacific Palisades, CA (US)

(73) Assignee: Amazon Technologies, Inc., Seattle, WA (US)

( * ) Notice: Subject to any disclaimer, the term of this patent is extended or adjusted under 35 U.S.C. 154(b) by 97 days.

(21) Appl. No.: 16/259,798

(22) Filed: Jan. 28, 2019

Related U.S. Application Data

(60) Provisional application No. 62/632,557, filed on Feb. 20, 2018.

(51) Int. Cl.
| | |
|---|---|
| *H04N 7/18* | (2006.01) |
| *G08B 5/22* | (2006.01) |
| *G08B 21/18* | (2006.01) |
| *H04N 5/247* | (2006.01) |
| *H04N 23/90* | (2023.01) |

(52) U.S. Cl.
CPC ............. *H04N 7/188* (2013.01); *G08B 5/223* (2013.01); *G08B 21/182* (2013.01); *H04N 7/181* (2013.01); *H04N 23/90* (2023.01)

(58) Field of Classification Search
CPC ........ H04N 7/188; H04N 7/181; H04N 5/247; H04N 23/90; G08B 5/223; G08B 21/182
See application file for complete search history.

(56) References Cited

U.S. PATENT DOCUMENTS

| | | | |
|---|---|---|---|
| 7,193,644 B2 | 3/2007 | Carter | |
| 8,139,098 B2 | 3/2012 | Carter | |
| 8,144,183 B2 | 3/2012 | Carter | |
| 8,154,581 B2 | 4/2012 | Carter | |
| 8,312,660 B1 * | 11/2012 | Fujisaki | .................. F41A 17/08 455/457 |
| 8,780,201 B1 | 7/2014 | Scalisi et al. | |
| 8,823,795 B1 | 9/2014 | Scalisi et al. | |
| 8,842,180 B1 | 9/2014 | Kasmir et al. | |
| 8,872,915 B1 | 10/2014 | Scalisi et al. | |
| 8,937,659 B1 | 1/2015 | Scalisi et al. | |
| 8,941,736 B1 | 1/2015 | Scalisi | |
| 8,947,530 B1 | 2/2015 | Scalisi | |
| 8,953,040 B1 | 2/2015 | Scalisi et al. | |
| 9,013,575 B2 | 4/2015 | Scalisi | |
| 9,049,352 B2 | 6/2015 | Scalisi et al. | |

(Continued)

*Primary Examiner* — Dramos Kalapodas
(74) *Attorney, Agent, or Firm* — Lee & Hayes, P.C.

(57) ABSTRACT

The application is directed to techniques and processes for integrating multiple security systems. For instance, a system may receive first data from a first security system, where the first data indicates that the first security system detected a security event. The system may then analyze the first data to determine a type of the security event, a time frame of the security event, and/or a threat level of the security event. Based at least in part on the analyzing, the system may determine a security procedure for a second security system. The second security system may be located proximate to the first security system and/or may be included in a same security system network as the first security system. The security procedure may include changing a mode of the second security system and/or causing an electronic device of the second security system to generate image data.

28 Claims, 24 Drawing Sheets

(56) References Cited

U.S. PATENT DOCUMENTS

| | | |
|---|---|---|
| 9,053,622 B2 | 6/2015 | Scalisi |
| 9,058,738 B1 | 6/2015 | Scalisi |
| 9,060,103 B2 | 6/2015 | Scalisi |
| 9,060,104 B2 | 6/2015 | Scalisi |
| 9,065,987 B2 | 6/2015 | Kasmir et al. |
| 9,094,584 B2 | 7/2015 | Scalisi et al. |
| 9,113,051 B1 | 8/2015 | Scalisi |
| 9,113,052 B1 | 8/2015 | Scalisi et al. |
| 9,118,819 B1 | 8/2015 | Scalisi et al. |
| 9,142,214 B2 | 9/2015 | Scalisi |
| 9,160,987 B1 | 10/2015 | Kasmir et al. |
| 9,165,444 B2 | 10/2015 | Scalisi |
| 9,172,920 B1 | 10/2015 | Kasmir et al. |
| 9,172,921 B1 | 10/2015 | Scalisi et al. |
| 9,172,922 B1 | 10/2015 | Kasmir et al. |
| 9,179,107 B1 | 11/2015 | Scalisi et al. |
| 9,179,108 B1 | 11/2015 | Scalisi et al. |
| 9,179,109 B1 | 11/2015 | Kasmir et al. |
| 9,196,133 B2 | 11/2015 | Scalisi et al. |
| 9,197,867 B1 | 11/2015 | Scalisi et al. |
| 9,230,424 B1 | 1/2016 | Scalisi et al. |
| 9,237,318 B2 | 1/2016 | Kasmir et al. |
| 9,247,219 B2 | 1/2016 | Kasmir et al. |
| 9,253,455 B1 | 2/2016 | Harrison et al. |
| 9,342,936 B2 | 5/2016 | Scalisi |
| 9,508,239 B1 | 11/2016 | Harrison et al. |
| 9,736,284 B2 | 8/2017 | Scalisi et al. |
| 9,743,049 B2 | 8/2017 | Scalisi et al. |
| 9,769,435 B2 | 9/2017 | Scalisi et al. |
| 9,786,133 B2 | 10/2017 | Harrison et al. |
| 9,799,183 B2 | 10/2017 | Harrison et al. |
| 10,394,210 B2 * | 8/2019 | Cella ..................... G06F 3/0488 |
| 2006/0092011 A1 * | 5/2006 | Simon ................ G08B 13/19682 |
| | | 340/521 |
| 2007/0064109 A1 * | 3/2007 | Renkis ............ G08B 13/19615 |
| | | 348/E7.088 |
| 2008/0055423 A1 * | 3/2008 | Ying ................ G08B 13/19684 |
| | | 348/211.99 |
| 2008/0100704 A1 * | 5/2008 | Venetianer .......... G06F 16/7854 |
| | | 348/143 |
| 2011/0141276 A1 * | 6/2011 | Borghei ................ H04W 12/08 |
| | | 348/143 |
| 2014/0266681 A1 * | 9/2014 | Dunn .................... G08B 26/00 |
| | | 340/517 |
| 2015/0049189 A1 * | 2/2015 | Yau .................. G08B 13/19697 |
| | | 348/143 |
| 2015/0381946 A1 * | 12/2015 | Renkis ............ G08B 13/19663 |
| | | 348/47 |
| 2016/0099963 A1 * | 4/2016 | Mahaffey .............. H04L 63/166 |
| | | 726/25 |
| 2016/0343237 A1 * | 11/2016 | Herman ................ H04W 4/021 |
| 2017/0134895 A1 * | 5/2017 | Rabb ...................... G08B 29/24 |
| 2017/0300758 A1 * | 10/2017 | Renkis ............ G08B 13/19656 |
| 2017/0337790 A1 * | 11/2017 | Gordon-Carroll ...... H04L 67/12 |
| 2017/0337805 A1 * | 11/2017 | Eyring .............. G08B 13/1968 |
| 2017/0372059 A1 * | 12/2017 | Sindia .................... H04L 63/08 |
| 2018/0025620 A1 * | 1/2018 | Weksler ................. G08B 31/00 |
| | | 340/541 |
| 2018/0176512 A1 * | 6/2018 | Siminoff ................ H04N 7/188 |
| 2018/0233010 A1 * | 8/2018 | Modestine ........ G08B 13/19671 |
| 2019/0213266 A1 * | 7/2019 | Sathya ................ G06F 16/9537 |

* cited by examiner

SYNCHRONIZING SECURITY SYSTEMS IN A GEOGRAPHIC NETWORK

RELATED APPLICATIONS

This application claims priority to U.S. Provisional Patent Application No. 62/632,557, filed Feb. 20, 2018, titled "NEIGHBORHOOD ALARM," the entire contents of which are incorporated herein by reference.

BACKGROUND

Home safety is a concern for many homeowners and renters. Those seeking to protect or monitor their homes often wish to be informed of breaches to the security of their homes and also have video and audio communications with visitors/trespassers, for example, those visiting/trespassing near an external door or entryway. Security systems that include sensors, automation devices, and/or A/V recording and communication devices, such as doorbells, provide this functionality, and can also aid in crime detection and prevention. For example, sensor information, audio, and/or video captured by a security system, such as by an A/V recording and communication doorbell of a security system, can be uploaded to the cloud and recorded on a remote server. Subsequent review of the sensor information and/or the A/V footage can aid law enforcement in capturing perpetrators of home burglaries and other crimes. Further, the presence of a security system including one or more an A/V recording and communication devices on the exterior of a home, such as a doorbell unit at the entrance of a home, acts as a powerful deterrent against would-be burglars.

BRIEF DESCRIPTION OF THE DRAWINGS

The various embodiments of synchronizing security systems in a geographic network now will be discussed in detail with an emphasis on highlighting the advantageous features. These embodiments depict the novel and non-obvious synchronizing security systems in a geographic network, as shown in the accompanying drawings, which are for illustrative purposes only. These drawings include the following figures, in which like numerals indicate like parts.

DETAILED DESCRIPTION

Figure 1:
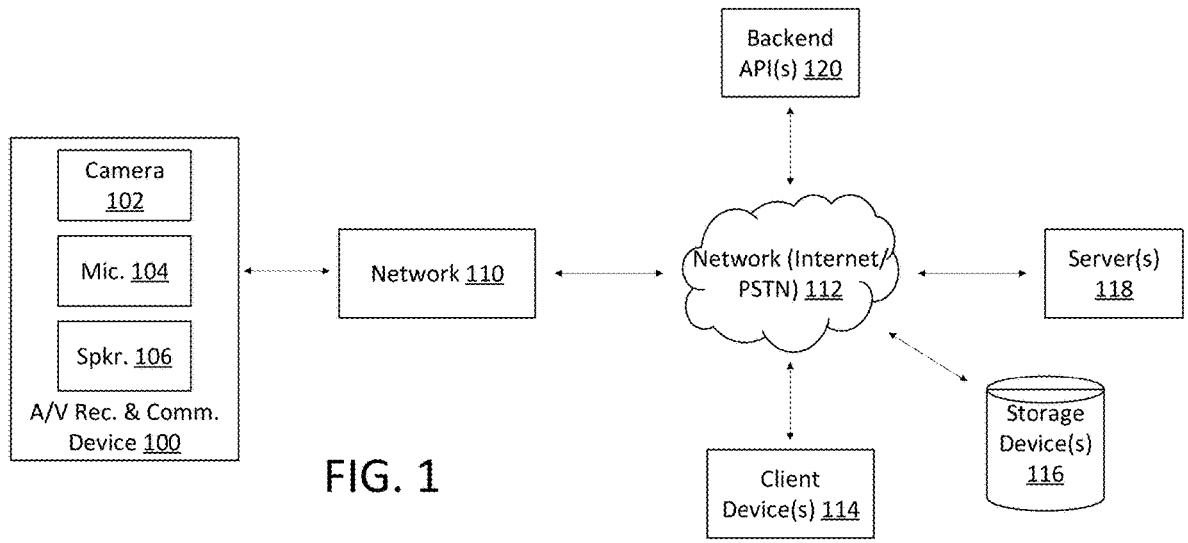
FIG. 1 is a functional block diagram illustrating one embodiment of a system including an A/V recording and communication device according to various aspects of the present disclosure.

The various embodiments of the present synchronizing security systems in a geographic network have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

The present embodiments improve the functionality of security systems in several ways to keep neighborhoods safe and assist law enforcement in fighting crime. The present embodiments also bring together neighborhood residents against a common enemy: crime, thereby reducing crime and fostering a greater sense of community in neighborhoods.

One aspect of the present embodiments includes the realization that, historically, security systems have been designed and intended to protect only the property at which the security systems are installed. A typical security system is self-contained, and provides a warning to the property owner only when an intrusion is detected at that same property, and only when the security system is armed. However, potential threats to the property may occur before an intruder crosses the property boundary where the security system is installed, such as when a security event (e.g., an intrusion) occurs at a nearby property.

The present embodiments solve this problem by leveraging the functionality of security systems to link together security systems at multiple properties, where each property is protected by a security system and/or an A/V recording and communication device. When a security event (e.g., an intrusion) is detected by a security system and/or an A/V recording and communication device at one of the properties in the network of properties, warnings/alerts may be provided to users associated with the other properties in the network that include security systems. Such warnings/alerts may provide the users with opportunity to take corrective action, such as by arming their own alarm systems, before the potential threat at the nearby property becomes an actual threat at that user's property. As a result, the safety of that user's property is increased, as well as the safety of the other properties in the network, thereby contributing to public safety.

Another aspect of the present embodiments includes the realization that, because, historically, security systems are self-contained, they are not equipped with built-in intelligence to analyze and notify other security systems installed at other properties (e.g., public or private) in the network based on the proximity of the property under threat to other properties in the neighborhood, the time frame, type, and/or level of threats detected. Unfiltered/unprocessed information, if sent to nearby neighbors, would not only be ineffective in terms of providing warnings to potential threats, but could also become a source of annoyance to the neighbors. For example, if the property owners in a neighborhood receive a notification every time a security event occurs in the neighborhood, especially the ones that are not of their interest or concern, they may be annoyed by these notifications, and eventually stop reading or turn off the notifications (a phenomenon known as alert fatigue).

The present embodiments solve this problem by leveraging the functionality of a network device, linked to security systems at multiple properties, to analyze the location/proximity, time frame, type, and/or threat level of detected security events, and determine a security event procedure for one or more property owners nearby, who would benefit from the security event procedure to better protect their own properties.

Another aspect of the present embodiments includes the realization that, while security cameras provide strong crime deterrence, the video footage that they record is typically only accessible to the party that deployed the cameras. Making the video footage recorded by security cameras accessible to any member of the public would improve the functionality of such cameras by expanding the audience for such video footage, thereby increasing the likelihood that perpetrators of crimes caught on video might be recognized by one or more persons viewing the video footage, which may thereby assist law enforcement in identifying and apprehending such perpetrators.

Another aspect of the present embodiments includes the realization that some neighborhoods are not adequately patrolled by law enforcement and/or private security. One or more security cameras deployed in such neighborhoods could function as a surveillance and early warning system, thereby supplementing and/or serving as a substitute for local police and/or private security.

A further aspect of the present embodiments includes the realization that a typical security system can only provide data (e.g., sensor data, motion data, audio data, video data, etc.) of a security event (e.g., an intrusion) that occurs at the property where the security system is located/installed. After the intruder has burglarized and left the property, however, the security system at the property by itself is incapable of tracking where the intruder has gone, which increases the difficulty of apprehending the perpetrator.

The present embodiments solve this problem by leveraging the functionality of security systems to link together home/private security systems installed on private properties with public security systems installed on public properties, where each public property is protected by a security system and/or an A/V recording and communication device (e.g., a publicly-accessible security camera device). Each of the publicly-accessible security camera devices is configured to provide access to video footage to any requesting member of the public using a public access identifier. When a security event (e.g., an intrusion) is detected by a home/private security system and/or an A/V recording and communication device at one of the private properties in the network of properties, the public security systems installed on public properties may receive notifications to arm (e.g., start recording audio and video) the publicly-accessible security camera devices, and/or generate an alert when a person of interest (e.g., a fleeing suspect) associated with the security event is detected by one of the publicly-accessible security camera devices. In some embodiments, these devices may detect a fleeing suspect using, for example, automatic identification and data capture (AIDC). The publicly-accessible security camera devices further enable members of the public to access the video footage (and/or sensor data, image data, motion data, etc.) recorded by them. Further embodiments may enable the public to gain access to live video streams and/or video history, or to receive alerts from these publicly-accessible security camera devices. Also, making the video footage accessible to any member of the public improves the functionality of such cameras by expanding the audience for such video footage, thereby increasing the likelihood that perpetrators of crimes caught on video might be recognized by one or more persons viewing the video footage, which may also assist law enforcement in identifying and apprehending such perpetrators.

The following detailed description describes the present embodiments with reference to the drawings. In the drawings, reference numbers label elements of the present embodiments. These reference numbers are reproduced below in connection with the discussion of the corresponding drawing features.

In some embodiments, this disclosure may include the language, for example, "at least one of [element A] and

[element B]." This language may refer to one or more of the elements. For example, "at least one of A and B" may refer to "A," "B," or "A and B." In other words, "at least one of A and B" may refer to "at least one of A and at least one of B," or "at least one of either A or B." In some embodiments, this disclosure may include the language, for example, "[element A], [element B], and/or [element C]." This language may refer to either of the elements or any combination thereof. In other words, "A, B, and/or C" may refer to "A," "B," "C," "A and B," "A and C," "B and C," or "A, B, and C."

With reference to FIG. 1, the present embodiments may include an audio/video (A/V) recording and communication device 100. The A/V recording and communication device 100 may in some embodiments comprise a doorbell, and may be located near the entrance to a structure (not shown), such as a dwelling, a business, a storage facility, etc. The A/V recording and communication device 100 may include a camera 102, a microphone 104, and a speaker 106. The camera 102 may comprise, for example, a high definition (HD) video camera, such as one capable of capturing video images at an image display resolution of 720p, or 1080p, or better. While not shown, the A/V recording and communication device 100 may also include other hardware and/or components, such as a housing, one or more motion sensors (and/or other types of sensors), a button, etc. The A/V recording and communication device 100 may further include similar componentry and/or functionality as the wireless communication doorbells described in US Patent Application Publication Nos. 2015/0022620 (application Ser. No. 14/499,828) and 2015/0022618 (application Ser. No. 14/334,922), both of which are incorporated herein by reference in their entireties as if fully set forth.

With further reference to FIG. 1, the A/V recording and communication device 100 communicates with a user's network 110, which may be for example a wired and/or wireless network. If the user's network 110 is wireless, or includes a wireless component, the network 110 may be a Wi-Fi network compatible with the IEEE 802.11 standard and/or other wireless communication standard(s). The user's network 110 is connected to another network 112, which may comprise, for example, the Internet and/or a public switched telephone network (PSTN). As described below, the A/V recording and communication device 100 may communicate with a user's client device 114 via the user's network 110 and the network 112 (Internet/PSTN). The user's client device 114 may comprise, for example, a mobile telephone (may also be referred to as a cellular telephone), such as a smartphone, a personal digital assistant (PDA), or another communication device. The user's client device 114 comprises a display (not shown) and related components capable of displaying streaming and/or recorded video images. The user's client device 114 may also comprise a speaker and related components capable of broadcasting streaming and/or recorded audio, and may also comprise a microphone. The A/V recording and communication device 100 may also communicate with one or more remote storage device(s) 116 (may be referred to interchangeably as "cloud storage device(s)"), one or more servers 118, and/or a backend API (application programming interface) 120 via the user's network 110 and the network 112 (Internet/PSTN). While FIG. 1 illustrates the storage device 116, the server 118, and the backend API 120 as components separate from the network 112, it is to be understood that the storage device 116, the server 118, and/or the backend API 120 may be considered to be components of the network 112.

The network 112 may be any wireless network or any wired network, or a combination thereof, configured to operatively couple the above-mentioned modules, devices, and systems as shown in FIG. 1. For example, the network 112 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VOLTE, LoRaWAN, LPWAN, RPMA, LTE Cat-"X" (e.g., LTE Cat 1, LTE Cat 0, LTE CatMI, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, Global Navigation Satellite System (GNSS) (e.g., the Global Positioning System (GPS)), CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-1394 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or DigiR networking.

According to one or more aspects of the present embodiments, when a person (may be referred to interchangeably as "visitor") arrives at the A/V recording and communication device 100, the A/V recording and communication device 100 detects the visitor's presence and begins capturing video images within a field of view of the camera 102. The A/V recording and communication device 100 may also capture audio through the microphone 104. The A/V recording and communication device 100 may detect the visitor's presence by detecting motion using the camera 102 and/or a motion sensor, and/or by detecting that the visitor has depressed the front button on the A/V recording and communication device 100 (in embodiments in which the A/V recording and communication device 100 comprises a doorbell).

In response to the detection of the visitor, the A/V recording and communication device 100 sends an alert to the user's client device 114 (FIG. 1) via the user's network 110 and the network 112. The A/V recording and communication device 100 also sends streaming video, and may also send streaming audio, to the user's client device 114. If the user answers the alert, two-way audio communication may then occur between the visitor and the user through the A/V recording and communication device 100 and the user's client device 114. The user may view the visitor throughout the duration of the call, but the visitor cannot see the user (unless the A/V recording and communication device 100 includes a display, which it may in some embodiments).

The video images captured by the camera 102 of the A/V recording and communication device 100 (and the audio captured by the microphone 104) may be uploaded to the cloud and recorded on the remote storage device 116 (FIG. 1). In some embodiments, the video and/or audio may be recorded on the remote storage device 116 even if the user chooses to ignore the alert sent to his or her client device 114.

With further reference to FIG. 1, the system may further comprise a backend API 120 including one or more components. A backend API (application programming interface) may comprise, for example, a server (e.g., a real server, or a virtual machine, or a machine running in a cloud infrastructure as a service), or multiple servers networked together, exposing at least one API to client(s) accessing it. These servers may include components such as application servers (e.g., software servers), depending upon what other components are included, such as a caching layer, or database layers, or other components. A backend API may, for example, comprise many such applications, each of which communicate with one another using their public APIs. In some embodiments, the API backend may hold the bulk of the user data and offer the user management capabilities, leaving the clients to have very limited state.

The backend API 120 illustrated FIG. 1 may include one or more APIs. An API is a set of routines, protocols, and tools for building software and applications. An API expresses a software component in terms of its operations, inputs, outputs, and underlying types, defining functionalities that are independent of their respective implementations, which allows definitions and implementations to vary without compromising the interface. Advantageously, an API may provide a programmer with access to an application's functionality without the programmer needing to modify the application itself, or even understand how the application works. An API may be for a web-based system, an operating system, or a database system, and it provides facilities to develop applications for that system using a given programming language. In addition to accessing databases or computer hardware like hard disk drives or video cards, an API can ease the work of programming GUI components. For example, an API can facilitate integration of new features into existing applications (a so-called "plug-in API"). An API can also assist otherwise distinct applications with sharing data, which can help to integrate and enhance the functionalities of the applications.

The backend API 120 illustrated in FIG. 1 may further include one or more services (also referred to as network services). A network service is an application that provides data storage, manipulation, presentation, communication, and/or other capability. Network services are often implemented using a client-server architecture based on application-layer network protocols. Each service may be provided by a server component running on one or more computers (such as a dedicated server computer offering multiple services) and accessed via a network by client components running on other devices. However, the client and server components can both be run on the same machine. Clients and servers may have a user interface, and sometimes other hardware associated with them.

Figure 2:
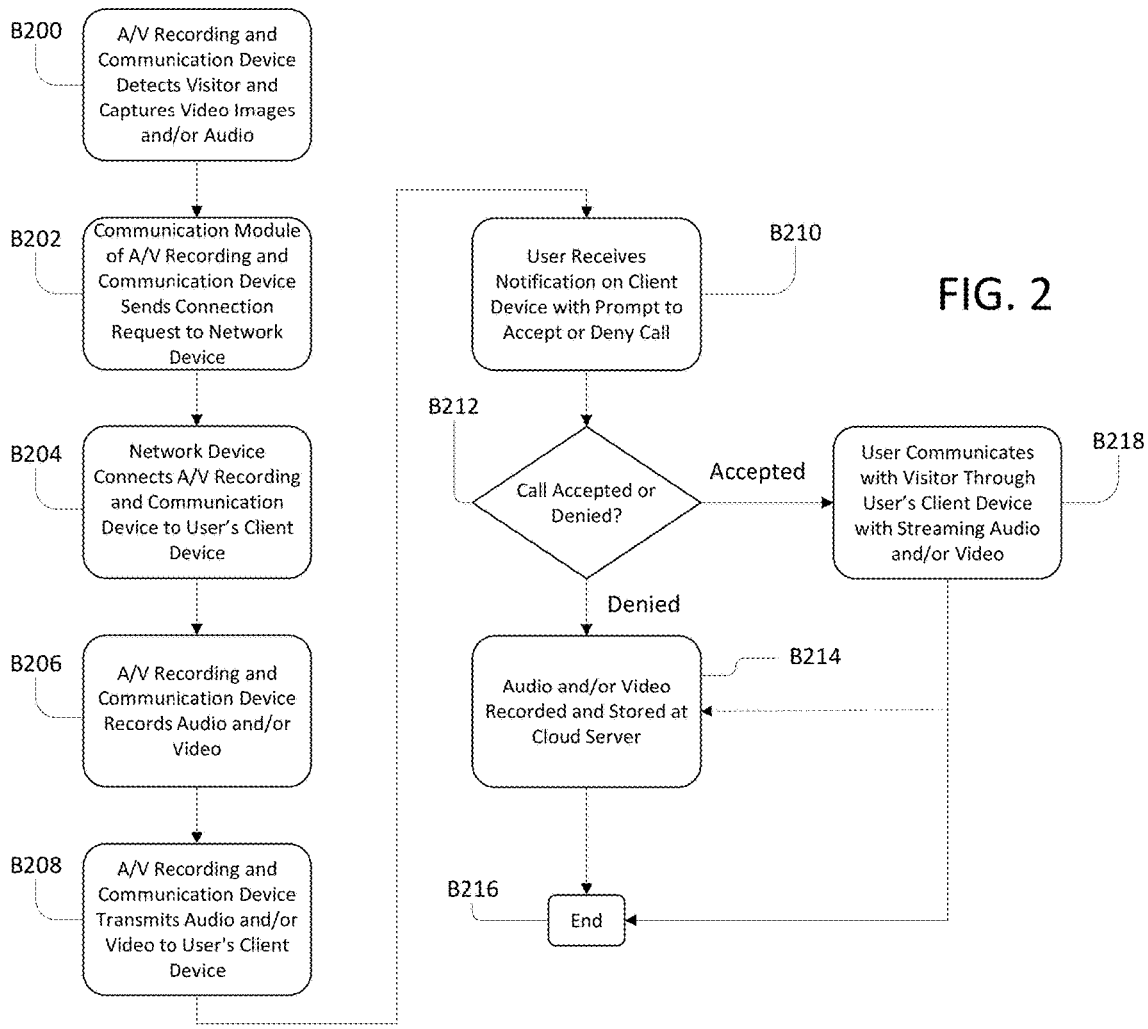
FIG. 2 is a flowchart illustrating one embodiment of a process for streaming and storing A/V content from an A/V recording and communication device according to various aspects of the present disclosure.

FIG. 2 is a flowchart illustrating a process for streaming and storing A/V content from an A/V recording and communication doorbell system according to various aspects of the present disclosure. At block B200, the A/V recording and communication device 100 detects the visitor's presence and begins capturing video images within a field of view of the camera 102. The A/V recording and communication device 100 may also capture audio through the microphone 104. As described above, the A/V recording and communication device 100 may detect the visitor's presence by detecting motion using the camera 102 and/or a motion sensor, and/or by detecting that the visitor has depressed the front button on the A/V recording and communication device 100 (in embodiments in which the A/V recording and communication device 100 comprises a doorbell).

At block B202, a communication module of the A/V recording and communication device 100 sends a connection request, via the user's network 110 and the network 112, to a device in the network 112. For example, the network device to which the request is sent may be a server such as the server 118. The server 118 may comprise a computer program and/or a machine that waits for requests from other machines or software (clients) and responds to them. A server typically processes data. One purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

In response to the request, at block B204 the network device may connect the A/V recording and communication device 100 to the user's client device 114 through the user's network 110 and the network 112. At block B206, the A/V recording and communication device 100 may record available audio and/or video data using the camera 102, the microphone 104, and/or any other sensor available. At block B208, the audio and/or video data is transmitted (streamed) from the A/V recording and communication device 100 to the user's client device 114 via the user's network 110 and the network 112. At block B210, the user may receive a notification on his or her client device 114 with a prompt to either accept or deny the call.

At block B212, the process determines whether the user has accepted or denied the call. If the user denies the notification, then the process advances to block B214, where the audio and/or video data is recorded and stored at a cloud server. The session then ends at block B216 and the connection between the A/V recording and communication device 100 and the user's client device 114 is terminated. If, however, the user accepts the notification, then at block B218 the user communicates with the visitor through the user's client device 114 while audio and/or video data captured by the camera 102, the microphone 104, and/or other sensors is streamed to the user's client device 114. At the end of the call, the user may terminate the connection between the user's client device 114 and the A/V recording and communication device 100 and the session ends at block B216. In some embodiments, the audio and/or video data may be recorded and stored at a cloud server (block B214) even if the user accepts the notification and communicates with the visitor through the user's client device 114.

Figure 3:
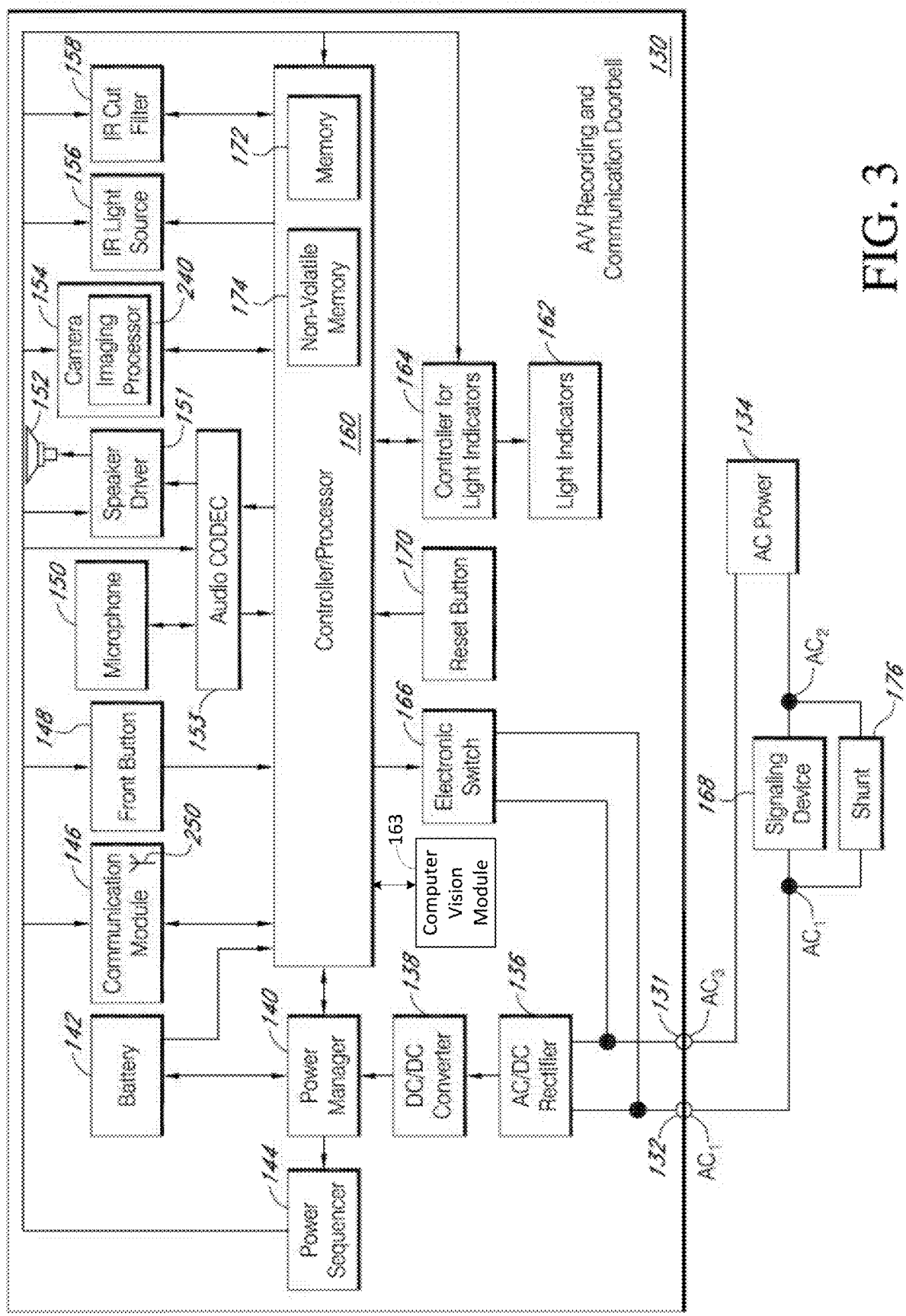
FIG. 3 is a functional block diagram illustrating an embodiment of an A/V recording and communication doorbell according to various aspects of the present disclosure.
Figure 4:
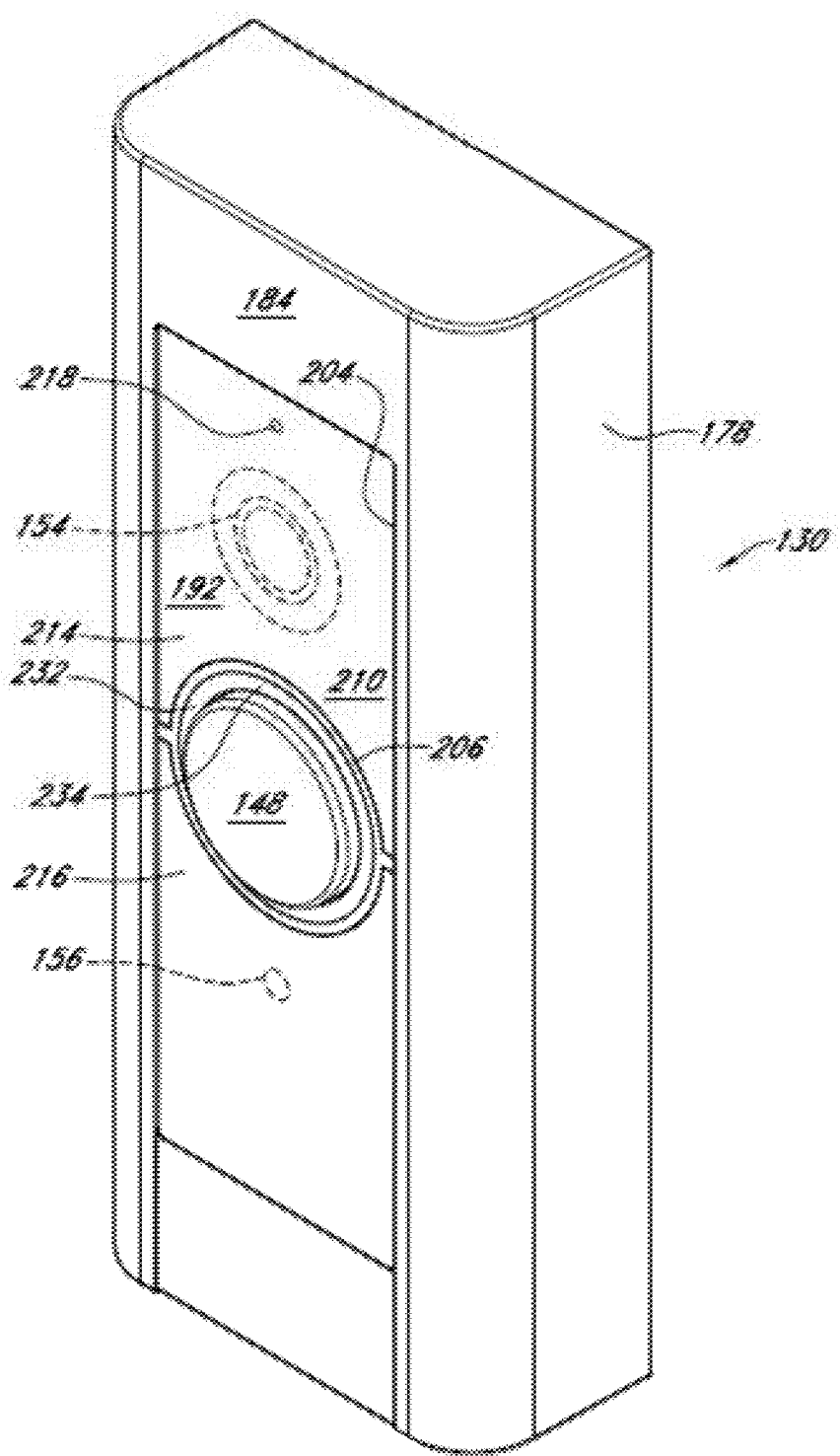
FIG. 4 is a front perspective view of an embodiment of an A/V recording and communication doorbell according to various aspects of the present disclosure.

FIGS. 3-4 illustrate one embodiment of a low-power-consumption A/V recording and communication doorbell 130 according to various aspects of the present disclosure. FIG. 3 is a functional block diagram illustrating various components of the A/V recording and communication doorbell 130 and their relationships to one another. For example, the A/V recording and communication doorbell 130 includes a pair of terminals 131, 132 configured to be connected to a source of external AC (alternating-current) power, such as a household AC power supply 134 (may also be referred to as AC mains). The AC power supply 134 may have a voltage in the range of 16-24 VAC, for example. The incoming AC power supply 134 may be converted to DC (direct-current) by an AC/DC rectifier 136. An output of the AC/DC rectifier 136 may be connected to an input of a DC/DC converter 138, which may step down the voltage from the output of the AC/DC rectifier 136 from 16-24 VDC to a lower voltage of about 5 VDC, for example. In various embodiments, the output of the DC/DC converter 138 may be in a range of from about 2.5 V to about 7.5 V, for example.

With further reference to FIG. 3, the output of the DC/DC converter 138 is connected to a power manager 140, which may comprise an integrated circuit including a processor core, memory, and/or programmable input/output peripherals. In one non-limiting example, the power manager 140 may be an off-the-shelf component, such as the BQ24773 chip manufactured by Texas Instruments. As described in detail below, the power manager 140 controls, among other things, an amount of power drawn from the external power supply 134, as well as an amount of supplemental power drawn from a battery 142, to power the A/V recording and communication doorbell 130. The power manager 140 may, for example, limit the amount of power drawn from the external power supply 134 so that a threshold power draw is not exceeded. In one non-limiting example, the threshold power, as measured at the output of the DC/DC converter 138, may be equal to 1.4 A. The power manager 140 may also control an amount of power drawn from the external power supply 134 and directed to the battery 142 for recharging of the battery 142. An output of the power manager 140 is connected to a power sequencer 144, which controls a sequence of power delivery to other components of the A/V recording and communication doorbell 130, including a communication module 146, a front button 148, a microphone 150, a speaker driver 151, a speaker 152, an audio CODEC (Coder-DECoder) 153, a camera 154, an infrared (IR) light source 156, an IR cut filter 158, a processor 160 (may also be referred to as a controller 160), a plurality of light indicators 162, and a controller 164 for the light indicators 162. Each of these components is described in detail below. The power sequencer 144 may comprise an integrated circuit including a processor core, memory, and/or programmable input/output peripherals. In one non-limiting example, the power sequencer 144 may be an off-the-shelf component, such as the RT5024 chip manufactured by Richtek.

With further reference to FIG. 3, the A/V recording and communication doorbell 130 further comprises an electronic switch 166 that closes when the front button 148 is depressed. When the electronic switch 166 closes, power from the AC power source 134 is diverted through a signaling device 168 that is external to the A/V recording and communication doorbell 130 to cause the signaling device 168 to emit a sound, as further described below. In one non-limiting example, the electronic switch 166 may be a triac device. The A/V recording and communication doorbell 130 further comprises a reset button 170 configured to initiate a hard reset of the processor 160, as further described below.

With further reference to FIG. 3, the processor 160 may perform data processing and various other functions, as described below. The processor 160 may comprise an integrated circuit including a processor core, memory 172, non-volatile memory 174, and/or programmable input/output peripherals (not shown). The memory 172 may comprise, for example, DDR3 (double data rate type three synchronous dynamic random-access memory). The non-volatile memory 174 may comprise, for example, NAND flash memory. In the embodiment illustrated in FIG. 3, the memory 172 and the non-volatile memory 174 are illustrated within the box representing the processor 160. It is to be understood that the embodiment illustrated in FIG. 3 is merely an example, and in some embodiments, the memory 172 and/or the non-volatile memory 174 are not necessarily physically incorporated with the processor 160. The memory 172 and/or the non-volatile memory 174, regardless of their physical location, may be shared by one or more other components (in addition to the processor 160) of the present A/V recording and communication doorbell 130.

The transfer of digital audio between the user and a visitor may be compressed and decompressed using the audio CODEC 153, which is operatively coupled to the processor 160. When the visitor speaks, audio from the visitor is compressed by the audio CODEC 153, digital audio data is sent through the communication module 146 to the network 112 via the user's network 110, routed by the server 118 and delivered to the user's client device 114. When the user speaks, after being transferred through the network 112, the user's network 110, and the communication module 146, the digital audio data is decompressed by the audio CODEC 153 and emitted to the visitor through the speaker 152, which is driven by the speaker driver 151.

With further reference to FIG. 3, some of the present embodiments may include a shunt 176 connected in parallel with the signaling device 168. The shunt 176 facilitates the ability of the A/V recording and communication doorbell 130 to draw power from the AC power source 134 without inadvertently triggering the signaling device 168. The shunt 176, during normal standby operation, presents a relatively low electrical impedance, such as a few ohms, across the terminals of the signaling device 168. Most of the current drawn by the A/V recording and communication doorbell 130, therefore, flows through the shunt 176, and not through the signaling device 168. The shunt 176, however, contains electronic circuitry (described below) that switches the shunt 176 between a state of low impedance, such as a few ohms, for example, and a state of high impedance, such as >1K ohms, for example. When the front button 148 of the A/V recording and communication doorbell 130 is pressed, the electronic switch 166 closes, causing the voltage from the AC power source 134 to be impressed mostly across the shunt 176 and the signaling device 168 in parallel, while a small amount of voltage, such as about 1V, is impressed across the electronic switch 166. The circuitry in the shunt 176 senses this voltage, and switches the shunt 176 to the high impedance state, so that power from the AC power source 134 is diverted through the signaling device 168. The diverted AC power supply 134 is above the threshold necessary to cause the signaling device 168 to emit a sound. Pressing the front button 148 of the doorbell 130 therefore causes the signaling device 168 to "ring," alerting any person(s) within the structure to which the doorbell 130 is mounted that there is a visitor at the front door (or at another location corresponding to the location of the doorbell 130). In one non-limiting example, the electronic switch 166 may be a triac device.

With reference to FIG. 4, the A/V recording and communication doorbell 130 further comprises a housing 178 having an enclosure (not shown), a back plate (not shown) secured to the rear of the enclosure, and a shell 184 overlying the enclosure. A front surface of the A/V recording and communication doorbell 130 may include the front button 148 (may also be referred to as front button 148), which is operatively connected to a processor (not shown). In a process similar to that described above with reference to FIG. 2, when a visitor presses the front button 148, an alert may be sent to the user's client device to notify the user that someone is at his or her front door (or at another location corresponding to the location of the A/V recording and communication doorbell 130). With further reference to FIG. 4, the A/V recording and communication doorbell 130 further includes the camera 154, which is operatively connected to the processor 160, and which is located behind a shield 192. As described in detail below, the camera 154 is configured to capture video images from within its field of view. Those video images can be streamed to the user's client device and/or uploaded to a remote network device for later viewing according to a process similar to that described above with reference to FIG. 2.

With further reference to FIG. 4, the shell 184 includes a central opening 204 in a front surface. The central opening 204 is sized and shaped to accommodate the shield 192. The shield 192 includes an upper portion 214 (located above and to the sides of the front button 148) and a lower portion 216 (located below and to the sides of the front button 148). The upper portion 214 of the shield 192 may be transparent or translucent so that it does not interfere with the field of view of the camera 154. As described in detail below, a microphone, which is operatively connected to the processor, is located behind the upper portion 214 of the shield 192. The upper portion 214, therefore, may include an opening 218 that facilitates the passage of sound through the shield 192 so that the microphone is better able to pick up sounds from the area around the A/V recording and communication doorbell 130.

The lower portion 216 of the shield 192 may comprise a material that is substantially transparent to infrared (IR) light, but partially or mostly opaque with respect to light in the visible spectrum. The lower portion 216 of the shield 192, therefore, does not interfere with transmission of IR light from the IR light source, which is located behind the lower portion 216. As described in detail below, the IR light source and the IR cut filter, which are both operatively connected to the processor, facilitate "night vision" functionality of the camera 154.

Several advantages flow from the ability of the present embodiments to be connected to the existing household AC power supply. For example, the camera of the present A/V recording and communication doorbell can be powered on continuously. In a typical battery-powered A/V recording and communication doorbell, the camera is powered on only part of the time so that the battery does not drain too rapidly. The present embodiments, by contrast, do not rely on a battery as a primary (or sole) power supply, and are thus able to keep the camera powered on continuously. Because the camera is able to be powered on continuously, it can always be recording, and recorded footage can be continuously stored in a rolling buffer or sliding window. In some embodiments, about 10-15 seconds of recorded footage can be continuously stored in the rolling buffer or sliding window. Also, because the camera is able to be powered on continuously, it can be used for motion detection, thus eliminating any need for a separate motion detection device, such as a passive infrared sensor (PIR). Eliminating the PIR simplifies the design of the A/V recording and communication doorbell and enables the doorbell to be made more compact, although in some alternative embodiments the doorbell may include one or more PIRs and/or other motion detectors, heat source detectors, etc. Also, because the camera is able to be powered on continuously, it can be used as a light detector for use in controlling the current state of the IR cut filter and turning the IR LED on and off. Using the camera as a light detector eliminates any need for a separate light detector, thereby further simplifying the design of the A/V recording and communication doorbell and enabling the doorbell to be made even more compact, although in some alternative embodiments the doorbell may include a separate light detector.

Figure 5:
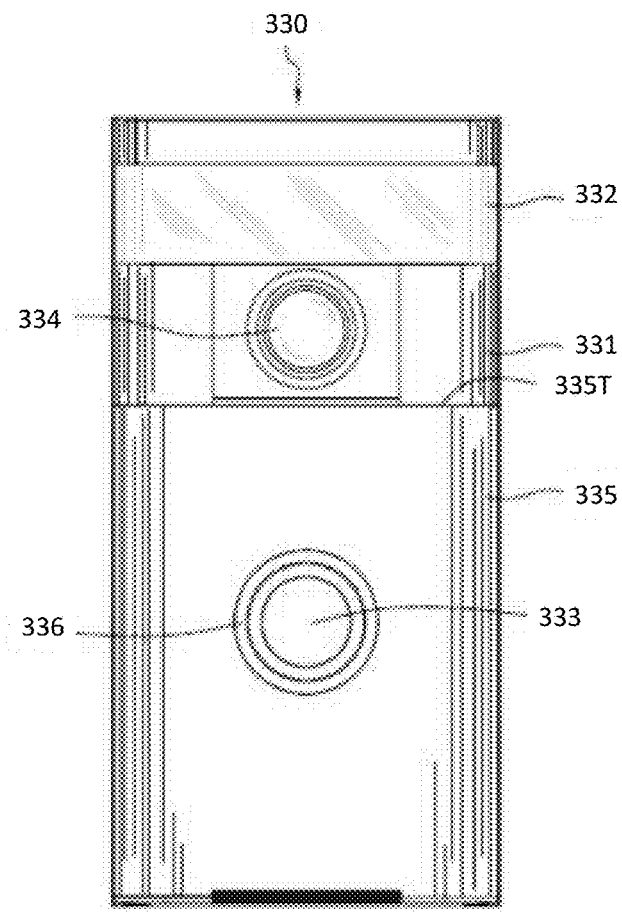
FIG. 5 is a front view of another embodiment of an A/V recording and communication doorbell according to various aspects of the present disclosure.
Figure 6:
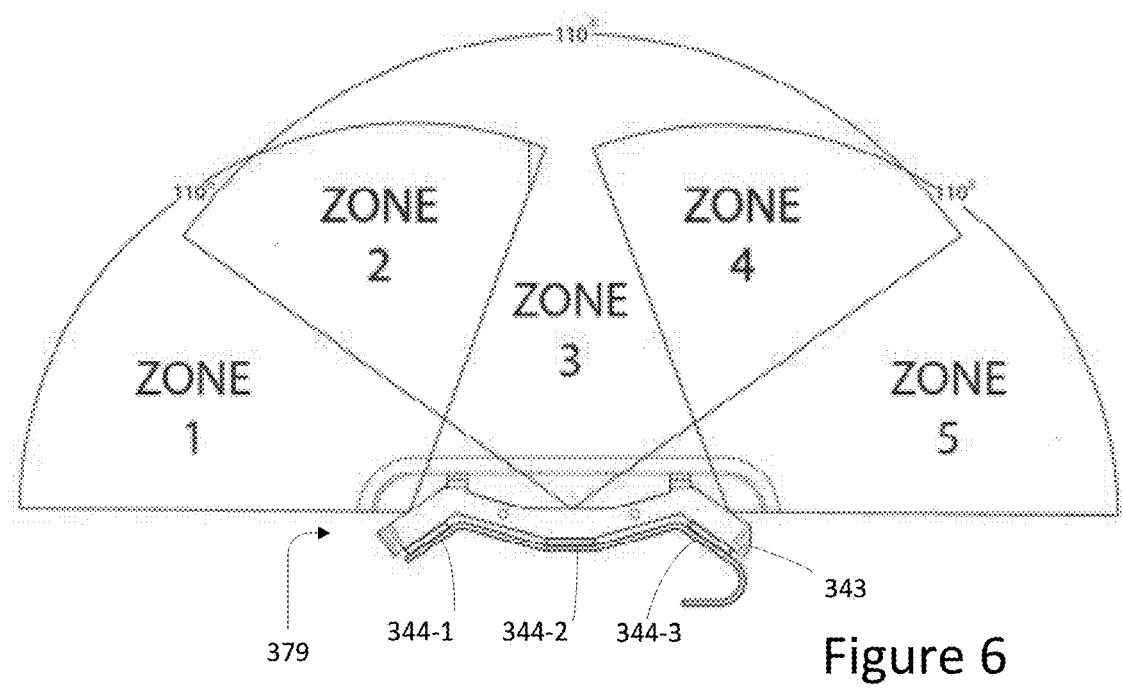
FIG. 6 is a top view of a passive infrared sensor assembly of the A/V recording and communication doorbell of FIG. 5, illustrating fields of view of passive infrared sensors of the passive infrared sensor assembly according to various aspects of the present disclosure.
Figure 7:
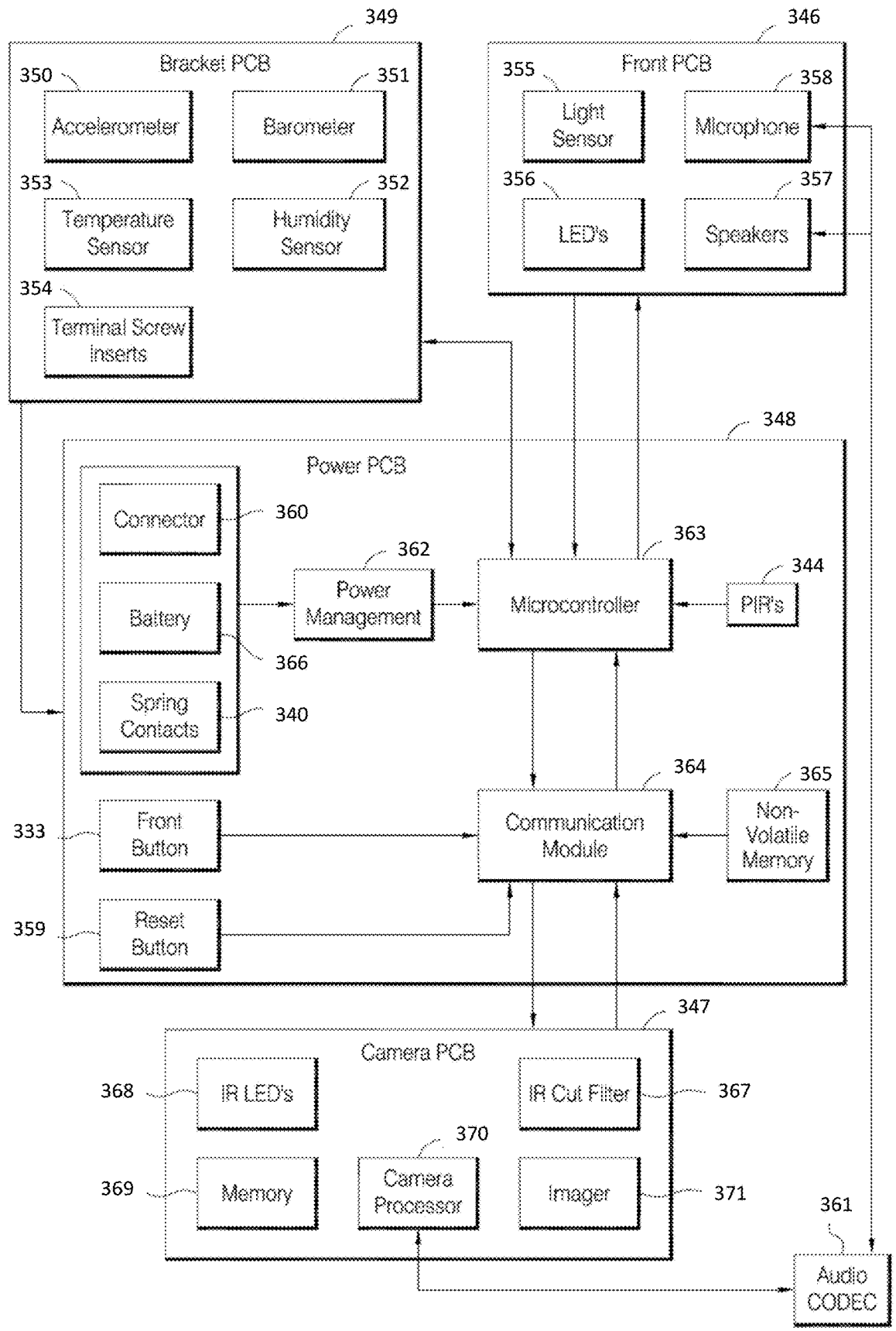
FIG. 7 is a functional block diagram of the components of the A/V recording and communication doorbell of FIG. 5.

FIGS. 5-7 illustrate another embodiment of a wireless audio/video (A/V) communication doorbell 330 according to an aspect of present embodiments. FIG. 5 is a front view of the wireless A/V communication doorbell 330. As described below, the doorbell 330 is configured to be connected to an external power source, such as household wiring, but is also configured to be powered by an on-board rechargeable battery instead of, or in addition to, the external power source.

The doorbell 330 includes a faceplate 335 mounted to a back plate (not shown). The faceplate 335 protects the internal contents of the doorbell 330 and serves as an exterior front surface of the doorbell 330. The faceplate 335 may include a button 333 and a light pipe 336. The light pipe 336 may comprise any suitable material, including, without limitation, transparent plastic, that is capable of allowing light produced within the doorbell 330 to pass through. The light may be produced by one or more light-emitting components, such as light-emitting diodes (LED's), contained within the doorbell 330, as further described below. The button 333 may make contact with a button actuator (not shown) located within the doorbell 330 when the button 333 is pressed by a visitor. When pressed, the button 333 may trigger one or more functions of the doorbell 330, as further described below.

With further reference to FIG. 5, the doorbell 330 further includes an enclosure 331 that engages the faceplate 335. The doorbell 330 further includes a lens 332. In some embodiments, the lens may comprise a Fresnel lens, which may be patterned to deflect incoming light into one or more infrared sensors located within the doorbell 330. The doorbell 330 further includes a camera 334, which captures video data when activated, as described below.

The doorbell 330 further comprises passive infrared (PIR) sensors 344-1, 344-2, 344-3 (FIG. 6) (hereinafter collectively referred to as the PIR sensors 344), which are secured on or within a PIR sensor holder 343 (FIG. 6), and the assembly resides behind the lens 332. In some embodiments, the doorbell 330 may comprise three PIR sensors 344-1, 344-2, 344-3, as further described below, but in other embodiments, any number of PIR sensors 344 may be provided. In some embodiments, one or more of the PIR sensors 344 may comprise a pyroelectric infrared sensor. The PIR sensors 344 may be any type of sensor capable of detecting and communicating the presence of a heat source within their field of view. Further, alternative embodiments may comprise one or more motion sensors either in place of or in addition to the PIR sensors 344.

FIG. 6 is a top view of the passive infrared sensor assembly 379 illustrating the fields of view of the passive infrared sensors 344. In the illustrated embodiment, the side faces of the passive infrared sensor holder 343 are angled at 55° facing outward from the center face, and each PIR sensor 344 has a field of view of 110°. However, these angles may be increased or decreased as desired. Zone 1 is the area that is visible only to a first one of the passive infrared sensors 344-1. Zone 2 is the area that is visible only to the first one of the PIR sensor 344-1 and a second one of the PIR sensors 344-2. Zone 3 is the area that is visible only to a second one of the PIR sensors 344-2. Zone 4 is the area that is visible only to the second one of the PIR sensors 344-2 and a third one of the passive infrared sensors 344-3. Zone 5 is the area that is visible only to the third one of the PIR sensors 344-3. In some embodiments, the doorbell 130 may be capable of determining the direction that an object is moving based upon which zones are triggered in a time sequence.

FIG. 7 is a functional block diagram of the components within or in communication with the doorbell 330, according to an aspect of the present embodiments. The bracket PCB 349 may comprise an accelerometer 350, a barometer 351, a humidity sensor 352, and a temperature sensor 353. The accelerometer 350 may be one or more sensors capable of sensing motion and/or acceleration. The barometer 351 may be one or more sensors capable of determining the atmospheric pressure of the surrounding environment in which the bracket PCB 349 may be located. The humidity sensor 352 may be one or more sensors capable of determining the amount of moisture present in the atmospheric environment in which the bracket PCB 349 may be located. The temperature sensor 353 may be one or more sensors capable of determining the temperature of the ambient environment in which the bracket PCB 349 may be located. The bracket PCB 349 may be located outside the housing of the doorbell 330 so as to reduce interference from heat, pressure, moisture, and/or other stimuli generated by the internal components of the doorbell 330.

With further reference to FIG. 7, the bracket PCB 349 may further comprise terminal screw inserts 354, which may be configured to receive the terminal screws and transmit power to the electrical contacts on the mounting bracket. The bracket PCB 349 may be electrically and/or mechanically coupled to the power PCB 348 through the terminal screws, the terminal screw inserts 354, the spring contacts 340, and the electrical contacts. The terminal screws may receive electrical wires located at the surface to which the doorbell 330 is mounted, such as the wall of a building, so that the doorbell can receive electrical power from the building's electrical system. Upon the terminal screws being secured within the terminal screw inserts 354, power may be transferred to the bracket PCB 349, and to all of the components associated therewith, including the electrical contacts. The electrical contacts may transfer electrical power to the power PCB 348 by mating with the spring contacts 340.

With further reference to FIG. 7, the front PCB 346 may comprise a light sensor 355, one or more light-emitting components, such as LED's 356, one or more speakers 357, and a microphone 358. The light sensor 355 may be one or more sensors capable of detecting the level of ambient light of the surrounding environment in which the doorbell 330 may be located. LED's 356 may be one or more light-emitting diodes capable of producing visible light when supplied with power. The speakers 357 may be any electromechanical device capable of producing sound in response to an electrical signal input. The microphone 358 may be an acoustic-to-electric transducer or sensor capable of converting sound waves into an electrical signal. When activated, the LED's 356 may illuminate the light pipe 336 (FIG. 5). The front PCB 346 and all components thereof may be electrically coupled to the power PCB 348, thereby allowing data and/or power to be transferred to and from the power PCB 348 and the front PCB 346.

The speakers 357 and the microphone 358 may be coupled to the camera processor 370 through an audio CODEC 361. For example, the transfer of digital audio from the user's client device 114 and the speakers 357 and the microphone 358 may be compressed and decompressed using the audio CODEC 361, coupled to the camera processor 370. Once compressed by audio CODEC 361, digital audio data may be sent through the communication module 364 to the network 112, routed by one or more servers 118, and delivered to the user's client device 114 (FIG. 1). When the user speaks, after being transferred through the network 112, digital audio data is decompressed by audio CODEC 361 and emitted to the visitor via the speakers 357.

With further reference to FIG. 7, the power PCB 348 may comprise a power management module 362, a microcontroller 363 (may also be referred to as "processor," "CPU," or "controller"), the communication module 364, and power PCB non-volatile memory 365. In certain embodiments, the power management module 362 may comprise an integrated circuit capable of arbitrating between multiple voltage rails, thereby selecting the source of power for the doorbell 330. The battery 366, the spring contacts 340, and/or the connector 360 may each provide power to the power management module 362. The power management module 362 may have separate power rails dedicated to the battery 366, the spring contacts 340, and the connector 360. In one aspect of the present disclosure, the power management module 362 may continuously draw power from the battery 366 to power the doorbell 330, while at the same time routing power from the spring contacts 340 and/or the connector 360 to the battery 366, thereby allowing the battery 366 to maintain a substantially constant level of charge. Alternatively, the power management module 362 may continuously draw power from the spring contacts 340 and/or the connector 360 to power the doorbell 330, while only drawing from the battery 366 when the power from the spring contacts 340 and/or the connector 360 is low or insufficient. Still further, the battery 366 may comprise the sole source of power for the doorbell 330. In such embodiments, the spring contacts 340 may not be connected to a source of power. When the battery 366 is depleted of its charge, it may be recharged, such as by connecting a power source to the connector 360. The power management module 362 may also serve as a conduit for data between the connector 360 and the microcontroller 363.

With further reference to FIG. 7, in certain embodiments the microcontroller 363 may comprise an integrated circuit including a processor core, memory, and programmable input/output peripherals. The microcontroller 363 may receive input signals, such as data and/or power, from the PIR sensors 344, the bracket PCB 349, the power management module 362, the light sensor 355, the microphone 358, and/or the communication module 364, and may perform various functions as further described below. When the microcontroller 363 is triggered by the PIR sensors 344, the microcontroller 363 may be triggered to perform one or more functions. When the light sensor 355 detects a low level of ambient light, the light sensor 355 may trigger the microcontroller 363 to enable "night vision," as further described below. The microcontroller 363 may also act as a conduit for data communicated between various components and the communication module 364.

With further reference to FIG. 7, the communication module 364 may comprise an integrated circuit including a processor core, memory, and programmable input/output peripherals. The communication module 364 may also be configured to transmit data wirelessly to a remote network device, and may include one or more transceivers (not shown). The wireless communication may comprise one or more wireless networks, such as, without limitation, Wi-Fi, cellular, Bluetooth, and/or satellite networks. The communication module 364 may receive inputs, such as power and/or data, from the camera PCB 347, the microcontroller 363, the button 333, the reset button 359, and/or the power PCB non-volatile memory 365. When the button 333 is pressed, the communication module 364 may be triggered to perform one or more functions. When the reset button 359 is pressed, the communication module 364 may be triggered to erase any data stored at the power PCB non-volatile memory 365 and/or at the camera PCB memory 369. The communication module 364 may also act as a conduit for data communicated between various components and the microcontroller 363. The power PCB non-volatile memory 365 may comprise flash memory configured to store and/or transmit data. For example, in certain embodiments the power PCB non-volatile memory 365 may comprise serial peripheral interface (SPI) flash memory.

With further reference to FIG. 7, the camera PCB 347 may comprise components that facilitate the operation of the camera 334. For example, an imager 371 may comprise a video recording sensor and/or a camera chip. In one aspect of the present disclosure, the imager 371 may comprise a complementary metal-oxide semiconductor (CMOS) array, and may be capable of recording high definition (e.g., 1080p or better) video files. A camera processor 370 may comprise an encoding and compression chip. In some embodiments, the camera processor 370 may comprise a bridge processor. The camera processor 370 may process video recorded by the imager 371 and audio recorded by the microphone 358, and may transform this data into a form suitable for wireless transfer by the communication module 364 to a network. The camera PCB memory 369 may comprise volatile memory that may be used when data is being buffered or encoded by the camera processor 370. For example, in certain embodiments the camera PCB memory 369 may comprise synchronous dynamic random-access memory (SD RAM). IR LED's 368 may comprise light-emitting diodes capable of radiating infrared light. IR cut filter 367 may comprise a system that, when triggered, configures the imager 371 to see primarily infrared light as opposed to visible light. When the light sensor 355 detects a low level of ambient light (which may comprise a level that impedes the performance of the imager 371 in the visible spectrum), the IR LED's 368 may shine infrared light through the doorbell 330 enclosure out to the environment, and the IR cut filter 367 may enable the imager 371 to see this infrared light as it is reflected or refracted off of objects within the field of view of the doorbell. This process may provide the doorbell 330 with the "night vision" function mentioned above.

Some of the present embodiments may comprise computer vision for one or more aspects, such as object and/or facial recognition. Computer vision includes methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image. Understanding in this context means the transformation of visual images (the input of the retina) into descriptions of the world that can interface with other thought processes and elicit appropriate action. This image understanding can be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data can take many forms, such as video sequences, views from multiple cameras, or multi-dimensional data from a scanner. As a technological discipline, computer vision seeks to apply its theories and models for the construction of computer vision systems.

One aspect of computer vision comprises determining whether or not the image data contains some specific object, feature, or activity. Different varieties of computer vision recognition include: Object Recognition (also called object classification)—One or several pre-specified or learned objects or object classes can be recognized, usually together with their 2D positions in the image or 3D poses in the scene. Identification—An individual instance of an object is recognized. Examples include identification of a specific person's face or fingerprint, identification of handwritten digits, or identification of a specific vehicle. Detection—The image data are scanned for a specific condition. Examples include detection of possible abnormal cells or tissues in medical images or detection of a vehicle in an automatic road toll system. Detection based on relatively simple and fast computations is sometimes used for finding smaller regions of interesting image data that can be further analyzed by more computationally demanding techniques to produce a correct interpretation.

Several specialized tasks based on computer vision recognition exist, such as: Optical Character Recognition (OCR)—Identifying characters in images of printed or handwritten text, usually with a view to encoding the text in a format more amenable to editing or indexing (e.g., ASCII). 2D Code Reading—Reading of 2D codes such as data matrix and QR codes. Facial Recognition. Shape Recognition Technology (SRT)—Differentiating human beings (e.g., head and shoulder patterns) from objects.

Typical functions and components (e.g., hardware) found in many computer vision systems are described in the following paragraphs. The present embodiments may include at least some of these aspects. For example, with reference to FIG. 3, embodiments of the present A/V recording and communication doorbell 130 may include a computer vision module 163. The computer vision module 163 may include any of the components (e.g., hardware) and/or functionality described herein with respect to computer vision, including, without limitation, one or more cameras, sensors, and/or processors. In some of the present embodiments, the microphone 150, the camera 154, and/or the imaging processor 240 may be components of the computer vision module 163.

Image acquisition—A digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but can also be related to various physical measures, such as depth, absorption or reflectance of sonic or electromagnetic waves, or nuclear magnetic resonance.

Pre-processing—Before a computer vision method can be applied to image data in order to extract some specific piece of information, it is usually beneficial to process the data in order to assure that it satisfies certain assumptions implied by the method. Examples of pre-processing include, but are not limited to re-sampling in order to assure that the image coordinate system is correct, noise reduction in order to assure that sensor noise does not introduce false information, contrast enhancement to assure that relevant information can be detected, and scale space representation to enhance image structures at locally appropriate scales.

Feature extraction—Image features at various levels of complexity are extracted from the image data. Typical examples of such features are: Lines, edges, and ridges; Localized interest points such as corners, blobs, or points; More complex features may be related to texture, shape, or motion.

Detection/segmentation—At some point in the processing a decision may be made about which image points or regions of the image are relevant for further processing. Examples are: Selection of a specific set of interest points; Segmentation of one or multiple image regions that contain a specific object of interest; Segmentation of the image into nested scene architecture comprising foreground, object groups, single objects, or salient object parts (also referred to as spatial-taxon scene hierarchy).

High-level processing—At this step, the input may be a small set of data, for example a set of points or an image region that is assumed to contain a specific object. The remaining processing may comprise, for example: Verification that the data satisfy model-based and application-specific assumptions; Estimation of application-specific parameters, such as object pose or object size; Image recognition—classifying a detected object into different categories; Image registration—comparing and combining two different views of the same object. Decision making—Making the final decision required for the application, for example match/no-match in recognition applications.

One or more of the present embodiments may include a vision processing unit (not shown separately, but may be a component of the computer vision module 163). A vision processing unit is an emerging class of microprocessor; it is a specific type of AI (artificial intelligence) accelerator designed to accelerate machine vision tasks. Vision processing units are distinct from video processing units (which are specialized for video encoding and decoding) in their suitability for running machine vision algorithms such as convolutional neural networks, SIFT, etc. Vision processing units may include direct interfaces to take data from cameras (bypassing any off-chip buffers), and may have a greater emphasis on on-chip dataflow between many parallel execution units with scratchpad memory, like a manycore DSP (digital signal processor). But, like video processing units, vision processing units may have a focus on low precision fixed-point arithmetic for image processing.

Some of the present embodiments may use facial recognition hardware and/or software, as a part of the computer vision system. Various types of facial recognition exist, some or all of which may be used in the present embodiments.

Some face recognition algorithms identify facial features by extracting landmarks, or features, from an image of the subject's face. For example, an algorithm may analyze the relative position, size, and/or shape of the eyes, nose, cheekbones, and jaw. These features are then used to search for other images with matching features. Other algorithms normalize a gallery of face images and then compress the face data, only saving the data in the image that is useful for face recognition. A probe image is then compared with the face data. One of the earliest successful systems is based on template matching techniques applied to a set of salient facial features, providing a sort of compressed face representation.

Recognition algorithms can be divided into two main approaches, geometric, which looks at distinguishing features, or photometric, which is a statistical approach that distills an image into values and compares the values with templates to eliminate variances.

Popular recognition algorithms include principal component analysis using eigenfaces, linear discriminant analysis, elastic bunch graph matching using the Fisherface algorithm, the hidden Markov model, the multilinear subspace learning using tensor representation, and the neuronal motivated dynamic link matching.

Further, a newly emerging trend, claimed to achieve improved accuracy, is three-dimensional face recognition. This technique uses 3D sensors to capture information about the shape of a face. This information is then used to identify distinctive features on the surface of a face, such as the contour of the eye sockets, nose, and chin.

One advantage of 3D face recognition is that it is not affected by changes in lighting like other techniques. It can also identify a face from a range of viewing angles, including a profile view. Three-dimensional data points from a face vastly improve the precision of face recognition. 3D research is enhanced by the development of sophisticated sensors that do a better job of capturing 3D face imagery. The sensors work by projecting structured light onto the face. Up to a dozen or more of these image sensors can be placed on the same CMOS chip—each sensor captures a different part of the spectrum.

Another variation is to capture a 3D picture by using three tracking cameras that point at different angles; one camera pointing at the front of the subject, a second one to the side, and a third one at an angle. All these cameras work together to track a subject's face in real time and be able to face detect and recognize.

Another emerging trend uses the visual details of the skin, as captured in standard digital or scanned images. This technique, called skin texture analysis, turns the unique lines, patterns, and spots apparent in a person's skin into a mathematical space.

Another form of taking input data for face recognition is by using thermal cameras, which may only detect the shape of the head and ignore the subject accessories such as glasses, hats, or make up.

Further examples of (AIDC) and/or computer vision that can be used in the present embodiments to verify the identity and/or authorization of a person include, without limitation, biometrics. Biometrics refers to metrics related to human characteristics. Biometrics authentication (or realistic authentication) is used in various forms of identification and access control. Biometric identifiers are the distinctive, measurable characteristics used to label and describe individuals. Biometric identifiers can be physiological characteristics and/or behavioral characteristics. Physiological characteristics may be related to the shape of the body. Examples include, but are not limited to, fingerprints, palm veins, facial recognition, three-dimensional facial recognition, skin texture analysis, DNA, palm prints, hand geometry, iris recognition, retina recognition, and odor/scent recognition. Behavioral characteristics may be related to the pattern of behavior of a person, including, but not limited to, typing rhythm, gait, and voice recognition.

The present embodiments may use any one, or any combination of more than one, of the foregoing biometrics to identify and/or authenticate a person who is either suspicious or who is authorized to take certain actions with respect to a property or expensive item of collateral. For example, the computer vision module 163, and/or the camera 154 and/or the processor 160 may receive information about the person using any one, or any combination of more than one, of the foregoing biometrics.

Figure 8:
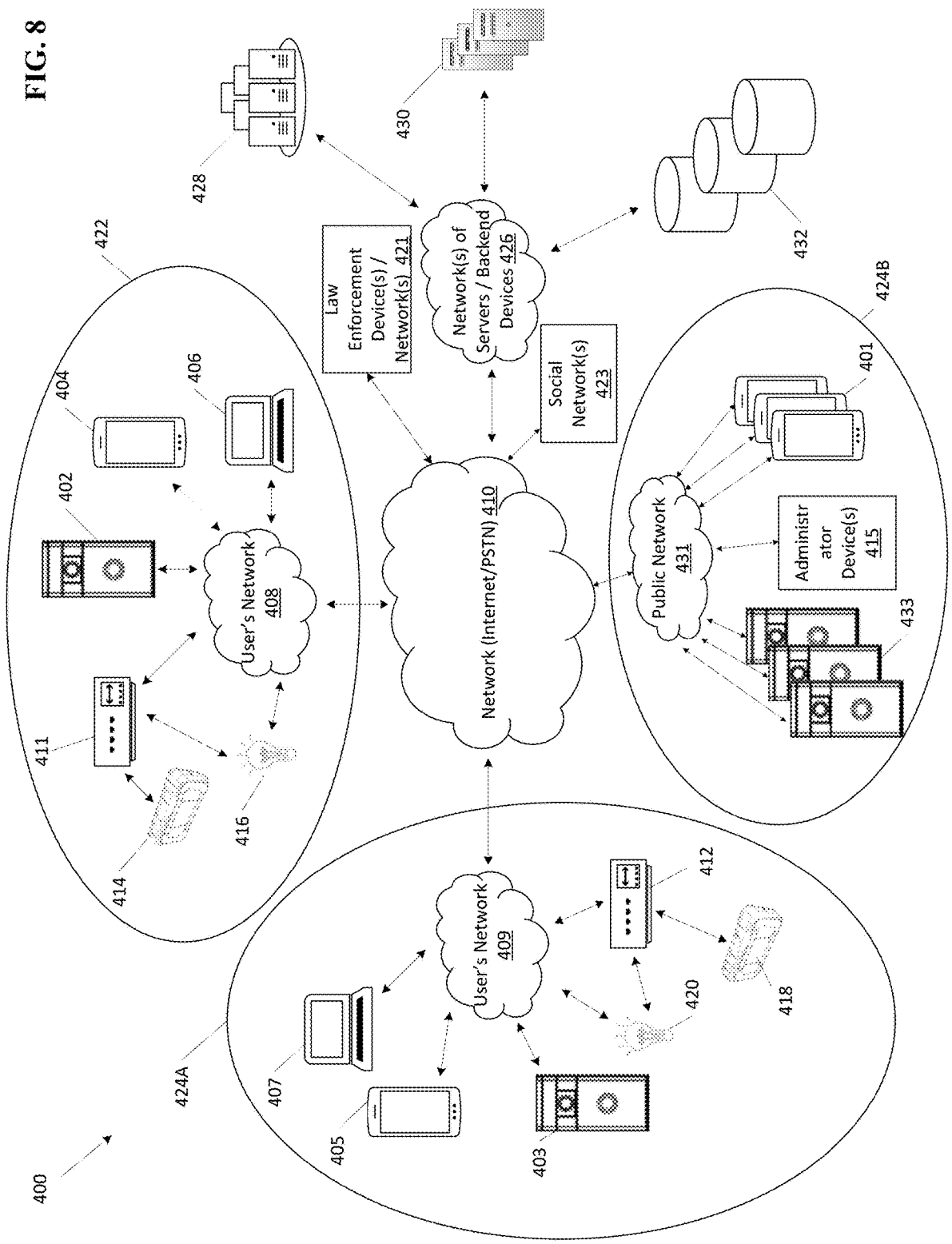
FIG. 8 is a functional block diagram illustrating a system for communicating in a network according to various aspects of the present disclosure.

The present embodiments may use any one, or any combination of more than one, of the foregoing biometrics to identify a person in the field of view of the A/V recording and communication doorbell 130. For example, the computer vision module 163, and/or the camera 154, and/or the processor 240 may receive information about the person using any one, or any combination of more than one, of the foregoing biometrics. The received information (through AIDC and/or computer vision) may be compared to stored information about one or more persons. For example, the received information may be sent to one or more network devices, such as the backend server(s) 118 and/or the backend API(s) 120, in an identity query signal. One or more of the network devices may then compare information in the identity query signal about the person detected in the area about the A/V recording and communication doorbell 130 with information from one or more sources. These information sources may include one or more databases and/or services. For example, a database and/or service may include a database of persons who are wanted in connection with crimes. If a match is found, one or more actions may be taken, such as transmitting an alert to the law enforcement device(s)/network(s) 421 (FIG. 8). In another example, a database and/or service may include a sex offender registry. If a match is found, one or more actions may be taken, such as transmitting an alert to any persons who have requested to receive alerts when a registered sex offender is detected by the A/V recording and communication doorbell 130. The databases, services, alerts, and other types of actions that can be used in connection with the present embodiments are limitless, and the foregoing examples are neither exhaustive nor intended to limit the present embodiments in any way.

One aspect of the present embodiments includes the realization that, historically, security systems have been designed and intended to protect only the property at which the security systems are installed. A typical security system is self-contained, and provides a warning to the property owner only when an intrusion is detected at that same property, and only when the security system is armed. However, potential threats to the property may occur before an intruder crosses the property boundary where the security system is located/installed, such as when an intrusion occurs at a nearby property. The present embodiments solve this problem by leveraging the functionality of security systems to link together security systems at multiple properties, where each property is protected by a security system and/or an A/V recording and communication device. When an intrusion is detected by a security system and/or an A/V recording and communication device at one of the properties in the network of properties, warnings may be provided to users associated with the other properties in the network that include security systems. Such warnings may provide the users with opportunity to take corrective action, such as by arming their own alarm systems, before the potential threat at the nearby property becomes an actual threat at that user's property. As a result, the safety of that user's property is increased, as well as the safety of the other properties in the network, thereby contributing to public safety.

For example, in some of the present embodiments, a method for a security network including a first security system installed at a first location and a second security system installed at a second location, may include, in response to a security event detected at the first location by the first security system, receiving security event data from the first security system; analyzing the security event data from the first security system to determine at least one of: (1) a proximity of the first security system to the second security system; (2) a time frame in which the security event happened; (3) a threat level of the security event; and (4) a type of the security event. The method may also include determining a security event procedure for the second security system based on analyzing the security event data from the first security system; where the security event procedure includes at least one of the following: (1) selecting a user alert from a plurality of user alerts, and transmitting the selected user alert to a client device associated with the second security system; and (2) transmitting an automatic arming action to the second security system.

FIG. 8 is a functional block diagram illustrating a system 400 for communicating in a network according to various aspects of the present disclosure. The system 400 may include one or more first A/V recording and communication devices 402 configured to access a user's network 408 to connect to a network (Internet/PSTN) 410. The system 400 may also include one or more second A/V recording and communication devices 403 configured to access the user's network 409 to connect to the network (Internet/PSTN) 410. The system 400 may further include one or more publicly-accessible security camera devices 433, each allowing public access to video footage recorded by the publicly-accessible security camera device 433 through a public access identifier, as described below. The publicly-accessible security camera devices 433 are configured to access a public network 431 to connect to the network (Internet/PSTN) 410.

In various embodiments of the present disclosure, first and second A/V recording and communication devices 402 and 403, and the publicly-accessible security camera devices 433, may be substantially similar, except the publicly-accessible security camera devices 433 may allow public access to video footage they record through public access identifiers. In various implementations of the present disclosure, one or more of the first and second A/V recording and communication devices 402, 403, and the publicly-accessible security camera devices 433, may include any or all of the components and/or functionality of the A/V recording and communication device 100 (FIGS. 1-2), the A/V recording and communication doorbell 130 (FIGS. 3-4), and/or the A/V recording and communication doorbell 330 (FIGS. 5-7). As discussed herein, the present disclosure provides numerous examples of methods and systems including A/V recording and communication doorbells, but the present embodiments are equally applicable for A/V recording and communication devices other than doorbells. For example, the present embodiments may include one or more A/V recording and communication security cameras, one or more A/V recording and communication spotlights, and/or one or more A/V recording and communication security floodlights instead of, or in addition to, one or more A/V recording and communication doorbells. An example A/V recording and communication security camera may include substantially all of the structure and functionality of the doorbell 330, but without the front button 333 and related components.

The user's networks 408 and 409, and the public network 431, may include any or all of the components and/or functionality of the user's network 110 described herein. The system 400 may also include one or more client devices 404, 406, which in various embodiments may be configured to be in network communication and/or associated with the first A/V recording and communication device 402. The system 400 may further include one or more client devices 405, 407, which in various embodiments may be configured to be in network communication and/or associated with the second A/V recording and communication device 403. The system 400 may also include one or more client devices 401. In various embodiments, one or more of the client devices 401 may be configured to be in network communication and/or associated with at least one of the publicly-accessible security camera devices 433. In various embodiments, one or more of the client devices 401 may not have permission to access video footage recorded by the first A/V recording and communication device 402 or the second A/V recording and communication device 403, but may access video footage recorded by the publicly-accessible security camera devices 433 by using public access identifiers, for example, through the public network 431, the network (Internet/PSTN) 410, network(s) of servers/backend devices 426, and one or more backend servers 430. In various embodiments, at least some of the client devices 404, 405, 406, 407 may also access video footage recorded by the publicly-accessible security camera devices 433 by using the corresponding public access identifiers.

The client devices 401, 404, 406, 405, 407 may comprise, for example, a mobile phone such as a smartphone, or a computing device such as a tablet computer, a laptop computer, a desktop computer, etc. The client devices 401, 404, 406, 405, 407 may include any or all of the components and/or functionality of the client device 114 and/or the client device 800 described herein. In some embodiments, the client devices 404, 406 may not be associated with the first A/V recording and communication device 402 and the client devices 405, 407 may not be associated with the second A/V recording and communication device 403. In other words, the users/owners of the client device(s) 404, 406, 405, 407, may not also use/own an A/V recording and communication device, similar to users/owners of the client device(s) 401.

The system 400 may further include a first smart-home hub device 411 (which may alternatively be referred to herein as the first hub device 411) connected to the user's network 408. The first smart-home hub device 411 (also known as a home automation hub, premises security hub, gateway device, etc.), may comprise any device that facilitates communication with and control of the sensors 414, automation devices 416, and/or one or more of the first A/V recording and communication devices 402. For example, the first smart-home hub device 411 may be a component of a home automation system installed at a first property. The system 400 may further include a second smart-home hub device 412 (which may alternatively be referred to herein as the second hub device 412) connected to the user's network 409. The second smart-home hub device 412 (also known as a home automation hub, premises security hub, a gateway device, etc.), may comprise any device that facilitates communication with and control of the sensors 418, automation devices 420, and/or one or more of the second A/V recording and communication devices 403. For example, the second smart-home hub device 412 may be a component of a home automation system installed at a second property.

Though not shown in FIG. 8, the first A/V recording and communication device 402 may communicate with the first smart-home hub device 411 directly and/or indirectly via the user's network 408. As shown in FIG. 8, the sensors 414 and the automation devices 416 may communicate with the first smart-home hub device 411 directly and/or indirectly via the user's network 408. Though not shown in FIG. 8, the second A/V recording and communication device 403 may similarly communicate with the second smart-home hub device 412 directly and/or indirectly via the user's network 409. As shown in FIG. 8, the sensors 418 and the automation devices 420 may communicate with the second smart-home hub device 412 directly and/or indirectly via the user's network 409.

Home automation, or smart home, is building automation for the home. It involves the control and automation of various devices and/or systems, such as lighting, heating (such as smart thermostats), ventilation, air conditioning (HVAC), blinds/shades, and security, as well as home appliances, such as washers/dryers, ovens, or refrigerators/freezers. Wi-Fi is often used for remote monitoring and control. Smart home devices (e.g., the first and the second hub devices 411, 412, the sensors 414, 418, the automation devices 416, 420, the first and the second A/V recording and communication devices 402, 403, etc.), when remotely monitored and controlled via the network (Internet/PSTN) 410, may be considered to be components of the Internet of Things. Smart home systems may include switches and/or sensors (e.g., the sensors 414, 418) connected to a central hub such as the first smart-home hub device 411 or the second smart-home hub device 412, sometimes called a gateway, from which the system may be controlled with a user interface. The user interface may include any or all of a wall-mounted terminal, software installed on the client devices 404, 405, 406, 407 (e.g., a mobile application), a tablet computer or a web interface, often but not always via Internet cloud services. The home automation system may use one or more communication protocols, including either or both of wired and wireless protocols, including but not limited to Wi-Fi, X10, Ethernet, RS-485, 6LoWPAN, Bluetooth LE (BTLE), ZigBee, and Z-Wave.

One or more of the sensors 414, 418 may include, for example, at least one of a door sensor, a window sensor, a contact sensor, a tilt sensor, a temperature sensor, a carbon monoxide sensor, a smoke detector, a light sensor, a glass break sensor, a motion sensor, a thermostat, and/or other sensors that may provide the user/owner of the first security system 422 of a security event at his or her property.

One or more of the automation devices 416, 420 may include, for example, at least one of an outdoor lighting system, an indoor lighting system, and indoor/outdoor lighting system, a temperature control system (e.g., a thermostat), a shade/blind control system, a locking control system (e.g., door lock, window lock, etc.), and/or other automation devices.

As described herein, in some of the present embodiments, some or all of the user's network 408, the client device 404, 406, the first A/V recording and communication device 402, the first smart-home hub device 411, the sensors 414, and the automation devices 416 may be referred to as a first security system 422, which may be installed at a first property or premises. In addition, in some of the present embodiments, some or all of the user's network 409, the client device 405, 407, the second A/V recording and communication device 403, the second smart-home hub device 412, the sensors 418, and the automation devices 420 may be referred to as a second security system 424A, which may be installed at a second property or premises. In some of the present embodiments, some or all of the public network 431, one or more of the client devices 401, and one or more of the publicly-accessible security camera devices 433 may be referred to as a neighborhood security system 424B, which may be installed at one or more public locations.

Figure 13:
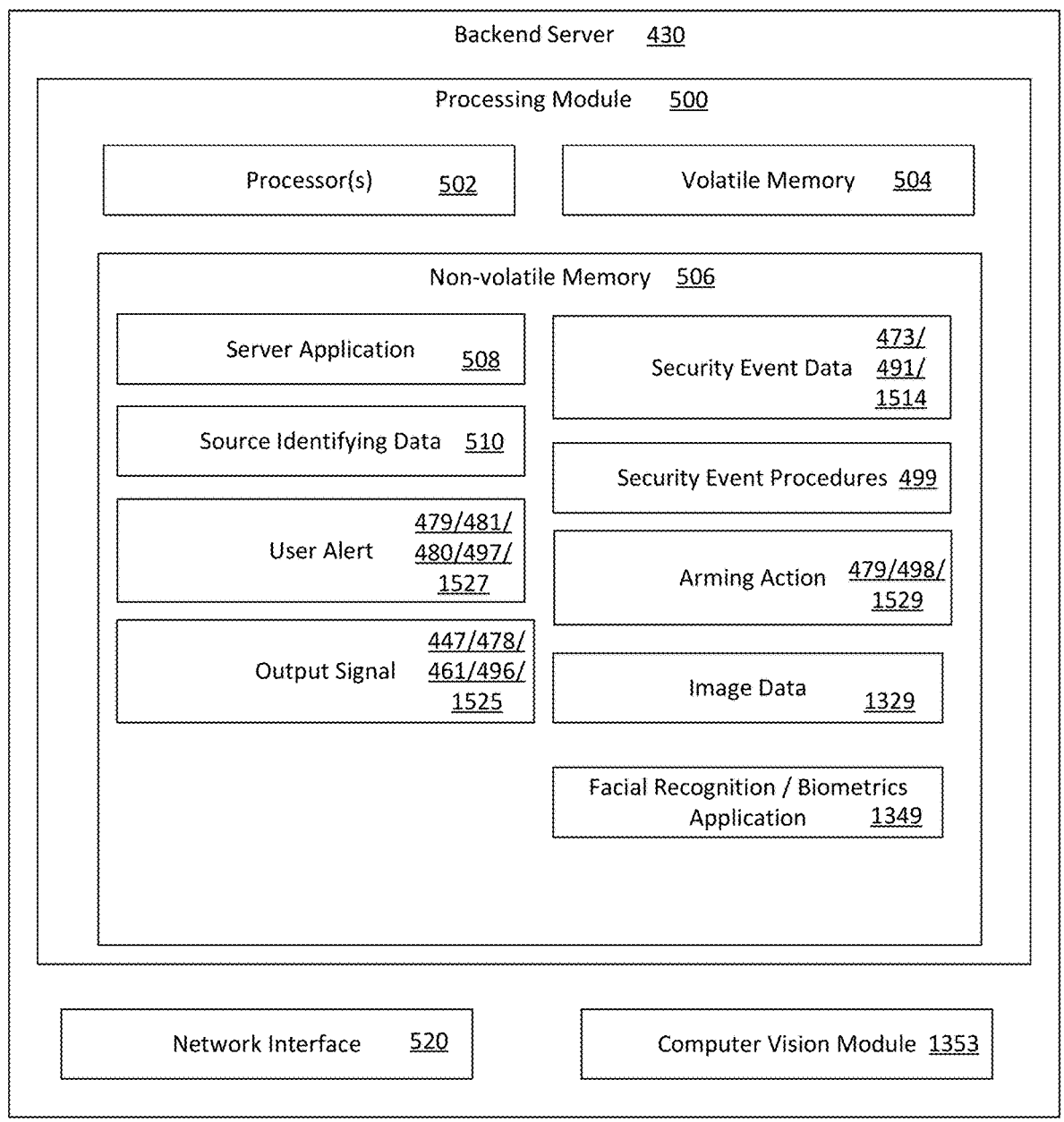
FIG. 13 is a functional block diagram illustrating one embodiment of a backend device according to various aspects of the present disclosure.

The first security system 422, the second security system 424A, and the neighborhood security system 424B may be part of a network of security systems. Although only the first security system 422, the second security system 424A, and the neighborhood security system 424B are included in the illustration of the system 400, this illustration is not intended to be limiting. In some embodiments, any number of security systems (one or more) may be incorporated into the network of security systems. For example, in an embodiment where the network of security systems includes each of the security systems in a given neighborhood, many of the homes in the neighborhood may have a security system, and as a result, the network of security systems may include the security systems from each of the homes that are part of the network of security systems (e.g., each of the homes that have security systems in the neighborhood that have "opted in" to the network of security systems). In addition, each of the security systems in the network of security systems may have their own security event procedures 499 that may be implemented in response to security events from any other security system in the network of security systems (FIG. 13). In addition, each of the security systems in the network of security systems may each have different security event procedures 499 in response to each of a variety of different security event data 473, 491, 1514 (FIG. 13).

As discussed above with reference to FIG. 8, the system 400 may also include one or more publicly-accessible security camera devices 433. At least one of the publicly-accessible security camera devices 433 may be placed at a public location to capture image data using a camera and/or audio data using a microphone. In some embodiments, at least one of the publicly-accessible security camera devices 433 may also each include a speaker that, together with the microphone, allows for two-way audio communication between a person remotely connected to the publicly-accessible security camera device 433 and a person in the vicinity of the publicly-accessible security camera device 433. In alternative embodiments, the publicly-accessible security camera devices 433 may be connected to the network (Internet/PSTN) 410 via a wired network (not shown), or connected directly to the network (Internet/PSTN) 410 without any intervening network.

With further reference to FIG. 8, the system 400 may also include various backend devices such as (but not limited to) storage devices 432, backend servers 430, and backend APIs 428 that may be in network communication with the first A/V recording and communication device 402, the second A/V recording and communication device 403, the publicly-accessible security camera devices 433, the first hub device 411, the second hub device 412, the client devices 401, 404, 405, 406, 407, the administrator device(s) 415, the sensors 414, 418, and/or the automation devices 416, 420. In some embodiments, the storage devices 432 may be a separate device from the backend servers 430 (as illustrated) or may be an integral component of the backend servers 430. The storage devices 432 may be similar in structure and/or function to the storage device 116 (FIG. 1). In addition, in some embodiments, the backend servers 430 and backend APIs 428 may be similar in structure and/or function to the server 118 and the backend API 120 (FIG. 1), respectively.

In various embodiments, initial setup and/or control of settings of at least one of the publicly-accessible security camera devices 433 may be configured by one or more administrators using one or more administrator device(s) 415. The administrator device(s) 415 may be similar to, or the same as, the client device(s) 114 (as described in FIG. 1). Administrators and/or administrator device(s) 415, however, may have advanced permissions with respect to the publicly-accessible security camera device 433 that the client device(s) 401, 404, 405, 406, and 407 (and users of the client device(s) 401, 404, 405, 406, and 407) may not have. Such advanced permissions may include (but not be limited to) deleting video footage recorded by the publicly-accessible security camera device 433, changing and resolving settings related to network connectivity, notifications, camera sensitivity, and/or software updates. In some embodiments, an administrator may approve or deny user requests for access to one or more of the publicly-accessible security camera devices 433.

With further reference to FIG. 8, audio and/or image data captured by the publicly-accessible security camera devices 433 may be transmitted to one or more of the storage device(s) 432, one or more of the backend server(s) 430, and/or one or more of the backend API(s) 428, as further discussed below. In various embodiments, image data may comprise image sensor data such as (but not limited to) exposure values and data regarding pixel values for a particular size grid. Further, image data may comprise converted image sensor data for standard image file formats such as (but not limited to) JPEG, JPEG 2000, TIFF, BMP, or PNG. In addition, image data may also comprise data related to video, where such data may include (but is not limited to) image sequences, frame rates, and the like. Moreover, image data may include data that is analog, digital, uncompressed, compressed, and/or in vector formats. Image data may take on various forms and formats as appropriate to the requirements of a specific application in accordance with the present embodiments.

In further reference to FIG. 8, in some embodiments, the backend server(s) 430 may use the image data to provide video footage to any of the client device(s) upon receipt of one or more requests for access that include a public access identifier, as further described below. The publicly-accessible security camera device(s) 433 may also be configured to perform automatic identification and data capture (AIDC), such as (but not limited to) at least one of biometrics, voice recognition, facial recognition, three-dimensional facial recognition, and/or skin texture analysis, to identify a person of interest and generate at least one alert (may also be referred to as a "notification"). For example, in some embodiments, the publicly-accessible security camera device(s) 433, the backend server(s) 430, and/or the backend API(s) 428 may perform facial recognition to determine if a person of interest is recognized. In various embodiments, the image data captured by the publicly-accessible security camera device(s) 433 may be processed to compare facial features to a database, such as (but not limited to) one or more criminal registries. Further, various members of the public may submit photos of a person of interest and be alerted when images of that person are captured by the publicly-accessible security camera device(s) 433. In further embodiments, one or more law enforcement agencies may also be alerted, such as through an alert sent to one or more law enforcement device(s)/network(s) 421, when a person of interest is detected by the publicly-accessible security camera device(s) 433. In some embodiments, one or more social network(s) 423 may be alerted and/or image data may be posted to such social network(s) 423. The social network(s) 423 may include any social media service or platform that uses computer-mediated tools that allow participants to create, share, and/or exchange information in virtual communities and/or networks, such as (but not limited to) social networking websites and/or applications running on participant devices. Non-limiting examples of social networks include Facebook, Twitter, Snapchat, and Nextdoor.

Figure 9:
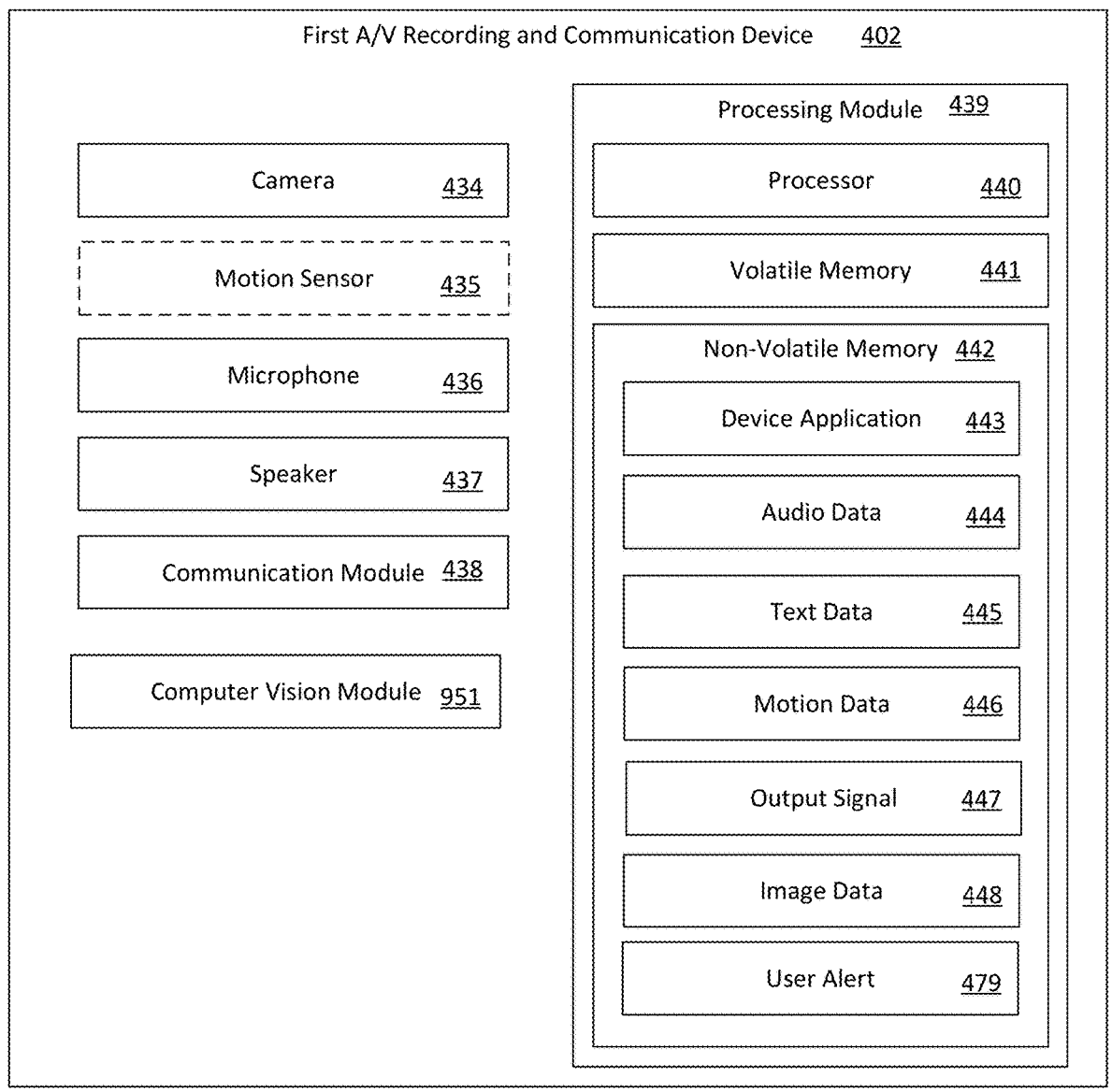
FIGS. 9 and 10 are functional block diagrams illustrating embodiments of A/V recording and communication devices according to various aspects of the present disclosure.

FIG. 9 is a functional block diagram illustrating an embodiment of the first A/V recording and communication device 402 according to various aspects of the present disclosure. The first A/V recording and communication device 402 may comprise a processing module 439 that is operatively connected to a camera 434, a microphone 436, a speaker 437, a motion sensor 435, a communication module 438, and a computer vision module 951. The processing module 439 may comprise a processor 440, volatile memory 441, and non-volatile memory 442 that includes a device application 443. In various embodiments, the device application 443 may configure the processor 440 to capture image data 448 using the camera 434, audio data 444 using the microphone 436, and/or motion data 446 using the camera 434 and/or the motion sensor 435. In some embodiments, the device application 443 may also configure the processor 440 to generate text data 445 describing the image data 448, such as in the form of metadata, for example. In some of the present embodiments, the device application 443 may configure the processor 440 to transmit the image data 448, the audio data 444, the motion data 446, and/or the text data 445 to the client device 404, 406, the first hub device 411, and/or the backend server 430 using the communication module 438.

In various embodiments, the device application 443 may also configure the processor 440 to generate and transmit an output signal 447 that may include the image data 448, the audio data 444, the text data 445, and/or the motion data 446. In some of the present embodiments, the output signal 447 may be transmitted to the backend server(s) 430 using the communication module 438, and the backend server(s) 430 may transmit (or forward) the output signal 447 to the client device 404, 406, 405, 407. In other embodiments, the output signal 447 may be transmitted directly to the client device 404, 406.

In further reference to FIG. 9, the image data 448 may comprise image sensor data such as (but not limited to) exposure values and data regarding pixel values for a particular sized grid. Further, the image data 448 may comprise converted image sensor data for standard image file formats such as (but not limited to) JPEG, JPEG 2000, TIFF, BMP, or PNG. In addition, the image data 448 may also comprise data related to the still image, video, or combination thereof, included in the image data 448. Such data may include (but is not limited to) image sequences, frame rates, and the like. Moreover, the image data 448 may include data that is analog, digital, compressed, uncompressed, and/or in vector formats.

The image data 448 may include still images, live video, and/or pre-recorded video. The image data 448 may be recorded by the camera 434 in a field of view of the camera 434. The processor 440 may be configured to transmit the image data 448 (e.g., as live streaming video) to the client devices 404, 406, the first hub device 411, and/or the backend server 430. The image data 448 may take on various forms and formats as appropriate to the requirements of a specific application in accordance with the present embodiments. As described herein, the term "record" may also be referred to as "capture" as appropriate to the requirements of a specific application in accordance with the present embodiments.

In further reference to FIG. 9, the motion data 446 may comprise motion sensor data generated in response to motion events. For example, in embodiments using a motion sensor 435, the motion data 446 may include an amount or level of a data type generated by the motion sensor 435. In some of the present embodiments, the motion data 446 may also comprise time-based and/or location-based information such as the time when a motion event is detected, the amount of time the motion event is detected and/or the location of the motion event in the field of view of the motion sensor 435 (e.g., Zones 1-5 (FIG. 6), the location within one of the Zones 1-5, and/or the proximity to the motion sensor 435). In other embodiments, dependent on the type of motion sensor 435 implemented in a given embodiment, the motion data 446 may include the data type (e.g., voltage) generated specific to the type of motion sensor 435 (e.g., PIR, microwave, acoustic, etc.). The motion data 446 may further include an estimated speed and/or direction data of the person and/or object that caused the motion event.

In some of the present embodiments, such as those where the first A/V recording and communication device 402 is similar to that of the A/V recording and communication doorbell 130 of FIGS. 3-4, the motion data 446 may be generated by the camera 434. In such embodiments, the first A/V recording and communication device 402 may not have a motion sensor 435 (as illustrated by the dashed lines around the motion sensor 435 in FIG. 9). As such, the detection of a motion event, the determination of whether a motion event is caused by the movement of a person in a field of view of the first A/V recording and communication device 402, and/or the speed and/or location of a person and/or object in the field of view of the first A/V recording and communication device 402 may be determined using the motion data 446 generated by the camera 434. In such embodiments, the motion data 446 may include differences between successive frames (e.g., pixels) of the image data 448, where the differences may be the result of motion in the field of view of the camera 434, for example.

In further reference to FIG. 9, the computer vision module 951 may include any of the components (e.g., hardware) and/or functionality described herein with respect to computer vision, including, without limitation, one or more cameras, sensors, and/or processors. In some embodiments, the computer vision module 951 may be substantially similar to the computer vision module 163 in FIG. 3. In some embodiments, the camera 434, the microphone 436, and/or the processing module 439, may be components of the computer vision module 951. In some embodiments the functions of the computer vision module 951 may be off-loaded to the first smart-home hub device 411 (FIG. 11), which may include a computer vision module 1151 in addition to (or instead of) the computer vision module 951 of the first A/V recording and communication device 402. Further, in some embodiments the functions of the computer vision module 951 may be offloaded to the backend server 430 (FIG. 13), which may include a computer vision module 1353 in addition to (or instead of) the computer vision module 951 of the first A/V recording and communication device 402.

With further reference to FIG. 9, in some of the present embodiments, the first A/V recording and communication device 402 may generate a user alert 479. The user alert 479 may be generated, for example, in response to a security event data, such as motion event in the field of view of the first A/V recording and communication device 402 (e.g., the movement of a person, animal, and/or object). The user alert 479 may be programmed to include information representative of the motion event, such as the motion data 446, the image data 448, the audio data 444, and/or the text data 445 (e.g., for display on the client device 404, 406 and/or the client devices associated with other A/V recording and communication devices or security systems, such as the client devices 405, 407).

Figure 10:
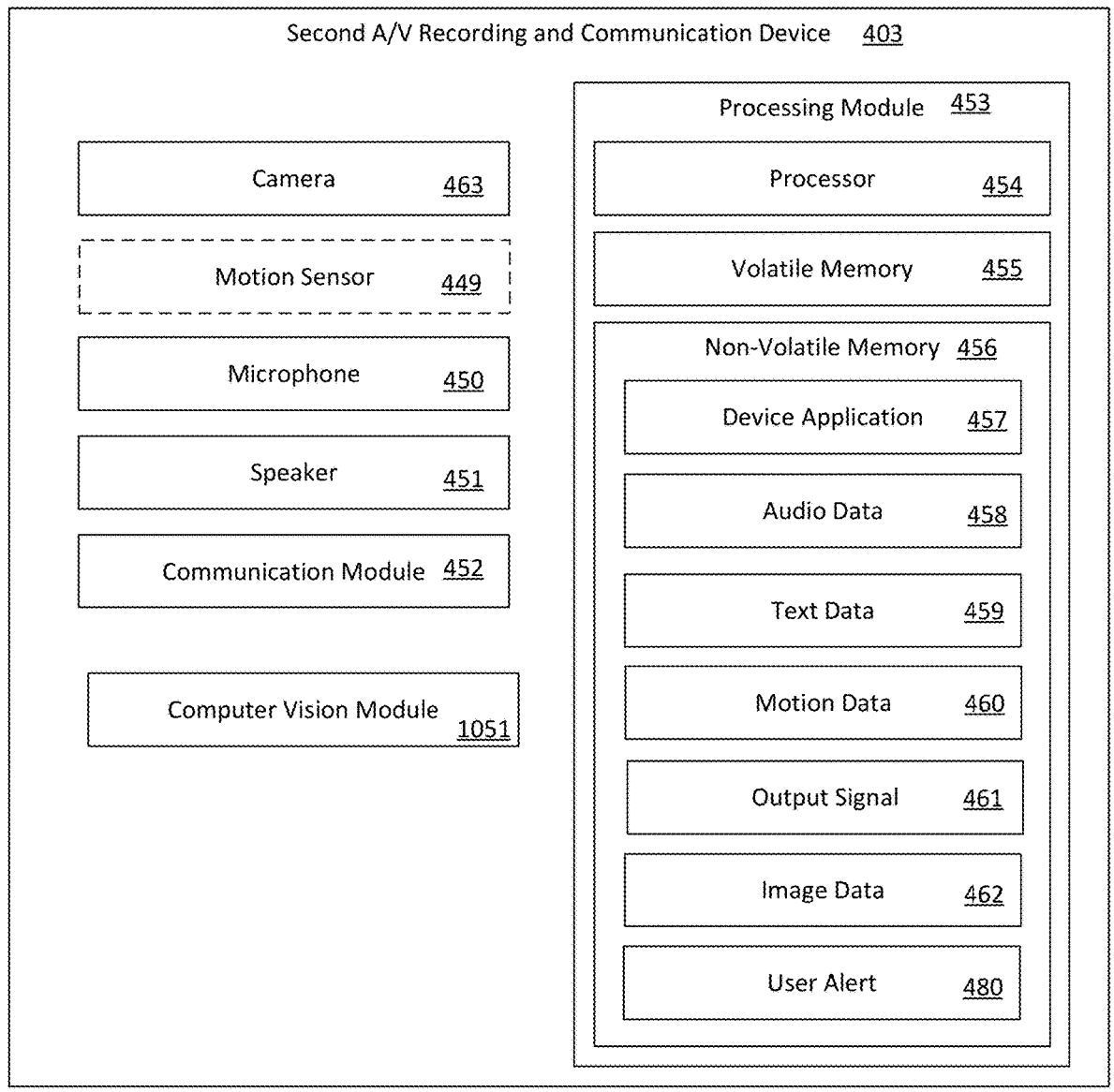

FIG. 10 is a functional block diagram illustrating an embodiment of the second A/V recording and communication device 403 according to various aspects of the present disclosure. The second A/V recording and communication device 403 may comprise a processing module 453 that is operatively connected to a camera 463, a microphone 450, a speaker 451, a motion sensor 449, a communication module 452, and a computer vision module 1051. The processing module 453 may comprise a processor 454, volatile memory 455, and non-volatile memory 456 that includes a device application 457. In various embodiments, the device application 457 may configure the processor 454 to capture image data 462 using the camera 463, audio data 458 using the microphone 450, and/or motion data 460 using the camera 463 and/or the motion sensor 449. In some embodiments, the device application 457 may also configure the processor 454 to generate text data 459 describing the image data 462, such as in the form of metadata, for example. In some of the present embodiments, the device application 457 may configure the processor 454 to transmit the image data 462, the audio data 458, the motion data 460, and/or the text data 459 to the client device 405, 407, the second hub device 412, and/or the backend server 430 using the communication module 452.

In various embodiments, the device application 457 may also configure the processor 454 to generate and transmit an output signal 461 that may include the image data 462, the audio data 458, the text data 459, and/or the motion data 460. In some of the present embodiments, the output signal 461 may be transmitted to the backend server(s) 430 using the communication module 452, and the backend server(s) 430 may transmit (or forward) the output signal 461 to the client device 404, 405, 406, 407. In other embodiments, the output signal 461 may be transmitted directly to the client device 405, 407.

In further reference to FIG. 10, the image data 462 may comprise image sensor data such as (but not limited to) exposure values and data regarding pixel values for a particular sized grid. Further, the image data 462 may comprise converted image sensor data for standard image file formats such as (but not limited to) JPEG, JPEG 2000, TIFF, BMP, or PNG. In addition, the image data 462 may also comprise data related to the still image, video, or combination thereof, included in the image data 462. Such data may include (but is not limited to) image sequences, frame rates, and the like. Moreover, the image data 462 may include data that is analog, digital, compressed, uncompressed, and/or in vector formats.

The image data 462 may include still images, live video, and/or pre-recorded video. The image data 462 may be recorded by the camera 463 in a field of view of the camera 463. The processor 454 may be configured to transmit the image data 462 (e.g., as live streaming video) to the client devices 405, 407, the second hub device 412, and/or the backend server 430. The image data 462 may take on various forms and formats as appropriate to the requirements of a specific application in accordance with the present embodiments. As described herein, the term "record" may also be referred to as "capture" as appropriate to the requirements of a specific application in accordance with the present embodiments.

In further reference to FIG. 10, the motion data 460 may comprise motion sensor data generated in response to motion events. For example, in embodiments using a motion sensor 449, the motion data 460 may include an amount or level of a data type generated by the motion sensor 449. In some of the present embodiments, the motion data 460 may also comprise time-based and/or location-based information such as the time when a motion event is detected, the amount of time the motion event is detected and/or the location of the motion event in the field of view of the motion sensor 449 (e.g., Zones 1-5 (FIG. 6), the location within one of the Zones 1-5, and/or the proximity to the motion sensor 449). In other embodiments, dependent on the type of motion sensor 449 implemented in a given embodiment, the motion data 460 may include the data type (e.g., voltage) generated specific to the type of motion sensor 449 (e.g., PIR, microwave, acoustic, etc.). The motion data 460 may further include an estimated speed and/or direction data of the person and/or object that caused the motion event.

In some of the present embodiments, such as those where the second A/V recording and communication device 403 is similar to that of the A/V recording and communication doorbell 130 of FIGS. 3-4, the motion data 460 may be generated by the camera 463. In such embodiments, the second A/V recording and communication device 403 may not have a motion sensor 449 (as illustrated by the dashed lines around the motion sensor 449 in FIG. 10). As such, the detection of a motion event, the determination of whether a motion event is caused by the movement of a person in a field of view of the second A/V recording and communication device 403, and/or the speed and/or location of a person and/or object in the field of view of the second A/V recording and communication device 403 may be determined using the motion data 460 generated by the camera 463. In such embodiments, the motion data 460 may include differences between successive frames (e.g., pixels) of the image data 462, where the differences may be the result of motion in the field of view of the camera 463, for example.

In further reference to FIG. 10, the computer vision module 1051 may include any of the components (e.g., hardware) and/or functionality described herein with respect to computer vision, including, without limitation, one or more cameras, sensors, and/or processors. In some embodiments, the computer vision module 1051 may be substantially similar to the computer vision module 163 in FIG. 3. In some embodiments, the camera 463, the microphone 450, and/or the processing module 453, may be components of the computer vision module 1051. In some embodiments the functions of the computer vision module 1051 may be offloaded to the second smart-home hub device 412 (FIG. 12), which may include a computer vision module 1251 in addition to (or instead of) the computer vision module 1051 of the second A/V recording and communication device 403. Further, in some embodiments the functions of the computer vision module 1051 may be offloaded to the backend server 430 (FIG. 13), which may include a computer vision module 1353 in addition to (or instead of) the computer vision module 1051 of the second A/V recording and communication device 403.

With further reference to FIG. 10, in some of the present embodiments, the second A/V recording and communication device 403 may generate a user alert 480. The user alert 480 may be generated, for example, in response to a motion event in the field of view of the second A/V recording and communication device 403 (e.g., the movement of a person, animal, and/or object). The user alert 480 may be programmed to include information representative of the motion event, such as the motion data 460, the image data 462, the audio data 458, and/or the text data 459 (e.g., for display on the client device 405, 407 and/or the client devices associated with other A/V recording and communication devices or security systems, such as the client devices 404, 406).

Figure 11:
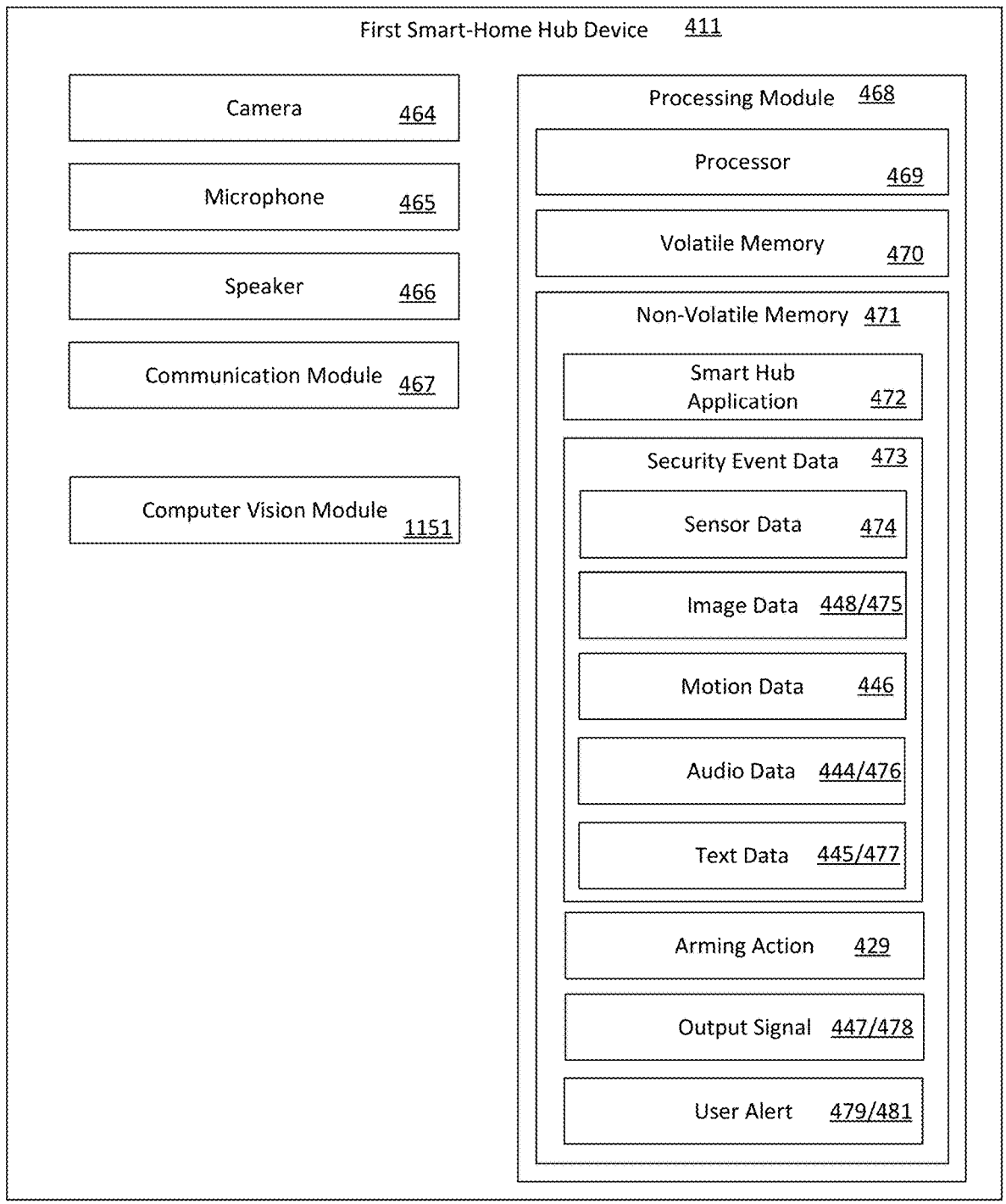
FIGS. 11 and 12 are functional block diagrams illustrating embodiments of smart-home hub devices according to various aspects of the present disclosure.

FIG. 11 is a functional block diagram illustrating an embodiment of the first smart-home hub device 411 (alternatively referred to herein as "first hub device 411") according to various aspects of the present disclosure. The first hub device 411 may be, for example, one or more of a Wi-Fi hub, a smart-home hub, a hub of a home security/alarm system, a gateway device, a hub for a legacy security/alarm system (e.g., a hub for connecting a pre-existing security/alarm system to the network (Internet/PSTN) 410 for enabling remote control of the hub device), and/or another similar device. The first hub device 411 may comprise a processing module 468 that is operatively connected to a camera 464, a microphone 465, a speaker 466, a communication module 467, and a computer vision module 1151. In some embodiments, one or more of the camera 464, the microphone 465, and the speaker 466 may be omitted from the first hub device 411. The processing module 468 may comprise a processor 469, volatile memory 470, and non-volatile memory 471 that includes a smart-home hub application 472. In various embodiments, the smart-home hub application 472 may configure the processor 469 to receive sensor data 474 from the sensors 414 and/or the automation devices 416. For example, the sensor data 474 may include a current state (e.g., opened/closed for door and window sensors, motion detected for motion sensors, living room lights on/off for a lighting automation system, etc.) of each of the sensors 414 and/or the automation devices 416. In various embodiments, the smart-home hub application 472 may further configure the processor 469 to capture image data 475 using the camera 464 and/or audio data 476 using the microphone 465. In some embodiments, the smart-home hub application 472 may also configure the processor 469 to generate text data 477 describing the security event data 473, the occupancy data, and/or the arming status of the security system, such as in the form of metadata, for example. In other embodiments, the text data 477 describing the image data 475 may be generated by a user using the client device 404, 406 associated with the first hub device 411.

The smart-home hub application 472 may further configure the processor 469 to generate the user alert 481. The user alert 481 may include the security event data 473 described herein. The user alert 481 may also, in some embodiments, include information from the user alert 479 received from the first A/V recording and communication device 402.

In addition, the smart-home hub application 472 may configure the processor 469 to receive the image data 448, the audio data 444, the text data 445, the motion data 446, and/or the user alert 479 from the first A/V recording and communication device 402 using the communication module 467. In various embodiments, the smart-home hub application 472 may also configure the processor 469 to generate and transmit an output signal 478 that may include the image data 448, 475, the audio data 444, 476, the text data 445, 477, the motion data 446, the sensor data 474, the user alert 479, 481, and/or the arming action 429. In some of the present embodiments, the output signal 478 may be transmitted to the backend server(s) 430 using the communication module 467. The backend server 430 may analyze the content of the output signal 447/478, and determine which network(s) of security systems (e.g., home and/or public security systems), in which the first security system 422 is included or associated with, should receive notification of the security event. The backend server 430 may also determine a security event procedure for each of the security systems in the determined network(s). For example, the backend server 430 may transmit a portion of or the entire content of the output signal 447/478 to the client devices 404, 406 and/or the client devices 405, 407 (e.g., in embodiments where the client devices 405, 407 are associated with a security system in the determined network(s) of security systems). In other embodiments, the output signal 447/478 may be transmitted directly to the client device 404, 406.

In some of the present embodiments, some or all of the sensor data 474, the image data 448, 475, the motion data 446, the audio data 444, 476, and the text data 445, 477 may be included in the security event data 473. The security event data 473 may comprise all of the data generated in response to a security event. For example, if a person breaks into a home, the security event data 473 may include the sensor data 474 generated by the door or window sensors that were breached, the image data 448 generated by the first A/V recording and communication device 402 at the time of the security event, the motion data 446 generated by the motion sensors of the sensor 414 and/or the motion sensor 435 of the first A/V recording and communication device 402, the audio data 476 recorded by the first hub device 411, and/or the text data 477 describing the security event based on the sensor data 474, the image data 448, the motion data 446, and/or the audio data 476.

In some of the present embodiments, the smart-home hub application 472 may configure the processor 469 to generate the arming action 429, or receive the arming action 429 from the backend server 430. In some embodiments, generating or executing the arming action 429 may include arming/disarming the first security system 422 controlled by the first hub device 411. For example, the arming action 429 may include a disarmed, an armed stay, armed away, armed vacation, or other armed mode for the first security system 422. In some of the present embodiments, the first hub device 411 may generate or execute the arming action 429 in response to receiving the arming action 429 over the user's network 408 and/or the network (Internet/PSTN) 410 (e.g., from the backend server 430 and/or the client device 404, 406). In some embodiments, the smart-home hub application 472 may configure to the processor 469 to transmit information representative of the arming action 429 to the backend server 430 and/or the client device 404, 406. For example, the information representative of the arming action 429 may include the arming status of the first security system 422 (e.g., armed away, armed stay, disarmed, etc.). The smart-home hub application 472 may also configure the processor 469 to monitor the sensors 414, the automation devices 416, and/or the first A/V recording and communication device(s) 402 according to the arming action 429.

The arming actions 429, as described herein, may include an armed stay, an armed away, an armed vacation, a disarmed mode, and/or other modes, such as a custom mode of the user. In the armed stay mode, the sensors 414 inside the property (e.g., motion sensors) may be disarmed while the sensors 414 and/or the first A/V recording and communication devices 402 outside and along the perimeter of the property (e.g., door sensors, window sensors, security cameras, etc.) may be armed. In addition, during the armed stay mode, at least one of the automation devices 416 (e.g., an outdoor lighting automation system) may be activated between certain hours, such as 6:00 p.m. and 4:00 a.m. In an armed away mode, the sensors 414 inside the property (e.g., the motion sensors), the sensors 414 outside and along the perimeter of the property (e.g., door sensors, window sensors, etc.), and/or the first A/V recording and communication devices 402 (e.g., security cameras, floodlight cameras, etc.)

may be armed. In addition, during an armed away mode, one or more of the automation devices 416 (e.g., interior and/or exterior lighting automation systems) may be activated according to an activation schedule (e.g., interior lights on from 5:00 p.m. to 9:00 p.m., exterior lights on from 6:00 p.m. to 8:00 p.m., blinds/shades opened from 12:00 p.m. to 5:00 p.m. and closed from 5:00 p.m. to 4:00 a.m., etc.) in order to provide an indication that somebody is home, even when they are not. In an armed vacation mode, the sensors 414, the automation devices 416, and/or the first A/V recording and communication devices 402 may be armed and disarmed similar to the armed away mode, however, any alerts and security events may also be sent to neighbors and/or law enforcement. In a disarmed mode, all of the sensors 414 and/or the automation devices 416 may be deactivated (other than the automation devices 416 in use by the users separate from an arming mode of the first security system 422). However, in a disarmed mode, one or more of the first A/V recording and communication devices 402 (e.g., security cameras, floodlight cameras, video doorbells, etc.) may be in an active state for detecting motion and/or recording activity in the field of view of one or more of the first A/V recording and communication devices 402. In a custom mode, the user/owner of the first security system 422 may configure each of the sensors 414, the automation devices 416, and/or the first A/V recording and communication devices 402. For example, in a custom mode, "Summer," the user/owner may arm each of the door sensors but disable the window sensors (e.g., where windows may be left open for air flow). In addition, the user/owner may activate each of the first A/V recording and communication devices 402 in the back yard to record between 8:00 am and 5:00 p.m. (e.g., because the kids may regularly play in the back yard during the summer months).

In further reference to FIG. 11, the sensor data 474 from the sensors 414 and/or the automation devices 416 may include, without limitation, a door open/close status from a door sensor (e.g., located at a front door, a side door, a back door, a door inside the home, etc.), a window open/close status from a window sensor, a garage door open/close status from a tilt sensor, an indoor/outdoor temperature from a thermometer or other temperature sensing device (e.g., thermostat), a carbon monoxide level from a carbon monoxide sensor, a light on/off and/or intensity status from an automated lighting system, a fire alarm status from a fire alarm, motion data from a motion sensor, glass break information from a glass break sensor, a humidity level from a humidity sensor, weather information from a home weather station, lock/unlock status of door/window/garage locks, and/or blinds/shades opened/closed status from a blind/shade automation system. The sensor data 474 may be generated in response to a sensor trigger (e.g., a door opening, a window shutting, etc.), or may be consistently and/or periodically generated to determine a status of the sensors 414 and/or the automation devices 416 and whether or not the status is indicative of a sensor trigger (e.g., a temperature above/below a threshold temperature).

With further reference to FIG. 11, the sensor data 474 may activate the sensor trigger. The sensor trigger may be an event and/or action that takes place that causes the sensors 414 and/or the automation devices 416 to generate the sensor data 474. In response to sensor triggers, the sensor data 474 may be generated by the sensor 414 and/or the automation devices 416 representative of the sensor trigger. The sensor data 474 generated in response to the sensor trigger may be analyzed by the first hub device 411 to determine a proper action based on the sensor trigger, such as transmitting the security event data 473 to the backend server 430 and/or the client device 404, 406. In addition, the sensor trigger may activate the first hub device 411 to activate or alter the status of the sensors 414 (e.g., by arming the door and window sensors), the automation devices 416 (e.g., by turning on lights of the automated lighting system), and/or the first A/V recording and communication device 402 (and/or other A/V recording and communication devices at the property) (e.g., by activating the camera 434 of the first A/V recording and communication device 402 to record the image data 448).

In some of the present embodiments, the first hub device 411 may analyze the sensor data 474, the image data 448, 475, the motion data 446, and/or the audio data 444, 476 to determine occupancy data for the first property. For example, the sensor data 474 may include motion data from motion sensors of the sensors 414 interior to the property and/or data indicative of a light switch interior to the home being turned on/off within the last 10 seconds, 20 seconds, etc. from a lighting automation system of the automation devices 416, the image data 448, 475 may include the presence of person(s) (e.g., based on an analysis using computer vision), the motion data 446 may include an indication of the presence of persons interior to the home (e.g., in embodiments where one of the first A/V recording and communication devices 402 is indoors), and/or the audio data 444, 476 may include voices, which may provide an indication of the presence of person(s). As a result, the first hub device 411 may analyze the sensor data 474, the image data 448, 475, the motion data 446, and/or the audio data 444, 476 to determine the occupancy data. In some of the present embodiments, the occupancy data may be a binary determination, such as occupied and not occupied. In addition, in some embodiments, the occupancy data may also include an estimate of how many people and/or animals are present and/or the location of the people and/or animals at the property (e.g., upstairs, downstairs, in the living room, etc.).

Some non-limiting examples of sensor triggers include, for example, if the sensor 414 is a door or window sensor, the door or window opening or closing. When the door or window is closed, and then is opened, this may be a sensor trigger that results in the door or window sensor generating sensor data 474 representative of the sensor trigger, for example. If the sensor 414 is a smoke detector or other sensor type that activates based on threshold amounts, for example, the sensor trigger may be the threshold amount being reached. For example, the smoke detector may only activate when the smoke levels reach a certain threshold, and when this threshold is reached, the sensor trigger may be said to have occurred, and sensor data 474 may be generated in response. If the sensor 414 is a thermometer, for example, a threshold temperature being reached may be the sensor trigger. In another example, if the sensor 414 is a motion sensor, the sensor trigger may be a threshold amount of detected motion.

In alternative embodiments, the sensor data 474 (including data representative of the sensor trigger) may be received by the first A/V recording and communication device 402 rather than, or in addition to, the first hub device 411. For example, some environments may not have a smart-home hub device. In these environments, the first A/V recording and communication device 402 may perform at least some of the functions of the first hub device 411 described herein, including receiving, processing, and/or transmitting the sensor data 474. For example, the sensors 414 and/or the automation devices 416 may be in communication with the first A/V recording and communication device 402, rather than, or in addition to, the first hub device 411.

In further reference to FIG. 11, the computer vision module 1151 may include any of the components (e.g., hardware) and/or functionality described herein with respect to computer vision, including, without limitation, one or more cameras, sensors, and/or processors. In some embodiments, the computer vision module 1151 may be substantially similar to the computer vision module 163 in FIG. 3. In some embodiments, the camera 464, the microphone 465, and/or the processing module 468, may be components of the computer vision module 1151. In some embodiments the functions of the computer vision module 1151 may be offloaded to the backend server 430 (FIG. 13), which may include a computer vision module 1353 in addition to (or instead of) the computer vision module 1151 of the first smart-home hub device 411.

Figure 12:
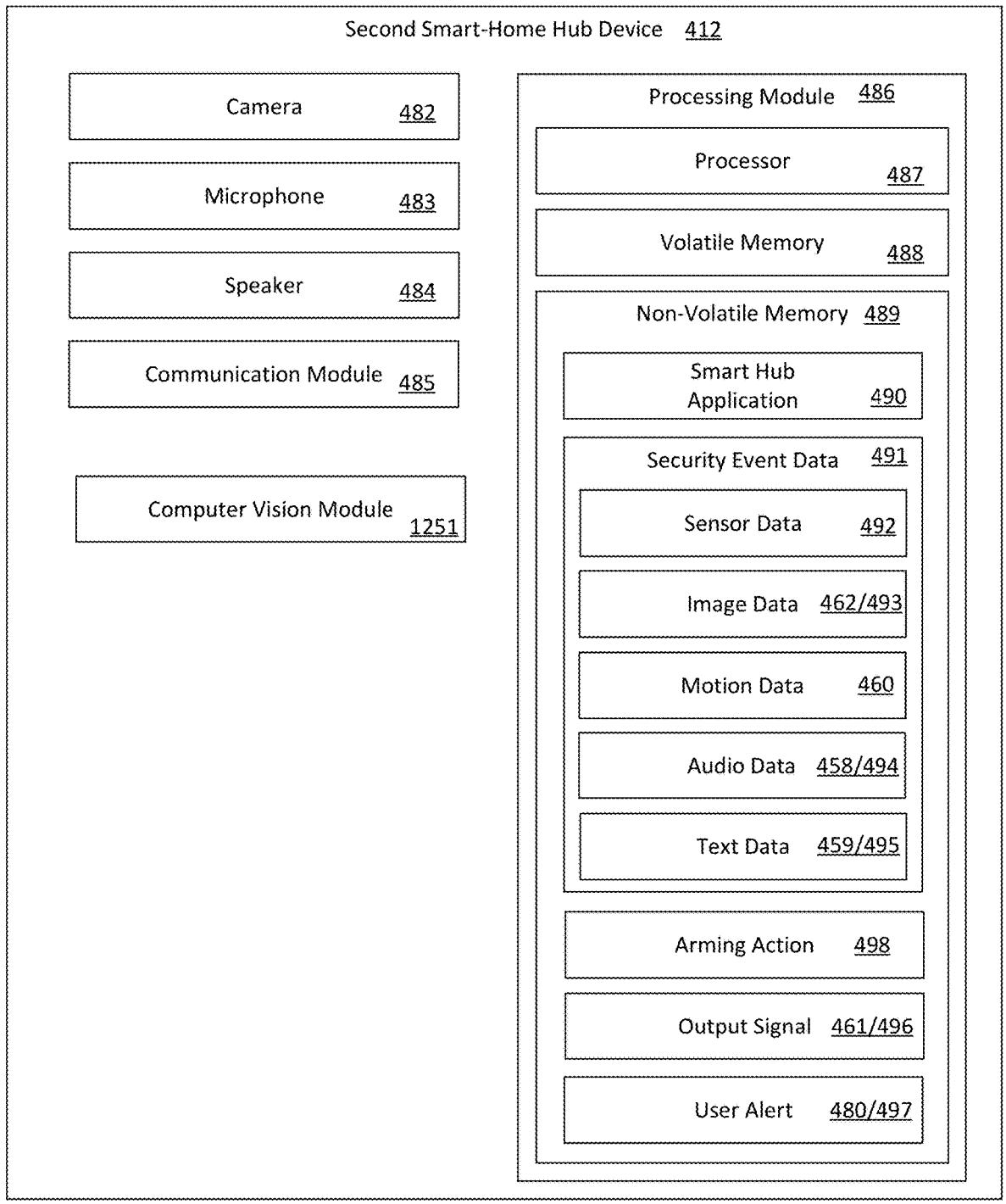

FIG. 12 is a functional block diagram illustrating an embodiment of the second smart-home hub device 412 (alternatively referred to herein as the second hub device 412) according to various aspects of the present disclosure. The second hub device 412 may be, for example, one or more of a Wi-Fi hub, a smart-home hub, a hub of a home security/alarm system, a gateway device, a hub for a legacy security/alarm system (e.g., a hub for connecting a pre-existing security/alarm system to the network (Internet/PSTN) 410 for enabling remote control of the hub device), and/or another similar device. The second hub device 412 may comprise a processing module 486 that is operatively connected to a camera 482, a microphone 483, a speaker 484, a communication module 485, and a computer vision module 1251. In some embodiments, one or more of the camera 482, the microphone 483, and the speaker 484 may be omitted from the second hub device 412. The processing module 486 may comprise a processor 487, volatile memory 488, and non-volatile memory 489 that includes a smart-home hub application 490. In various embodiments, the smart-home hub application 490 may configure the processor 487 to receive sensor data 492 from the sensors 418 and/or the automation devices 420. For example, the sensor data 492 may include a current state (e.g., opened/closed for door and window sensors, motion detected for motion sensors, kitchen lights on/off, etc.) of each of the sensors 418 and/or the automation devices 420. In various embodiments, the smart-home hub application 490 may further configure the processor 487 to capture image data 493 using the camera 482 and/or audio data 494 using the microphone 483. In some embodiments, the smart-home hub application 490 may also configure the processor 487 to generate text data 495 describing the security event data 491, occupancy data, and/or the arming status of the security system, such as in the form of metadata, for example. In other embodiments, the text data 495 describing the image data 493 may be generated by a user using the client device 405, 407 associated with the second hub device 412.

The smart-home hub application 490 may further configure the processor 487 to generate the user alert 497. The user alert 497 may include the security event data 491 described herein. The user alert 497 may also, in some embodiments, include the information from the user alert 480 received from the second A/V recording and communication device 403.

In addition, the smart-home hub application 490 may configure the processor 487 to receive the image data 462, the audio data 458, the text data 459, the motion data 460, and/or the user alert 480 from the second A/V recording and communication device 403 using the communication module 485. In various embodiments, the smart-home hub application 490 may also configure the processor 487 to generate and transmit an output signal 496 that may include the image data 462, 493, the audio data 458, 494, the text data 459, 495, the motion data 460, the sensor data 492, the user alert 480, 497, and/or the arming action 498. In some of the present embodiments, the output signal 496 may be transmitted to the backend server(s) 430 using the communication module 485, and the backend server 430 may transmit the output signal 496 to the client device 405, 407 and/or the client device 404, 406 (e.g., in embodiments where the client device 404, 406 are associated with a security system in the network of security systems).

The backend server 430 may analyze the content of the output signal 461/496, and determine which network(s) of security systems (e.g., home/private and public security systems), in which the second security system 424A is included or associated with, should receive notification of the security event. The backend server 430 may also determine a security event procedure for each of the security systems in the determined network(s). For example, the backend server 430 may transmit a portion of or the entire content of the output signal 461/496 to the client devices 405, 407 and/or the client devices 404, 406 (e.g., in embodiments where the client devices 404, 406 are associated with a security system in the determined network(s) of security systems). In other embodiments, the output signal 461/496 may be transmitted directly to the client device 405, 407.

In some of the present embodiments, some or all of the sensor data 492, the image data 462, 493, the motion data 460, the audio data 458, 494, and the text data 459, 495 may be included in the security event data 491. The security event data 491 may comprise all of the data generated in response to a security event. For example, if a person breaks into a home, the security event data 491 may include the sensor data 492 generated by the door or window sensors that were breached, the image data 493 generated by the second A/V recording and communication device 403 at the time of the security event, the motion data 460 generated by the motion sensors of the sensor 418 and/or the motion sensor 449 of the second A/V recording and communication device 403, the audio data 494 recorded by the second hub device 412, and/or the text data 495 describing the security event based on the sensor data 492, the image data 462, the motion data 460, and/or the audio data 494.

In some of the present embodiments, the smart-home hub application 490 may configure the processor 487 to generate the arming action 498, or receive the arming action 498 from the backend server 430. In some embodiments, generating or executing the arming action 498 may include arming/disarming the second security system 424A controlled by the second hub device 412. For example, the arming action 498 may include a disarmed, an armed stay, armed away, armed vacation, or other mode for the second security system 424A. In some of the present embodiments, the second hub device 412 may generate or execute the arming action 498 in response to receiving the arming action 498 over the user's network 409 and/or the network (Internet/PSTN) 410 (e.g., from the backend server 430 and/or the client device 405, 407). In some embodiments, the smart-home hub application 490 may configure to the processor 487 to transmit information representative of the arming action 498 to the backend server 430 and/or the client device 405, 407. For example, the information representative of the arming action 498 may include the arming status of the second security system 424A (e.g., armed away, armed stay, disarmed, etc.). The smart-home hub application 490 may also configure the processor 487 to monitor the sensors 418, the automation devices 420, and/or the second A/V recording and communication device(s) 403 according to the arming action 498.

The arming actions 498, as described herein, may include an armed stay, an armed away, an armed vacation, a disarmed mode, and/or other modes, such as custom mode of the user. In the armed stay mode, the sensors 418 inside the property (e.g., motion sensors) may be disarmed while the sensors 418 and/or the second A/V recording and communication devices 403 outside and along the perimeter of the property (e.g., door sensors, window sensors, security cameras, etc.) may be armed. In addition, during the armed stay mode, at least one of the automation devices 420 (e.g., an outdoor lighting automation system) may be activated between certain hours, such as 6:00 p.m. and 4:00 a.m. In an armed away mode, the sensors 418 inside the property (e.g., the motion sensors), the sensors 418 outside and along the perimeter of the property (e.g., door sensors, window sensors), and/or the second A/V recording and communication devices 403 (e.g., security cameras, video doorbells, spotlight cameras, etc.) may be armed. In addition, during an armed away mode, one or more of the automation devices 420 (e.g., interior and/or exterior lighting automation systems) may be activated according to an activation schedule (e.g., interior lights on from 5:00 p.m. to 9:00 p.m., exterior lights on from 6:00 p.m. to 8:00 p.m., blinds/shades opened from 12:00 p.m. to 5:00 p.m. and closed from 5:00 p.m. to 4:00 a.m., etc.) in order to provide an indication that somebody is home, even when they are not. In an armed vacation mode, the sensors 418, the automation devices 420, and/or the second A/V recording and communication devices 403 may be armed and disarmed similar to the armed away mode, however, any alerts and security events may also be sent to neighbors and/or law enforcement. In a disarmed mode, all of the sensors 418 and/or the automation devices 420 may be deactivated (except for the automation device 420 in use by the user separate from the arming mode of the second security system 424A). However, in a disarmed mode, one or more of the second A/V recording and communication devices 403 (e.g., security cameras, floodlight cameras, video doorbells, etc.) may be in an active state for detecting motion and/or recording activity in the field of view of one or more of the second A/V recording and communication devices 403. In a custom mode, the user/owner of the second security system 424A may configure each of the sensors 418, the automation devices 420, and/or the second A/V recording and communication devices 403. For example, in a custom mode, "Keep Cool at Home," the user/owner may arm each of the door sensors and the window sensors. In addition, the user/owner may deactivate each of the motion sensors of the sensors 418 inside of the house (e.g., because the user/owner may be inside the home). In addition, the thermostat of the automation devices 420 may be set to 72 degrees (e.g., to keep cool in the heat) and the blinds/shades automation system of the automation devices 420 may be set to a closed state (e.g., to keep direct sunlight out of the house).

In further reference to FIG. 12, the sensor data 492 from the sensors 418 and/or the automation devices 420 may include, without limitation, a door open/close status from a door sensor (e.g., located at a front door, a side door, a back door, a door inside the home, etc.), a window open/close status from a window sensor, a garage door open/close status from a tilt sensor, an indoor/outdoor temperature from a thermometer or other temperature sensing device (e.g., thermostat), a carbon monoxide level from a carbon monoxide sensor, a light on/off and/or intensity status from an automated lighting system, a fire alarm status from a fire alarm, motion data from a motion sensor, glass break information from a glass break sensor, a humidity level from a humidity sensor, weather information from a home weather station, lock/unlock status of door/window/garage locks, and/or blinds/shades opened/closed status from a blind/shade automation system. The sensor data 492 may be generated in response to a sensor trigger (e.g., a door opening, a window shutting, etc.), or may be consistently and/or periodically generated to determine a status of the sensors 418 and/or the automation devices 420 and whether or not the status is indicative of a sensor trigger (e.g., a temperature above/below a threshold temperature).

With further reference to FIG. 12, the sensor trigger may activate the generation of the sensor data 492. The sensor trigger may be an event and/or action that takes place that causes the sensors 418 and/or the automation devices 420 to generate the sensor data 492. In response to sensor triggers, the sensor data 492 may be generated by the sensors 418 and/or the automation devices 420 representative of the sensor trigger. The sensor data 492 generated in response to the sensor trigger may be analyzed by the second hub device 412 to determine a proper action based on the sensor trigger, such as transmitting the security event data 491 to the backend server 430 and/or the client device 405, 407. In addition, the sensor trigger may activate the second hub device 412 to activate or alter the status of the sensors 418 (e.g., by arming the door and window sensors), the automation devices 420 (e.g., by turning on lights of the automated lighting system), and/or the second A/V recording and communication device 403 (and/or other A/V recording and communication devices at the property) (e.g., by activating the camera 463 of the second A/V recording and communication device 403 to record the image data 462).

Some non-limiting examples of sensor triggers include, for example, if the sensor 418 is a door or window sensor, the door or window opening or closing. When the door or window is closed, and then is opened, this may be a sensor trigger that results in the door or window sensor generating sensor data 492 representative of the sensor trigger, for example. If the sensor 418 is a smoke detector or other sensor type that activates based on threshold amounts, for example, the sensor trigger may be the threshold amount being reached. For example, the smoke detector may only activate when the smoke levels reach a certain threshold, and when this threshold is reached, the sensor trigger may be said to have occurred, and sensor data 492 may be generated in response. If the sensor 418 is a thermometer, for example, a threshold temperature being reached may be the sensor trigger. In another example, if the sensor 418 is a motion sensor, the sensor trigger may be a threshold amount of detected motion.

In some of the present embodiments, the second hub device 412 may analyze the sensor data 492, the image data 462, 493, the motion data 460, and/or the audio data 458, 494 to determine occupancy data for the second property. For example, the sensor data 492 may include motion data from motion sensors of the sensors 418 interior to the property and/or data indicative of a light switch interior to the home being turned on/off within the last 10 seconds, 20 seconds, etc. from a lighting automation system of the automation devices 420, the image data 462, 493 may include the presence of person(s) (e.g., based on an analysis using computer vision), the motion data 460 may include an indication of the presence of persons interior to the home (e.g., in embodiments where one of the second A/V recording and communication devices 403 is indoors), and/or the audio data 458, 494 may include voices, which may provide an indication of the presence of person(s). As a result, the second hub device 412 may analyze the sensor data 492, the image data 462, 493, the motion data 460, and/or the audio data 458, 494 to determine the occupancy data. In some of the present embodiments, the occupancy data may be a binary determination, such as occupied and not occupied. In addition, in some embodiments, the occupancy data may also include an estimate of how many people and/or animals are present and/or the location of the people and/or animals at the property (e.g., upstairs, downstairs, in the living room, etc.).

In alternative embodiments, the sensor data 492 (including data representative of the sensor trigger) may be received by the second A/V recording and communication device 403 rather than, or in addition to, the second hub device 412. For example, some environments may not have a smart-home hub device. In these environments, the second A/V recording and communication device 403 may perform at least some of the functions of the second hub device 412 described herein, including receiving, processing, and/or transmitting the sensor data 492. For example, the sensors 418 and/or the automation devices 420 may be in communication with the second A/V recording and communication device 403, rather than, or in addition to, the second hub device 412.

In further reference to FIG. 12, the computer vision module 1251 may include any of the components (e.g., hardware) and/or functionality described herein with respect to computer vision, including, without limitation, one or more cameras, sensors, and/or processors. In some embodiments, the computer vision module 1251 may be substantially similar to the computer vision module 163 in FIG. 3. In some embodiments, the camera 484, the microphone 483, and/or the processing module 486, may be components of the computer vision module 1251. In some embodiments the functions of the computer vision module 1251 may be offloaded to the backend server 430 (FIG. 13), which may include a computer vision module 1353 in addition to (or instead of) the computer vision module 1151 of the second smart-home hub device 412.

FIG. 13 is a functional block diagram illustrating one embodiment of the backend server 430 according to various aspects of the present disclosure. The backend server 430 may comprise a processing module 500 including a processor 502, volatile memory 504, a network interface 520, non-volatile memory 506, and a computer vision module 1353. The network interface 520 may allow the backend server(s) 430 to access and communicate with devices connected to the network (Internet/PSTN) 410 (e.g., the first A/V recording and communication device 402, the second A/V recording and communication device 403, the first hub device 411, the second hub device 412, the client devices 401, 404, 405, 406, 407, the publicly-accessible security camera devices 433, administrator device(s) 415, law enforcement device(s)/network(s) 421, and/or social network(s) 423). The non-volatile memory 506 may include a server application 508 that configures the processor 502 to receive the security event data 473, 491, 1514, the user alerts 479, 481, 480, 497, 1527 and/or the arming actions 429, 498, 1529 from the first A/V recording and communication device 402, the second A/V recording and communication device 403, the first hub device 411, the second hub device 412, the publicly-accessible security camera devices 433, and/or the client devices 401, 404, 405, 406, 407 (e.g., in the output signals 447, 478, 461, 496, 1525). The server application 508 may also configure the processor 502 to analyze the security event data 473, 491, 1514, the user alerts 479, 481, 480, 497, 1527 and/or the arming actions 429, 498, 1529, and determine a security event procedure for each of the first A/V recording and communication device 402, the second A/V recording and communication device 403, the first hub device 411, the second hub device 412, and/or the publicly-accessible security camera devices 433.

In various embodiments, and as described below, in response to a security event detected by the first security system 422 (e.g., by the first hub device 411), the processor 502 of the backend server 430 may receive the security event data 473 from the first security system 422; analyze the security event data 473 to determine a security event procedure 499 for the second security system 424A (e.g., the security system controlled by the second hub device 412) based on the security event data 473; when the security event procedure 499 for the second security system 424A includes an automatic arming action (e.g., the arming action 429 that does not require input from a user of the client device 405, 407): transmit the automatic arming action to the second security system 424A; when the security event procedure 499 for the second security system 424A includes an arming action request (e.g., the arming action 498 is determined in response to an input from the user/owner of the client device 405, 407): generate and transmit, to the client device 405, 407 associated with the second security system 424A (e.g., the security system controlled by the second hub device 412), the arming action request; in response to transmitting the arming action request, receive from the client device 405, 407, the arming action 498; and transmit, to the second security system 424A (e.g., the second hub device 412), the arming action 498.

In various embodiments, and as described below, in response to a security event detected by the first security system 422 (e.g., by the first hub device 411), the processor 502 of the backend server 430 may receive the security event data 473 from the first security system 422; analyze the security event data 473 to determine a security event procedure 499 for the neighborhood security system 424B (e.g., having one or more of the publicly-accessible security camera devices 433) based on the security event data 473; when the security event procedure 499 for the neighborhood security system 424B includes an automatic arming action 1529: transmit the automatic arming action 1529 to activate to one or more of the publicly-accessible security camera devices 433 in the neighborhood security system 424B.

In further reference to FIG. 13, the non-volatile memory 506 may also include source identifying data 510 that may be used to identify the first A/V recording and communication device 402, the second A/V recording and communication device 403, the first hub device 411, the second hub device 412, the publicly-accessible security camera devices 433, and/or the client devices 401, 404, 405, 406, 407. In some embodiments, the source identifying data 510 may include the public access identifier associated with the publicly-accessible security camera devices 433. In addition, the source identifying data 510 may be used by the processor 502 of the backend server 430 to determine the client devices 401, 404, 405, 406, 407 associated with the first A/V recording and communication device 402, the second A/V recording and communication device 403, the first hub device 411, the second hub device 412, and/or the publicly-accessible security camera devices 433. In some of the present embodiments, the source identifying data 510 may be used by the processor 502 of the backend server 430 to determine which other security systems (e.g., smart-home hub devices, client devices, publicly-accessible security camera devices, etc.) should be notified when a security event is detected by the first hub device 411 and/or the second hub device 412. For example, the security system controlled by the first hub device 411 may be part of a network of security systems, and in response to a security event being detected by the first hub device 411, the source identifying data 510 may be used to determine which other smart-home hub devices (e.g., the second hub device 412) are included in the network of security systems that should be notified. This determination may be made based on proximity, in some embodiments. In such embodiments, the location data of the security systems may be used to determine which other smart-home hub devices to notify of the security event. In other embodiments, the determination of which other security systems to notify may be made based on a determination of which security systems have opted-in to the network. For example, a user/owner of a security system may opt-in to receive notifications of security events and/or set a security event procedure 499 for any security events that are detected by any of the security systems in the network(s) of security systems that the security system of the user/owner is included.

The backend server 430 may include a facial recognition/biometrics application 1349. The facial recognition/biometrics application 1349 may be executed by the processor 502 out of the non-volatile memory 506, and may be used in connection with the image data 1329 to identify persons in the field of view of the first A/V recording and communication device 402, the second A/V recording and communication device 403, and/or the publicly-accessible security camera devices 433.

The backend server 430 may include a computer vision module 1353, which may include any of the components (e.g., hardware) and/or functionality described herein with respect to computer vision, including, without limitation, one or more cameras, sensors, and/or processors. For example, the computer vision module 1353 and/or the processing module 500 may receive information about a person using any one, or any combination of more than one, of the biometrics described herein. The received information (through AIDC and/or computer vision) may be compared to stored information about one or more persons. For example, the received information may be sent to one or more network devices, such as the backend API(s) 428 and/or other server devices, in an identity query signal. One or more of the network devices may then compare information in the identity query signal about the person detected in the area about the first A/V recording and communication device 402, the second A/V recording and communication device 403, and/or the publicly-accessible security camera devices 433, with information from one or more sources. These information sources may include one or more databases and/or services. For example, a database and/or service may include a database of persons who are wanted in connection with crimes. If a match is found, one or more actions may be taken, such as transmitting an alert to the law enforcement device(s)/network(s) 421 (FIG. 8). In another example, a database and/or service may include a sex offender registry. If a match is found, one or more actions may be taken, such as transmitting an alert to any persons who have requested to receive alerts when a registered sex offender is detected by the first A/V recording and communication device 402, the second A/V recording and communication device 403, and/or the publicly-accessible security camera devices 433. The databases, services, alerts, and other types of actions that can be used in connection with the present embodiments are limitless, and the foregoing examples are neither exhaustive nor intended to limit the present embodiments in any way.

In some embodiments, the server application 508 may further configure the processor 502 to generate and transmit a report signal (not shown) to a third-party client device (e.g., law enforcement device(s) 421), which may be associated with a law enforcement agency, for example. The report signal sent to the law enforcement agency may include information indicating an approximate location of where the security event data 473, 491, 1514 was captured, which may assist the law enforcement agency with apprehending the criminal perpetrator from the security event data 473, 491, 1514.

With further reference to FIG. 13, the security event procedures 499 may include the processes and determinations that the processor 502 of the backend server 430 makes in response to a security event. The security event procedures 499 may be unique to each of the security systems (e.g., each of the hub devices and associated sensors, automation devices, A/V recording and communication devices, and publicly-accessible security camera devices). For example, some of the security systems may have automatic arming actions, as described herein, where the security event procedure 499 includes determining the arming actions 429, 498, and/or 1529 based on the security event data 473, 491, 1514, the occupancy data, and/or the arming status of the security system without requiring input from the user/owner of the security system. In another example, some of the security systems may require arming action requests be made to the user/owner of the security system (e.g., by transmitting a request for the arming action 429, 498 to a client device associated with the security system), and the arming actions 429, 498 may be received in response and transmitted to the smart-home hub devices of the security systems.

Figure 22:
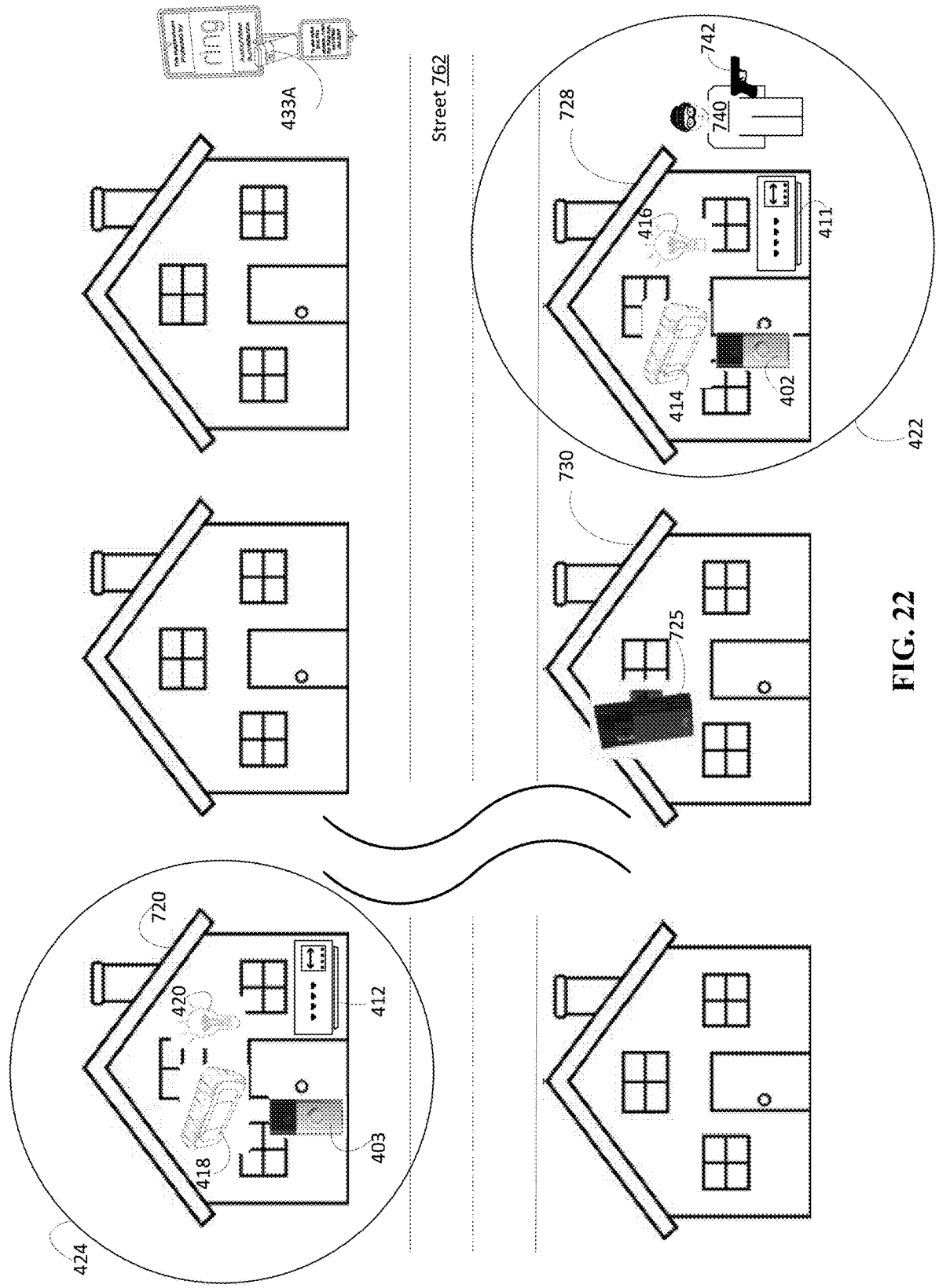
FIG. 22 is an example environment for security systems according to one embodiment of the present disclosure.
Figure 23:
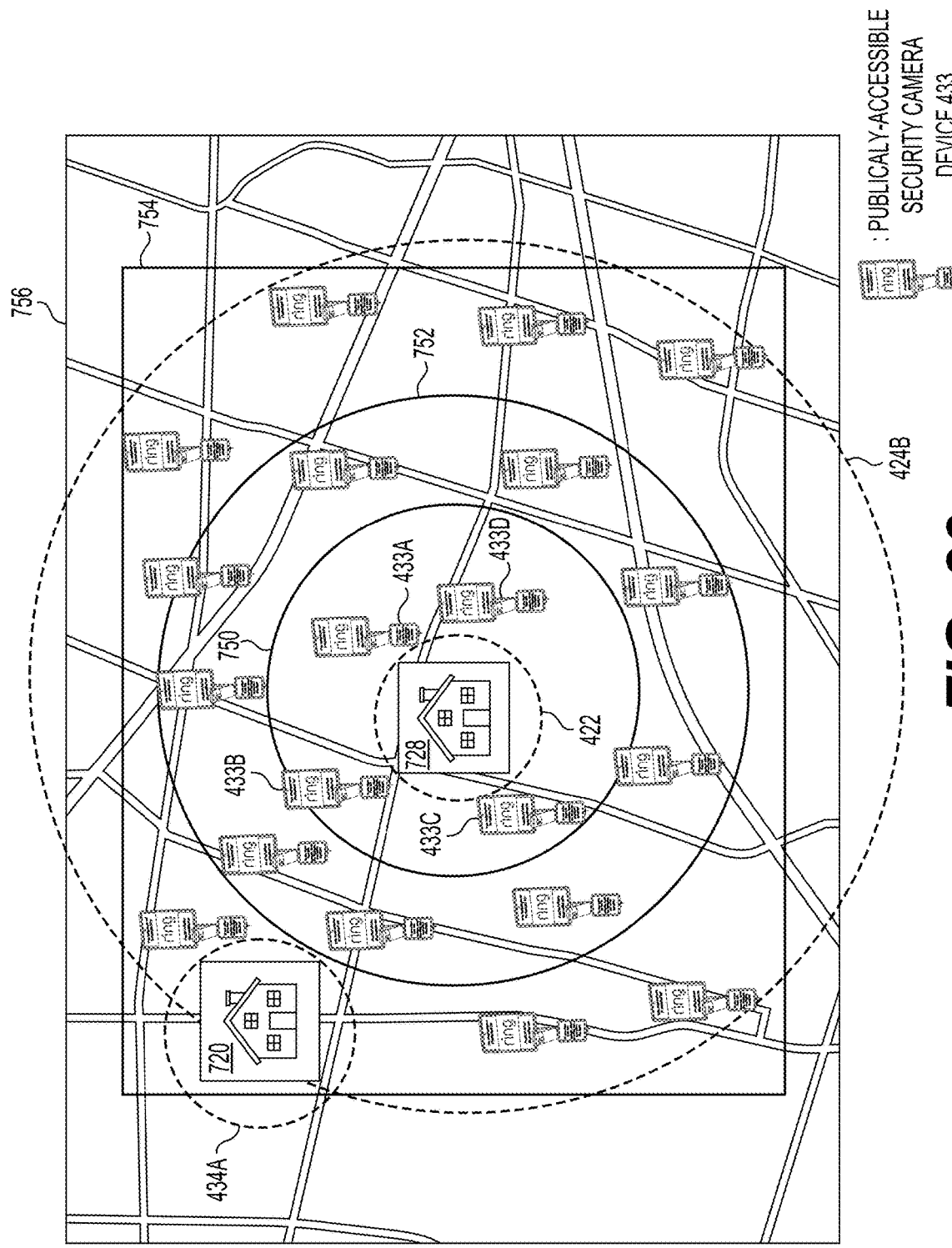
FIG. 23 is a schematic view of a neighborhood with a neighborhood security system according to various aspects of the present disclosure.

In addition, the security event procedures 499 may differ for each of the security systems based on the threat level of the security event, the proximity of the security system experiencing the security event to the security system the security event procedure 499 relates to (e.g., the threat level of the security event detected by the first hub device 411 and/or the proximity of the first hub device 411 to the second hub device 412), and/or the clock data (e.g., the time of day). With reference to FIG. 22, if a security event is detected by the first hub device 411 located at the first home 728, the processor 502 of the backend server 430 may analyze the security event data (e.g., the time frame in which the security event happened, the proximity of the first home 728 to the second home 720, and the threat level and type of the security event) to determine the security event procedure 499 for the second hub device 412 located at the second home 720. For example, if the threat level is low, the smart-home hub devices located within the first proximity region 750 (FIG. 23) may be notified and/or receive an arming action based on the security event procedure 499, if the threat level is medium, the smart-home hub devices located within the second proximity region 752 (e.g., where the second proximity region 752 encompasses and includes the first proximity region 750) may be notified and/or receive an arming action based on the security event procedure 499, and if the threat level is high, the smart-home hub devices located within the third proximity region 754 (e.g., where the third proximity region 754 encompasses and includes the first proximity region 750 and the second proximity region 752) may be notified and/or receive an arming action based on the security event procedure 499. As such, in the above example, if the security event is detected by the first hub device 411 located at the first home 728, and the threat level is determined to be medium or high, the second hub device 412 may be notified and/or receive the arming action 498 based on the security event procedure 499. In addition, depending on whether the threat level is medium or high, the security event procedure 499 for the second hub device 412 may differ. For example, if the threat level is medium, the security event procedure 499 may include an arming action request be transmitted to the client devices 405, 407 associated with the second hub device 412. If the threat level is high, the security event procedure 499 may include an automatic arming action for transmitting the arming action 498 to the second hub device 412 without requiring input from the user.

In another example, the proximity/location information of the security systems may be used. For example, with respect to FIG. 22, the security event procedure 499 for the first security system 422 located at the first home 728 may include to receive notifications (e.g., user alerts 480, 497) and/or the arming actions 429 in response to security events detected by security systems within the first proximity region 750 (FIG. 23), the second proximity region 752 (which may include the second hub device 412 at the second home 720), and/or the third proximity region 754 (which may also include the second hub device 412 at the second home 720). In addition, similar to that described above, the security event procedure 499 may be different for each of the proximity regions (e.g., the first security system 422 may receive notifications only for security events detected by security systems outside of the second proximity region 752 but within the third proximity region 754, arming action requests for security events detected by security systems outside of the first proximity region 750 but within the second proximity region 752, and/or automatic arming actions for security events detected by security systems within the first proximity region 750). In some of the present embodiments, the proximity and the threat level may be used together to determine the security event procedures 499 for each of the security systems.

In some of the present embodiments, in addition to, or in lieu of, the threat level and/or the proximity, clock data may be used by the security systems. For example, with reference to FIG. 22, the security event procedure 499 for the first security system 422 located at the first home 728 may include to receive notifications (e.g., user alerts 480, 497) and/or the arming actions 429 in response to security events detected by security systems within the first proximity region 750 (FIG. 23), the second proximity region 752 (which may include the second hub device 412 at the second home 720), and/or the third proximity region 754 (which may also include the second hub device 412 at the second home 720) based on the clock data and/or proximity. In addition, similar to that described above, the security event procedure 499 may be different for each of the proximity regions, and within each of the proximity regions may be different dependent on the clock data (e.g., the time of day). For example, the first security system 422 may receive notifications only for security events detected by security systems outside of the second proximity region 752 but within the third proximity region 754. In such an example, the client device 404, 406 may receive the notifications in real time if the security event takes place during a predetermined time period (e.g., between 8:00 a.m. and 5:00 p.m.), and may receive the notification at a predetermined time (e.g., 8:00 a.m. for security events occurring after 5:00 p.m.) if the security event occurs outside of the predetermined time period (e.g., if the security event occurs between 5:00 p.m. and 8:00 a.m.). In another example, the first security system 422 may receive arming action requests for security events detected by security systems outside of the first proximity region 750 but within the second proximity region 752 within a predetermined time period (e.g., 8:00 a.m. to 5:00 p.m.) but may receive automatic arming actions if the security events take place outside of the predetermined time period and/or within another predetermined time period (e.g., 5:00 p.m. to 8:00 a.m.). In such an example, between 8:00 a.m. and 5:00 p.m. the client device 404, 406 may receive the arming action requests in response to a security event detected by security systems outside of the first proximity region 750 but within the second proximity region 752. However, between 5:00 p.m. and 8:00 a.m., the first hub device 411 may receive the automatic arming action in response to security events detected by security systems outside of the first proximity region 750 but within the second proximity region 752. For another example, the first security system 422 may receive automatic arming actions for security events detected by security systems within the first proximity region 750 at any time of day, but a notification may only be sent to the client device 404, 406 during a predetermined time period (e.g., 8:00 a.m. to 5:00 p.m.). In some of the present embodiments, the proximity, the threat level, and/or the clock data may be used together to determine the security event procedures 499 for each of the security systems.

In some of the present embodiments, the server application 508 may configure the processor 502 of the backend server 430 to determine the occupancy data of the properties where the security systems are located. For example, similar to that described above with respect to the first hub device 411 and the second hub device 412, the backend server 430 may analyze the security event data 473, 491, 1514 to determine the occupancy data. In some embodiments, the backend server 430 may query the first hub device 411 and/or the second hub device 412 periodically to determine the occupancy data.

In some of the present embodiments, the security event may be verified by the backend server 430 prior to executing the security event procedures 499 for other security systems in the network of security systems. In some embodiments, the security events may be verified if a user of the security system where the security event was detected performs an action(s) in response to receiving a notification (e.g., user alert) of the security event. For example, if the user of the client device 404, 406 in response to receiving the user alert 479, 481 from the first security system 422 activates an alarm, alerts law enforcement, contacts a security monitoring service, changes the arming action of the first security system 422 (e.g., by executing the arming action 429), and/or performs another action, the security event may be determined to be verified. In any embodiment, the security event may be verified by the security monitoring service, such as where the first security system 422 is configured to transmit the security event data 473 to the security monitoring service. In such embodiments, the security monitoring service may review the security event data 473 and verify the security event (e.g., by alerting law enforcement, sounding an alarm, notifying the user/owner of the first security system 422, providing a verification input, and/or another action). In embodiments where the source (e.g., person, animal, object (e.g., a gun)) of the security event is captured in the image data (e.g., the image data 448, 475 of the first security system), the image data may be analyzed using facial recognition, facial detection, object detection, object recognition, or other biometric analysis, as described above, to determine if the person, animal, and/or object is a threat. To determine if the person, animal, and/or object is a threat, the person, animal, and/or object may be compared to a database of suspicious person (e.g., a police database), a database of dangerous animals, and/or a database of suspicious objects (e.g., guns and other weapons), respectively, for example. The determination of a threat may provide verification of the security event.

Figure 14:
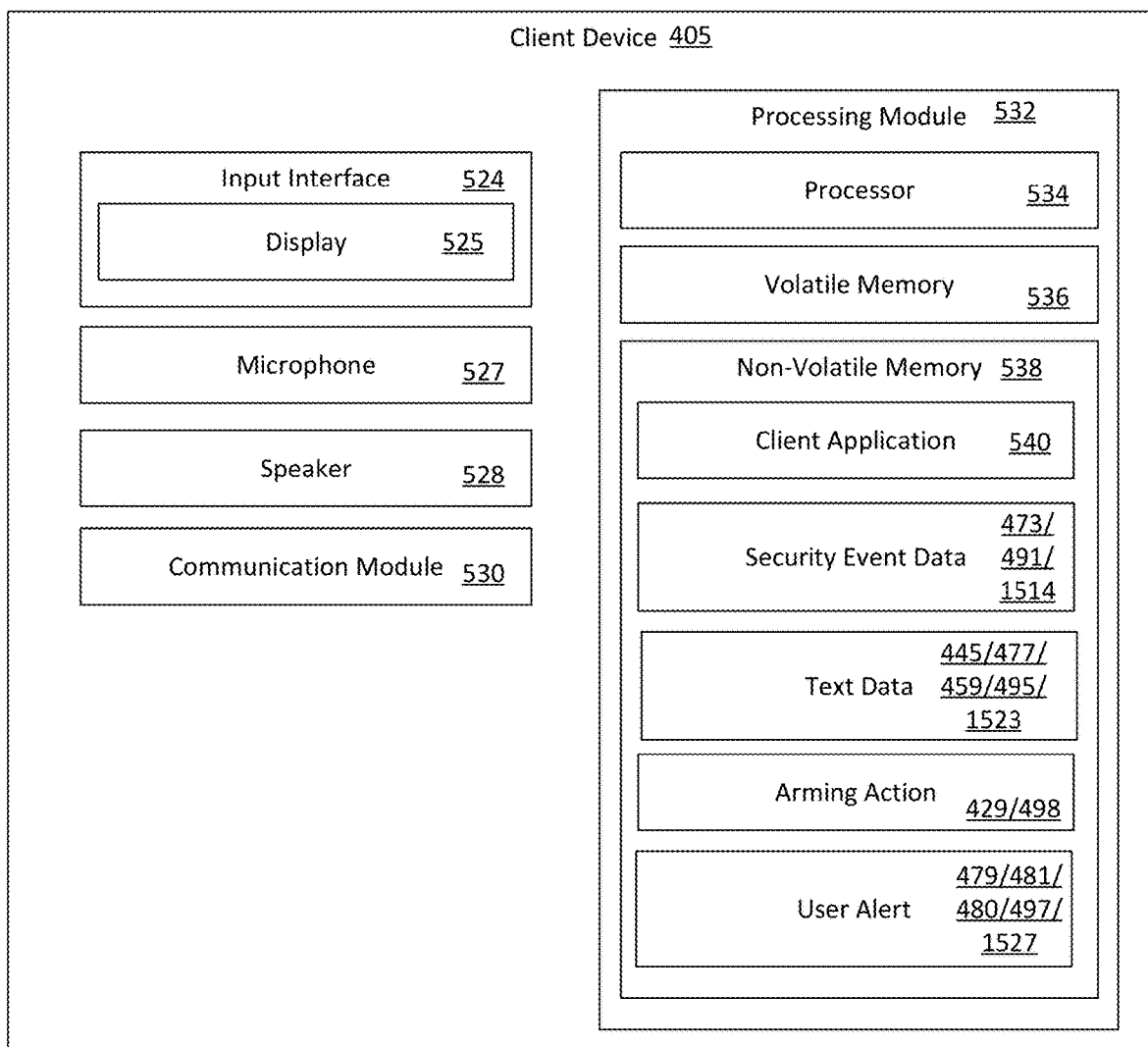
FIG. 14 is a functional block diagram illustrating one embodiment of a client device according to various aspects of the present disclosure.

Now referring to FIG. 14, FIG. 14 is a functional block diagram illustrating one embodiment of the client device 405 according to various aspects of the present disclosure. The client device 405 may comprise a processing module 532 that is operatively connected to an input interface 524, a microphone 527, a speaker 528, and a communication module 530. The client device 405 may further comprise a camera (not shown) operatively connected to the processing module 532. The processing module 532 may comprise a processor 534, volatile memory 536, and non-volatile memory 538 that includes a client application 540. In various embodiments, the client application 540 may configure the processor 534 to receive input(s) to the input interface 524 (e.g., inputs of the arming actions 498). In addition, the client application 540 may configure the processor 534 to transmit the arming actions 498 to the second hub device 412, the second A/V recording and communication device 403, and/or the backend server(s) 430 using the communication module 530. The client application 540 may further configure the processor 534 to receive (in some embodiments, via the backend server 430) the security event data 473, 491, 1514, the text data 445, 477, 459, 495, 1523, the arming action requests 429, 498, and/or the user alerts 479, 481, 480, 497, 1527 from the first hub device 411, the second hub device 412, the first A/V recording and communication device 402 (e.g., the image data 448 and/or the motion data 446), the second A/V recording and communication device 403 (e.g., the image data 462 and/or the motion data 460) and/or the publicly-accessible security camera device(s) 433 (e.g., the image data 1517 and/or the motion data 1521).

With further reference to FIG. 14, the input interface 524 may include a display 525. The display 525 may include a touchscreen, such that the user of the client device 405 can provide inputs directly to the display 525 (e.g., the arming action 498). In some embodiments, the client device 405 may not include a touchscreen. In such embodiments, the user may provide an input using any input device, such as, without limitation, a mouse, a trackball, a touchpad, a joystick, a pointing stick, a stylus, etc. In some embodiments, the client device(s) 401, 404, 406, 407 may be substantially similar to the client device 405 described above.

Figure 15:
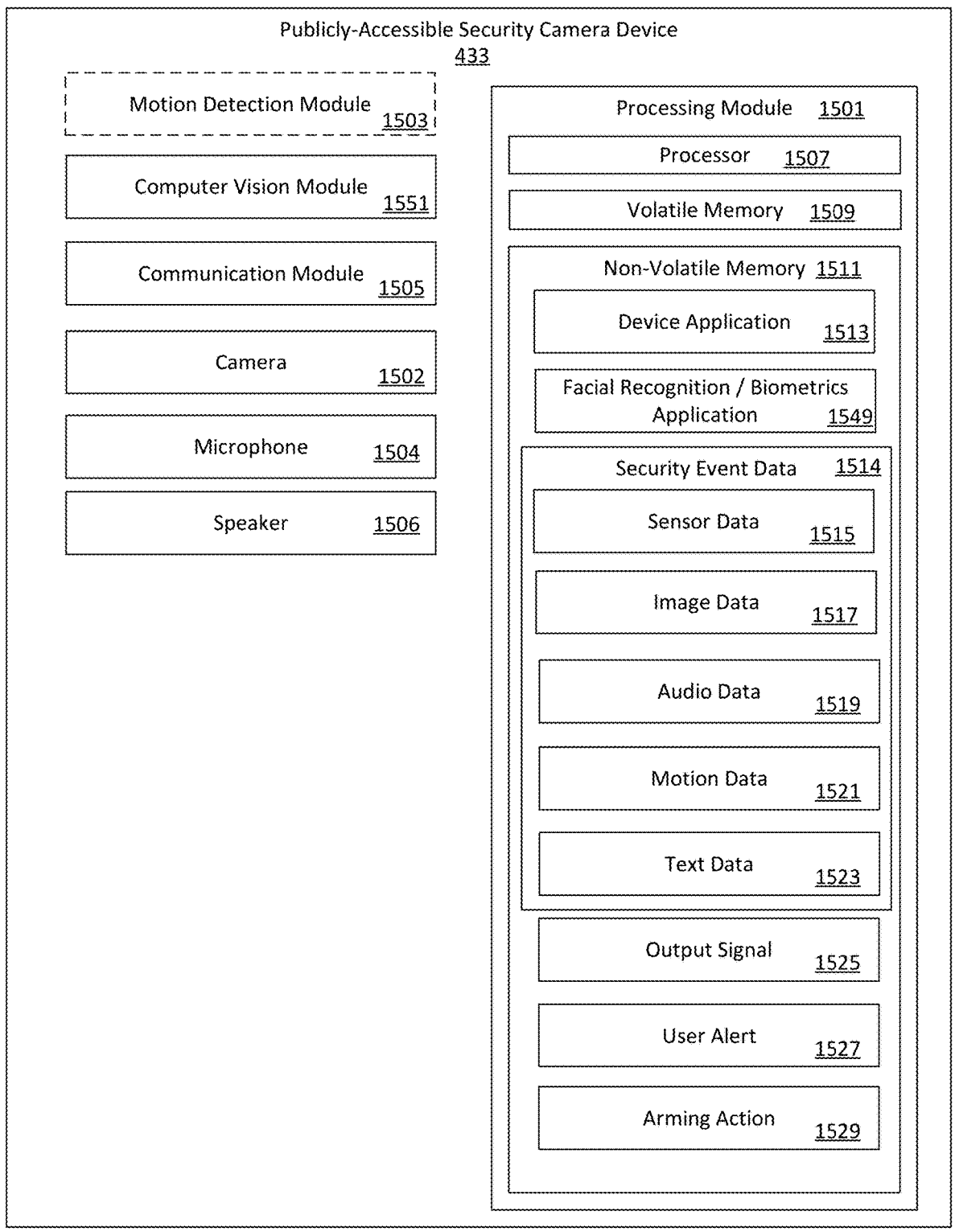
FIG. 15 is a functional block diagram illustrating one embodiment of a publicly-accessible security camera device according to various aspects of the present disclosure.

FIG. 15 is a functional block diagram of an embodiment of the publicly-accessible security camera device 433 according to an aspect of the present disclosure. The publicly-accessible security camera device 433 may be placed in a public location to capture image data using a camera 1502 and/or audio data using a microphone 1504. In some embodiments, the publicly-accessible security camera device 433 may also include a speaker 1506 that, together with the microphone 1504, allows for two-way audio communication between a person remotely connected to the publicly-accessible security camera device 433 and a person in the vicinity of the publicly-accessible security camera device 433. As also discussed above, the publicly-accessible security camera device 433 may be connected to the network (Internet/PSTN) 410 using the public network 431. In alternative embodiments, the publicly-accessible security camera device 433 may be connected to the network (Internet/PSTN) 410 via a wired network (not shown), or connected directly to the network (Internet/PSTN) 410 without any intervening network.

In various embodiments, initial setup and/or control of settings of the publicly-accessible security camera device 433 may be configured by one or more administrators using one or more administrator device(s) 415. The administrator device(s) 415 may be similar to, or the same as, the client device(s) 404 or 405 (as described above). Administrators and/or administrator device(s) 415, however, may have advanced permissions with respect to the publicly-accessible security camera device 433 that the client device(s) 404 or 405 (and users of the client device(s) 404 or 405) may not have. Such advanced permissions may include (but not be limited to) deleting video footage recorded by the publicly-accessible security camera device 433, changing and resolving settings related to network connectivity, notifications, camera sensitivity, and/or software updates. In some embodiments, an administrator may approve or deny user requests for access to one or more of the publicly-accessible security camera device 433.

With further reference to FIG. 15, image data 1517 and/or audio data 1519 captured by the publicly-accessible security camera device 433 may be transmitted to one or more of the storage device(s) 432, one or more of the backend server(s) 430, and/or one or more of the backend API(s) 428, as further discussed below. In various embodiments, the image data 1517 may comprise image sensor data such as (but not limited to) exposure values and data regarding pixel values for a particular size grid. Further, the image data 1517 may comprise converted image sensor data for standard image file formats such as (but not limited to) JPEG, JPEG 2000, TIFF, BMP, or PNG. In addition, the image data 1517 may also comprise data related to video, where such data may include (but is not limited to) image sequences, frame rates, and the like. Moreover, the image data 1517 may include data that is analog, digital, uncompressed, compressed, and/or in vector formats. The image data 1517 may take on various forms and formats as appropriate to the requirements of a specific application in accordance with the present embodiments.

In some embodiments, with reference to FIGS. 8 and 15, the backend servers 430 may use the image data 1517 to provide video footage to any of the client device(s) 401, 404, 406, 405, 407, such as upon receipt of one or more requests for access that include a public access identifier, as further described below. The publicly-accessible security camera device 433 may also be configured to perform automatic identification and data capture (AIDC), such as (but not limited to) at least one of biometrics, voice recognition, facial recognition, three-dimensional facial recognition, and/or skin texture analysis, to identify a person of interest and generate at least one alert (may also be referred to as a "notification"). For example, in some embodiments, the publicly-accessible security camera device 433, the backend server(s) 430, and/or the backend API(s) 428 may perform facial recognition to determine if a person of interest is recognized. In various embodiments, the image data captured by the publicly-accessible security camera device 433 may be processed to compare facial features to a database, such as (but not limited to) one or more criminal registries. Further, various members of the public may submit photos of a person of interest and be alerted when images of that person are captured by the publicly-accessible security camera device 433. In further embodiments, one or more law enforcement agencies may also be alerted, such as through an alert sent to one or more law enforcement device(s)/network(s) 421, when a person of interest is detected by the publicly-accessible security camera device 433. In some embodiments, one or more social network(s) 423 may be alerted and/or image data may be posted to such social network(s) 423. The social network(s) 423 may include any social media service or platform that uses computer-mediated tools that allow participants to create, share, and/or exchange information in virtual communities and/or networks, such as (but not limited to) social networking websites and/or applications running on participant devices. Non-limiting examples of social networks include Facebook, Twitter, Snapchat, and Nextdoor.

In continued reference to FIG. 15, the publicly-accessible security camera device 433 may include the camera 1502, the microphone 1504, and the speaker 1506, as discussed above. Further, with reference to FIG. 15, the publicly-accessible security camera device 433 may also include a processing module 1501 that is operatively connected to a motion detecting module 1503 and a communication module 1505. The processing module 1501 may comprise a processor 1507, a volatile memory 1509, and a non-volatile memory 1511 that includes a device application 1513. The device application 1513 may be used to configure the processor 1507 to perform various functions, including (but not limited to) detecting motion of a person within the camera 1502's field of view using the motion detecting module 1503, recording image data 1517 of the person using the camera 1502, and transmitting the obtained image data 1517 to the backend server(s) 430 using the communication module 1505, as further discussed below. In some embodiments, the motion detecting module 1503 may comprise (but is not limited to) at least one passive infrared (PIR) sensor. The motion detecting module 1503 may further comprise the camera 1502, instead of or in addition to a discrete motion detecting device. Further, in some embodiments, the communication module 1505 may comprise (but is not limited to) one or more transceivers and/or wireless antennas configured to transmit and receive wireless signals.

In the illustrated embodiment of FIG. 15, the processing module 1501, the motion detecting module 1503, and the communication module 1505 are represented by separate boxes. The graphical representation depicted in FIG. 15 is, however, merely one example, and is not intended to indicate that any of the processing module 1501, the motion detecting module 1503, and/or the communication module 1505 are necessarily physically separate from one another, although in some embodiments they might be. In other embodiments, however, the structure and/or functionality of any or all of these components may be combined. For example, either or both of the motion detecting module 1503 and the communication module 1505 may include their own processor, volatile memory, and/or non-volatile memory.

In various embodiments, the device application 1513 may configure the processor 1507 to capture security event data 1514, which may include any or all of image data 1517 captured using the camera 1502, audio data 1519 captured using the microphone 1504, and/or motion data 1521 captured using the camera 1502 and/or the motion detecting module 1503. In some embodiments, the device application 1513 may also configure the processor 1507 to generate text data 1523 describing the image data 1517, such as in the form of metadata, for example. In some of the present embodiments, the device application 1513 may configure the processor 1507 to transmit the image data 1517, the audio data 1519, the motion data 1521, and/or the text data 1523 to the client devices 401, 404, 406 405, 407, the first hub device 411, the second hub device 412, and/or the backend server 430 using the communication module 1505.

In various embodiments, the device application 1513 may also configure the processor 1507 to generate and transmit an output signal 1525 that may include the image data 1517, the audio data 1519, the text data 1523, and/or the motion data 1521. In some of the present embodiments, the output signal 1525 may be transmitted to the backend server(s) 430 using the communication module 438, and the backend server(s) 430 may transmit (or forward) the output signal 1525 to the client devices 401, 404, 406, 405, 407. In other embodiments, the output signal 1525 may be transmitted directly to the client devices 401, 404, 406, 405, 407.

In further reference to FIG. 15, the image data 1517 may comprise image sensor data such as (but not limited to) exposure values and data regarding pixel values for a particular sized grid. Further, the image data 1517 may comprise converted image sensor data for standard image file formats such as (but not limited to) JPEG, JPEG 2000, TIFF, BMP, or PNG. In addition, the image data 1517 may also comprise data related to the still image, video, or combination thereof, included in the image data 1517. Such data may include (but is not limited to) image sequences, frame rates, and the like. Moreover, the image data 1517 may include data that is analog, digital, compressed, uncompressed, and/or in vector formats.

The image data 1517 may include still images, live video, and/or pre-recorded video. The image data 1517 may be recorded by the camera 1502 in a field of view of the camera 1502. The processor 1507 may be configured to transmit the image data 1517 (e.g., as live streaming video) to the client devices 401, 404, 406, 405, 407, the first hub device 411, the second hub device 412, and/or the backend server 430. The image data 1517 may take on various forms and formats as appropriate to the requirements of a specific application in accordance with the present embodiments. As described herein, the term "record" may also be referred to as "capture" as appropriate to the requirements of a specific application in accordance with the present embodiments.

In further reference to FIG. 15, the motion data 1521 may comprise motion sensor data generated in response to motion events. For example, in embodiments using a motion detecting module 1503, the motion data 1521 may include an amount or level of a data type generated by the motion detecting module 1503. In some of the present embodiments, the motion data 1521 may also comprise time-based and/or location-based information such as the amount of time a motion event is detected and/or the location of the motion event in the field of view of the motion detecting module 1503 (e.g., Zones 1-5 (FIG. 6), the location within one of the Zones 1-5, and/or the proximity to the motion detecting module 1503). In other embodiments, dependent on the type of motion detecting module 1503 implemented in a given embodiment, the motion data 1521 may include the data type (e.g., voltage) generated specific to the type of motion detecting module 1503 (e.g., PIR, microwave, acoustic, etc.). The motion data 1521 may further include an estimated speed and/or direction data of the person and/or object that caused the motion event.

In some of the present embodiments, such as those where the publicly-accessible security camera device 433 is similar to that of the A/V recording and communication doorbell 130 of FIGS. 3-4, the motion data 1521 may be generated by the camera 1502. In such embodiments, the publicly-accessible security camera device 433 may not have a motion detecting module 1503 (as illustrated by the dashed lines around the motion detecting module 1503 in FIG. 15). As such, the detection of a motion event, the determination of whether a motion event is caused by the movement of a person in a field of view of the publicly-accessible security camera device 433, and/or the speed and/or location of a person and/or object in the field of view of the publicly-accessible security camera device 433 may be determined using the motion data 1521 generated by the camera 1502. In such embodiments, the motion data 1521 may include differences between successive frames (e.g., pixels) of the image data 1517, where the differences may be the result of motion in the field of view of the camera 1502, for example.

In further reference to FIG. 15, the computer vision module 1551 may include any of the components (e.g., hardware) and/or functionality described herein with respect to computer vision, including, without limitation, one or more cameras, sensors, and/or processors. In some embodiments, the computer vision module 1551 may be substantially similar to the computer vision module 163 in FIG. 3. In some embodiments, the camera 1502, the microphone 1504, and/or the processing module 1501, may be components of the computer vision module 1551. In some embodiments the functions of the computer vision module 1551 may be offloaded to the backend server 430 (FIG. 13), which may include a computer vision module 1353 in addition to (or instead of) the computer vision module 1551 of the publicly-accessible security camera device 433.

With further reference to FIG. 15, in some of the present embodiments, the publicly-accessible security camera device 433 may generate a user alert 1527. The user alert 1527 may be generated, for example, in response to a motion event in the field of view of the publicly-accessible security camera device 433 (e.g., the movement of a person, animal, and/or object). The user alert 1527 may be programmed to include information representative of the motion event, such as the motion data 1521, the image data 1517, the audio data 1519, and/or the text data 1523 (e.g., for display on the client devices 401, 404, 405, 406, and/or 407 associated with security systems 422, 424A, and/or 424B). The user alert 1527 may be generated, for example, when a person of interest associated with the security event from the first security system 422 is detected using AIDC. The device application 1513 may configure the processor 1507 to transmit the image data 1517, along with the audio data 1519, the motion data 1521, and/or the text data 1523 to the client devices 401, 404, 406 405, 407, the first hub device 411, the second hub device 412, and/or the backend server 430 using the communication module 1505.

Figure 16:
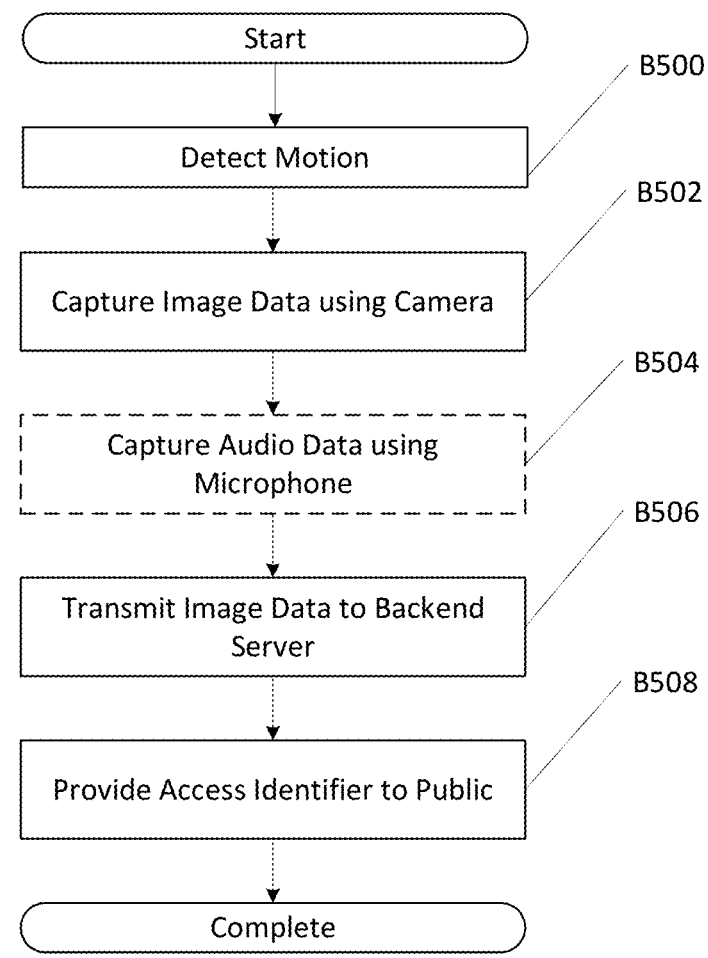
FIG. 16 is a flowchart illustrating a process for capturing image data at a publicly-accessible security camera device according to various aspects of the present disclosure.

FIG. 16 is a flowchart illustrating a process for capturing image data at a publicly-accessible security camera device 433 according to various aspects of the present disclosure. The process may include detecting motion (block B500) of a person within the field of view of the camera 1502. In some embodiments, the camera 1502 itself may detect motion by analyzing image data captured within its field of view. In further embodiments, the publicly-accessible security camera device 433 may include at least one motion sensor, such as one or more passive infrared (PIR) sensors 344 (FIG. 7), or any other type of motion sensor(s). In such embodiments, the motion sensor(s) may be configured to gather information from within the field of view of the camera 1502 and generate an output signal. The device application 1513 may further configure the processor 1507 to receive the output signal from the motion sensor and determine, based on the output signal from the motion sensor, whether motion is indicated within the field of view of the camera 1502, and to activate the camera 1502 when it is determined that motion is indicated within the field of view of the camera 1502.

For example, the PIR sensors 344 (FIG. 7) may be operatively connected to the power PCB 348 to turn the camera 1502 on or off. When motion is detected by the PIR sensors 344 within the field of view of the camera 1502, the PIR sensors 344 may send a signal to the power PCB 348. In response to the signal from the PIR sensors 344, the camera 1502 and/or the IR LEDs 368 may be switched on. In some embodiments, when the motion is no longer detected, and/or when a timer expires, the camera 1502 may turn itself off. In this manner, the camera 1502 is only turned on in response to the PIR sensors 344 detecting motion. This aspect may not only detect motion but also further enhance the power efficiency of the publicly-accessible security camera device 433 by conserving battery power in comparison to an embodiment in which the camera 1502 is always on. In addition, the publicly-accessible security camera device 433 may also be attached to a solar panel (not shown) to provide power to the publicly-accessible security camera device 433 and/or to recharge the battery 366, as discussed above. In alternative embodiments, the publicly-accessible security camera device 433 may be connected to a power source, such as AC mains. In such embodiments, the publicly-accessible security camera device 433 may not include the battery 366. Also, in such embodiments, the publicly-accessible security camera device 433 may use the camera 1502 for motion detection, and the camera 1502 may always be powered on and recording.

In further reference to FIG. 16, when motion is detected, the process may also include capturing (block B502) image data using the camera 1502, and in some embodiments may also include capturing (block B504) audio data using the microphone 1504. In various embodiments, the image data (and/or audio data) may be transmitted (block B506) to the backend server 430 using the communication module 1505, as described above. Further, the process may include providing (block B508) an access identifier to the public (also referred to as "public access identifier") for accessing video footage captured by the publicly-accessible security camera device 433. For example, the publicly-accessible security camera device 433 may provide instructions 306 (FIG. 17) that include the public access identifier, as described above. In some embodiments, such instructions may be provided in a variety of public notices that may be posted near and/or adjacent to the publicly-accessible security camera device 433. In some embodiments, the public access identifier may comprise at least one form of AIDC such as (but not limited to) at least one barcode, matrix code, or bokode, as described above.

In some embodiments, the publicly-accessible security camera device 433 or the backend server 430, or both, may be configured to identify a person in the field of view of the publicly-accessible security camera device 433 using biometric data. For example, the publicly-accessible security camera device 433 and the backend server 430 may include facial recognition/biometrics applications 1549 (in FIG. 15) and 1359 (in FIG. 13), respectively. With respect to the publicly-accessible security camera device 433, the facial recognition/biometrics application 1549 may be executed by the processor 1507 out of the non-volatile memory 1511, and may be used in connection with the image data 1517 to identify persons in the field of view of the publicly-accessible security camera device 433. With respect to the backend server 430, the facial recognition/biometrics application 1349 (in FIG. 13) may be executed by the processor 502 out of the non-volatile memory 504, and may be used in connection with the image data 1329 to identify persons in the field of view of the first A/V recording and communication device 402, the second A/V recording and communication device 403, and/or the publicly-accessible security camera devices 433.

Figure 17:
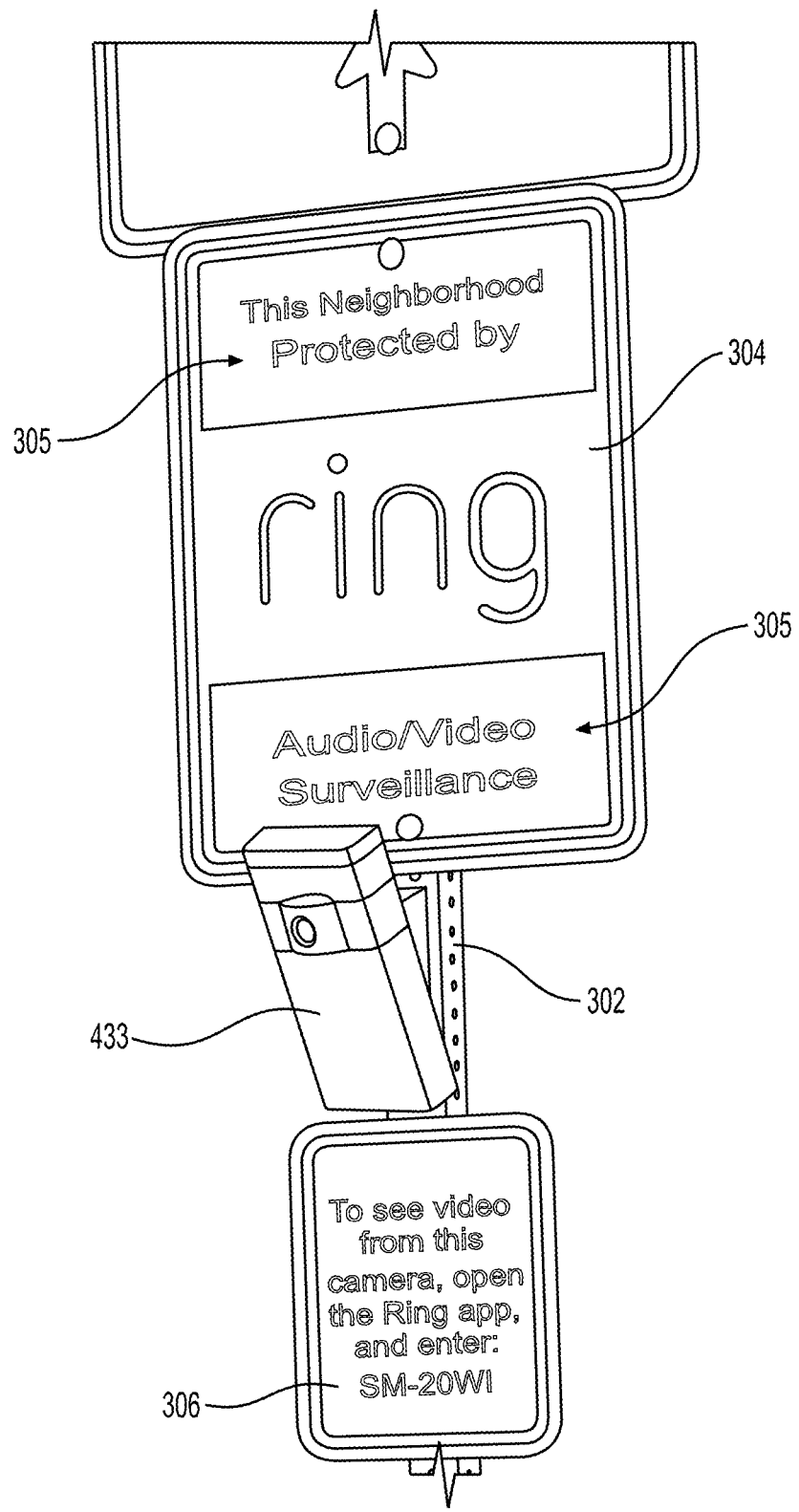
FIG. 17 is a front perspective view of a publicly-accessible security camera device and environment according to various aspects of the present disclosure.

FIG. 17 is a front perspective view of a security camera and environment according to an aspect of the present disclosure. In various embodiments, the publicly-accessible security camera device 433 may be placed in a public location to capture image and/or audio data, as further described below. In some embodiments, the publicly-accessible security camera device 433 may be secured to a post 302 or another type of mount. For example, in alternative embodiments the publicly-accessible security camera device 433 may be secured to a structure, such as a building. A notification sign 304 may be located adjacent the publicly-accessible security camera device 433. In the illustrated embodiment, the notification sign 304 includes text 305 that notifies persons reading the text 305 that the surrounding neighborhood is protected by audio/video surveillance. Further, instructions 306 for accessing image and/or video data captured by the publicly-accessible security camera device 433 may also be provided adjacent the publicly-accessible security camera device 433. In various embodiments, such instructions may include (but are not limited to) directions to download and/or open a computer application using the client devices 401, 404, 406, 405, 407, and/or to enter an access identifier (also referred to as "public access identifier"), as further described below. For example, in some embodiments the public access identifier may be an alphanumeric code (e.g., SM-20WI as shown in FIG. 17) configured to be entered into the application executing on one or more of the client devices 401, 404, 406, 405, 407. In other embodiments, the instructions 306 may include at least one form of automatic identification and data capture (AIDC), such as (but not limited to) a barcode, a matrix code, and/or a bokode that may be read by one or more of the client devices 401, 404, 406, 405, 407.

In the illustrated embodiment of FIGS. 9-15, the various components including (but not limited to) the processing modules 439, 453, 468, 486, 500, 532 and the communication modules 438, 452, 467, 485, 530, and the network interface 520 are represented by separate boxes. The graphical representations depicted in each of FIGS. 9-15 are, however, merely examples, and are not intended to indicate that any of the various components of the first A/V recording and communication device 402, the second A/V recording and communication device 403, the first hub device 411, the second hub device 412, the client device 405, the backend server(s) 430, and/or the publicly-accessible security camera device 433 are necessarily physically separate from one another, although in some embodiments they might be. In other embodiments, however, the structure and/or functionality of any or all of the components of each of the first A/V recording and communication device, the second A/V recording and communication device 403, the first hub device 411, the second hub device 412, the client device 405, the backend server(s) 430, and/or publicly-accessible security camera device 433 may be combined. As an example, the structure and/or functionality of any or all of the components of the first A/V recording and communication device 402 may be combined. In addition, in some embodiments the communication module 438 may include its own processor, volatile memory, and/or non-volatile memory. As another example, the structure and/or functionality of any or all of the components of the hub device 411 may be combined. In addition, in some embodiments the communication module 467 may include its own processor, volatile memory, and/or non-volatile memory.

Figure 18:
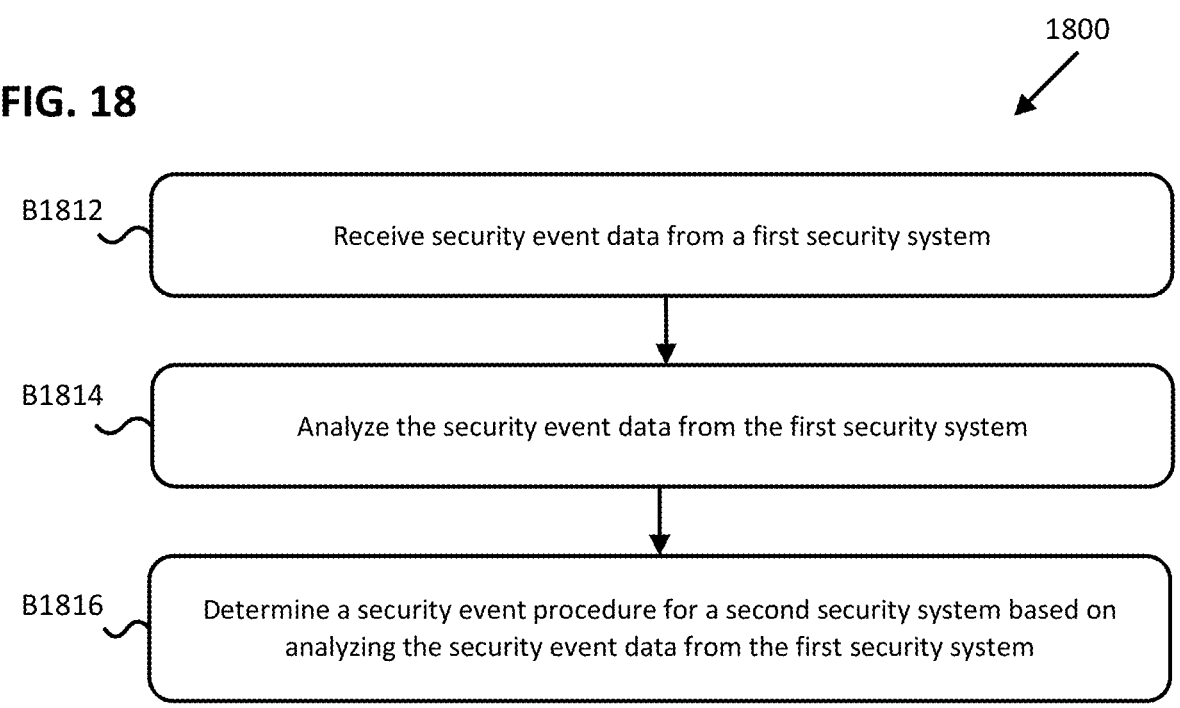
FIGS. 18 and 19 are flowcharts illustrating processes for a security network including a first security system installed at a first location and a second security system installed at a second location according to various aspects of the present disclosure.

Now referring to FIG. 18, FIG. 18 is a flowchart illustrating a process 1800 for a security network including a first security system installed at a first location and a second security system installed at a second location according to various aspects of the present disclosure. The process 1800, at block B1812, receives security event data from a first security system. For example, the processor 502 of the backend server 430 may receive the security event data 473 from the first security system 422 (e.g., the first hub device 411 and/or the first A/V recording and communication device 402). For example, the security event data 473 may be generated by the first hub device 411 and/or the first A/V recording and communication device 402 including the sensor data 474, the image data 448, 475 (e.g., video data captured by the camera 434 of the first A/V recording and communication device 402 at the time of the security event), the motion data 446, the audio data 444, 476, and/or the text data 445, 477. For example, the text data 445, 477 may include a description of the type of security alert detected by the first security system 422 (e.g., the first hub device 411 and/or the first A/V recording and communication device 402).

The process 1800, at block B1814, analyzes the security event data from the first security system. For example, the processor 502 of the backend server 430 may analyze the security event data 473 generated by the first security system 422. In various embodiments, the security event data 473 may include at least one of motion data 446 generated by the motion sensor 435, image data 448 generated by the camera 434, and audio data 444 using the microphone 436 of the first A/V recording and communication device 402. The security event data 473 may also include at least one of image data 475 using the camera 464 and audio data 476 using the microphone 465 of the first hub device 411. The security event data 473 may further include at least one of sensor data 474 from the sensors 414 and/or the automation devices 416 of the first security system 422. In various embodiments, the sensors may include at least one of a door sensor, a window sensor, a flood sensor, a glass break sensor, a contact sensor, a temperature sensor, a smoke detector, a carbon monoxide detector, and a lock/unlock sensor.

The process 1800, at block B1816, determines a security event procedure for one or more second security systems (e.g., the second security system 424A and/or the neighborhood security system 424B) based on analyzing the security event data 473 from the first security system 422. In various embodiments of the present disclosure, the security event procedure may include selecting a user alert from a plurality of user alerts, and transmitting the selected user alert to a client device associated with one or more of the second security systems and/or the neighborhood security systems. The security event procedure may also include transmitting an automatic arming action to one or more of the second security systems and/or the neighborhood security systems.

Figure 19:
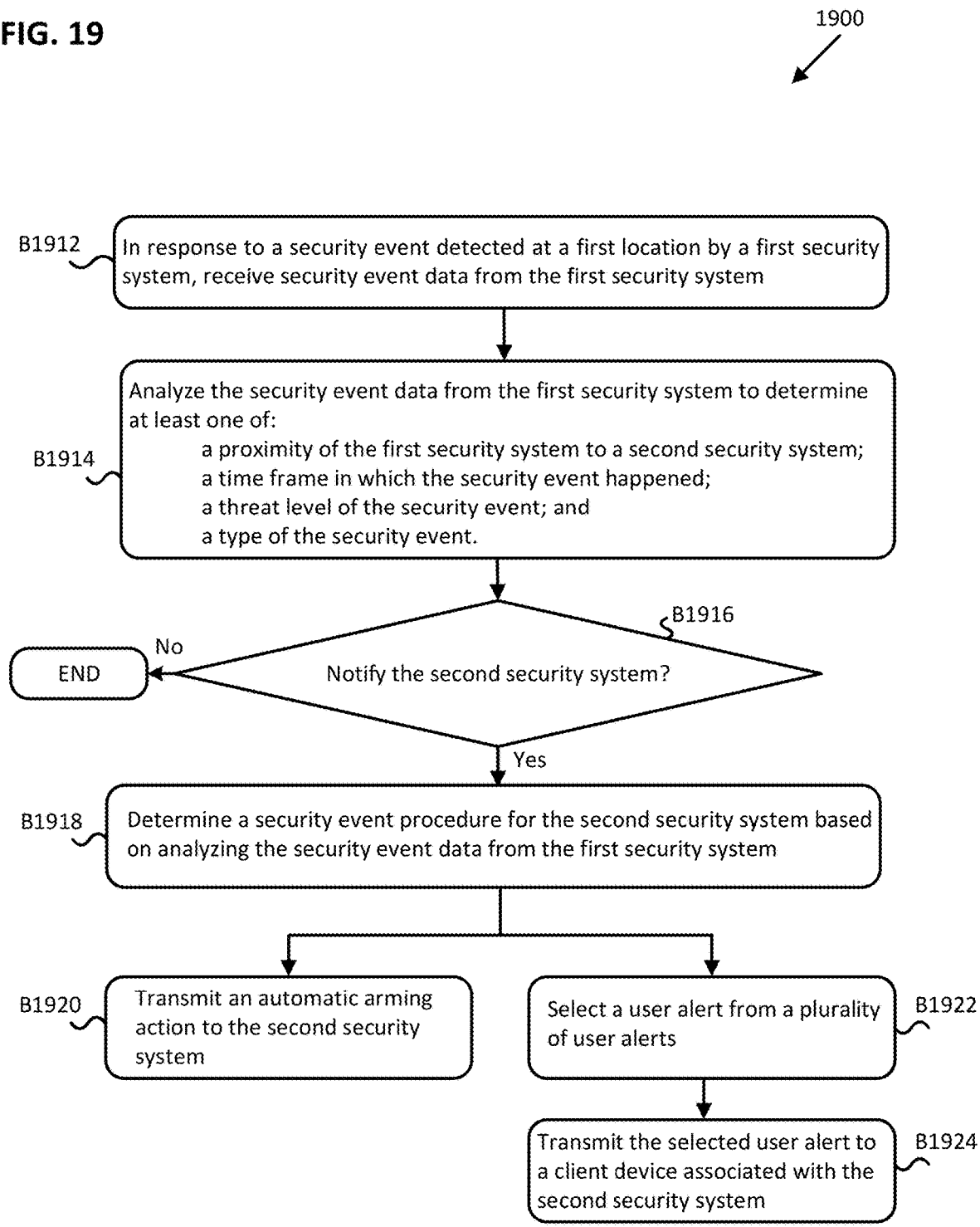

Now referring to FIG. 19, FIG. 19 is a flowchart illustrating a process 1900 for a security network including a first security system installed at a first location and a second security system installed at a second location according to various aspects of the present disclosure. The process 1900, at block B1912, receives security event data from a first security system, in response to a security event detected at a first location by the first security system. For example, the processor 502 of the backend server 430 may receive the security event data 473 representative of a security event from the first security system 422 (e.g., the first hub device 411 and/or the first A/V recording and communication device 402). For example, the security event data 473 may include sensor data 474 generated by the sensors 414 and/or the automation devices 418, the image data 448, 475 generated by the first A/V recording and communication device 402 and/or the first hub device 411, the motion data 446 generated by the first A/V recording and communication device 402 and/or a motion sensor of the sensors 414, the audio data 444, 476 generated by the first A/V recording and communication device 402 and/or the first hub device 411, and/or the text data 445, 477 generated by the A/V recording and communication device 402, the first hub device 411, and/or a user of the client device 404, 406 associated with the first security system 422. For example, the text data 445, 477 may include a description of the type of security alert detected by the first security system 422 (e.g., the first hub device 411 and/or the first A/V recording and communication device 402). This process may be similar to that of block B1812 of the process 1800 of FIG. 18, described above.

In addition to receiving the security event data 473 representative of a security event from the first security system 422, in some of the present embodiments, the backend server 430 may also receive occupancy data pertaining to the second security system 424A located/installed at the second property. In such an example, the sensor data 492 from the sensors 418 (e.g., the motion data from motion sensors), the motion data 460 from the second A/V recording and communication device 403, and/or the audio data 458, 494 may be used (e.g., by the second hub device 412 and/or the backend server 430) to determine the occupancy data of the second property where the second security system 424A (e.g., the second hub device 412) is installed.

For example, in various embodiments, the backend server 430 may receive and/or determine the occupancy data periodically (e.g., without limitation, every 10 seconds, every 30 seconds, every minute, during each check-in by the second hub device 412, etc.). In any embodiment, the occupancy data may be based on the sensor data 492, the audio data 444, 494, the image data 462, 493, and/or the motion data 460. For example, if the sensors 418 include at least one motion sensor interior to the property where the second hub device 412 (and thus the second security system 424A) is located, the sensor data 492 may include detected motion by the motion sensors which may be indicative of the property being occupied. In another example, the audio data 458, 494 may be analyzed to determine if voices are heard, which may be indicative of the property being occupied. As another example, the motion data 460 of the second A/V recording and communication device 403 (and/or other A/V recording and communication devices) may be analyzed and, dependent on the location of the second A/V recording and communication device 403 (e.g., inside or outside), the motion data 460 may be indicative of the property being occupied (as mentioned above, in some embodiments, the motion data 460 may be based on the image data 462 generated by the second A/V recording and communication device 403). For another example, the image data 493 generated by the second hub device 412 (e.g., when the second hub device 412 is located interior to the property), may be analyzed to determine if the property is occupied. In some of the present embodiments, as described above, the occupancy data may be a binary determination, such as occupied and not occupied. In addition, in some embodiments, the occupancy data may also include an estimate of how many people and/or animals are present and/or the location of the people and/or animals at the property (e.g., upstairs, downstairs, in the living room, etc.).

In some of the present embodiments, the backend server 430 may also receive the arming status of the second security system 424A (e.g., armed away, armed stay, disarmed, etc.). In embodiments where the occupancy data and/or the arming status of the second security system 424A are received by the backend server 430, the backend server 430 may subsequently transmit an arming action request having at least one recommended arming action based on the occupancy data of the second property where the second security system 424A is located and/or the arming status of the second security system 424A. For example, if, based on the occupancy data, it is determined that a person is present within the property, the backend server 430 may recommend the second security system 424A to apply an armed stay mode (or another mode configured for the presence of persons within the property). In another example, if, based on the arming status, it is determined that the second security system 424A is in armed vacation mode, the backend server 430 may recommend the second security system 424A to switch to an armed away mode (which, in some embodiments, may be a more secure setting).

As discussed below, the occupancy data and/or the arming status of the second security system 424A may aid the user/owner of the client devices 405, 407 in making a proper selection when the client devices 405, 407 receive an arming action request 2014 from the backend server 430 for arming the second security system 424A.

The process 1900, at block B1914, analyzes the security event data from the first security system to determine at least one of: a proximity of the first security system to the second security system; a time frame in which the security event happened; a threat level of the security event; and a type of the security event.

In determining the proximity of the first security system 422 to the second security system 424A, the backend server 430 may determine a distance between the first location at which the security event occurred and the second location where the second security system is located/installed. The backend server 430 may also consider the network(s) of security systems in which the first security system 422 is included (e.g., based on the proximity/distance to other security systems, such as the second security system 424A to the first security system 422, and/or based on "opt-in" information, etc.).

In determining the time frame of the security event, the backend server 430 may consider whether the security event happened during daytime or nighttime hours.

In determining the threat level of the security event, the backend server 430 may determine whether the security network recognizes one or more people who triggered the security event detected by the first security system 422, and/or whether the first security system 422 recognizes any object carried by the intruder as a weapon or a burglary tool, for example.

In determining the type of the security event, the backend server 430 may determine what sensors of the first security system 422 were triggered during the security event. These analyses of the security event data 473 may help the backend server 430 determine which security systems should receive notification of the security event, and what types of notifications should be sent to these security systems.

For example, the processor 502 of the backend server 430 may analyze the security event data 473 generated by the first security system 422. In various embodiments, the security event data 473 may include at least one of motion data 446 generated by the motion sensor 435, image data 448 generated by the camera 434, and audio data 444 generated by the microphone 436 of the first A/V recording and communication device 402. The security event data 473 may also include at least one of image data 475 generated by the camera 464 and audio data 476 generated by the microphone 465 of the first hub device 411. The security event data 473 may further include at least one of sensor data 474 from the sensors 414 and/or the automation devices 416 of the first security system 422. In various embodiments, the sensors may include at least one of a door sensor, a window sensor, a flood sensor, a glass break sensor, a contact sensor, a temperature sensor, a smoke detector, a carbon monoxide detector, and a lock/unlock sensor.

In various embodiments, the backend server 430 may analyze the security event data 473 in order to determine a security event procedure for each of the security systems that should be notified of the security event.

The process 1900, at block B1916, determines whether the second security system should be notified. If the answer is no, the process 1900 may end. For example, if the distance between the first location at which the security event occurred and the second location where the second security system is located/installed is greater than a predetermined distance threshold, then the backend server 430 may determine that the second security system does not need to be notified. In another example, if the threat level of the security event is low or no threat (e.g., false alarm), then the backend server 430 may determine that the second security system does not need to be notified. In yet another example, if the type of the security event is not of the interest of the second security system, then the backend server 430 may determine that the second security system does not need to be notified. In various embodiments, the types of security events of the interest of the second security system may be customizable by the user/owner of the second security system. For example, the users/owners of the second security systems 424A may select through client devices 405/407/401 the types of security events that they are interested in receiving notifications for, as well as the ones that they are not interested in. For example, the users/owners of the second security systems 424A may not want to receive notification when the security event from the first security system is temperature, flood, and/or carbon monoxide related. They can unselect these security event types on their client devices. In various embodiments, the determination in block B1916 can be made by the backend server 430 in consideration of any combination of the proximity of the first security system to the second security system, the time frame in which the security event happened, the threat level of the security event, and the type of the security event.

If, at block B1916, the determination is yes, the process 1900 may continue to block B1918. In block B1918, the process 1900 determines a security event procedure for the second security system based on analyzing the security event data from the first security system. The security event procedure 499 may include selecting a user alert from a plurality of user alerts, and transmitting the selected user alert to a client device associated with the second security system, as respectively indicated in blocks B1922 and B1924 in the process 1900. Alternatively, or in addition, the security event procedure may include transmitting an automatic arming action to the second security system, as indicated in block B1920 in the process 1900.

The process 1900, in block B1918, may retrieve occupancy data and an arming status from the second security system. For example, the processor 502 of the backend server 430 may retrieve the occupancy data of the second property where the second security system 424A is located and the arming status of the second security system 424A (e.g., based on the most recent arming action 498 implemented by the second security system 424A). In some of the present embodiments, the occupancy data and/or the arming status may be retrieved from the memory (e.g., the non-volatile memory 506) of the backend server 430. In such embodiments, the backend server 430 may be configured to determine and/or store the occupancy data and/or the arming status of the second security system 424A. The occupancy data and/or the arming status may be determined and/or stored periodically, such as every 5 seconds, every 10 seconds, every 30 seconds, every minute, or at each check-in from the second security system 424A (e.g., each check-in from the second hub device 412). In other embodiments, the backend server 430 may query the second security system 424A for the occupancy data and/or the arming status in response to the security event detected by the first security system 422.

In various embodiments, in block B1918, the processor 502 of the backend server 430 may determine the security event procedure 499 for the second security system 424A (and/or the neighborhood security system 424B) based on the security event data 473 from the first security system 422, the occupancy data, and/or the arming status of the second security system 424A. For example, the security event data 473 may be used to determine if the security event is a verifiable security event, such as by analyzing the image data 448, 475 to determine if a suspicious person is present (e.g., using computer vision), by analyzing the sensor data 474 to determine if the perimeter has been breached (e.g., by analyzing the sensor data 474 from the door sensors, the window sensors, and/or the lock sensors), etc. In some of the present embodiments, the security event may be verified based on the actions of the user of the client device 404, 406 associated with the first security system 422 in response to the security event. For example, if the user activated the first A/V recording and communication device 402, activated a lighting automation system, sounded an alarm, alerted law enforcement, etc. in response to the security event (e.g., in response to receiving the user alert 479, 481), the security event may be determined to be verified and the verification may be stored on the backend server 430. In another example, if the security event caused a notification to be sent to a security monitoring service that monitors the first security system 422, the security monitoring service may verify the security event, and the verification may be stored on the backend server 430. In addition, the security event data 473 may be analyzed to determine the threat level, as described above. In some of the present embodiments, the verification of the security event and/or the threat level may be used to determine the security event procedure 499. For example, the security event procedure 499 for the second security system 424A may require notification only when a security event is verified and/or only in response to a threshold threat level, as described above.

In addition, the security event procedure 499 may be determined based on the occupancy data of the property where the second security system 424A is located. For example, the security event procedure 499 may include transmitting an arming action request (e.g., the arming action request 2014 in FIG. 20), where the arming action request may include a recommended arming action. As such, the recommended arming action may be based on the occupancy data, as described above.

In some embodiments, the security event procedure 499 may be based on the arming status. For example, if the second security system 424A is already armed (e.g., armed stay, armed away), the security event procedure 499 may not require any additional action or may only require a notification to be sent to the client device 405, 407 associated with the second security system 424A, and/or a notification to be sent to the client device 401 associated with the neighborhood security system 424B. In addition, as described above, the security event procedure 499 may include selecting a user alert from a plurality of user alerts (at block B1922) and transmitting the selected user alert to a client device associated with the second security system (at block B1924). For example, one of the user alerts may include an arming action request (e.g., the arming action request 2014 in FIG. 20), where the arming action request may include a recommended arming action. As such, the recommended arming action may be based on the arming status. For example, if the system is already armed, such as armed stay, the recommended arming action may only include additional arming actions, such as activating floodlights, closing blinds/shades, and/or recording using the second A/V recording and communication device 403.

In some of the present embodiments, the security event procedure 499 for some of the security systems may include an automatic arming action. The process 1900, at block B1918, determines that the security event procedure is an automatic arming action. When it is determined that the security event procedure 499 is an automatic arming action, the process 1900, at block B1920, transmits the automatic arming action to the second security system. For example, the backend server 430 may transmit the arming action 498 to the second security system 424A (e.g., to the second hub device 412 and/or the second A/V recording and communication device 403). In another example, the backend server 430 may transmit the arming action 1529 to the neighborhood security system 424B to arm one or more of the publicly-accessible security camera devices 433, for example, to start recording video footage, using the camera 1502, in the field of view of the publicly-accessible security camera devices 433. When the camera 1502 is activated, the publicly-accessible security camera device 433 is configured to generate an alert when a person of interest (e.g., the burglar 740) associated with the security event is detected using automatic identification and data capture (AIDC). The alert may be transmitted to the backend server 430, and/or the client devices 401, 404, 406, 405, and 407.

In some of the present embodiments, because the arming action 498 may be transmitted automatically, input from the user/owner of the second security system 424A may not be required. In various embodiments, the automatic arming action as indicated in block B1920 may be performed in conjunction with, or in lieu of, actions shown in blocks B1922 and B1924 in process 1900. For example, in some embodiments, in addition to transmitting the arming action 498 to the second security system 424A, the backend server 430 may transmit a notification (e.g., the user alert 479, 481) to the client device 405 associated with the second security system 424A with an indication that the arming action 498 was transmitted to the second security system 424A and allow the user to update/change/add to the arming action 498 (e.g., by activating one or more of the automation devices 420 and/or the second A/V recording and communication device 403 that were not included in the arming action 498). In some embodiments, in addition to transmitting the arming action 1529 to the neighborhood security system 424B, the backend server 430 may transmit a notification (e.g., the user alert 1527) to the client device(s) 401 associated with the neighborhood security system 424B with an indication that the arming action 1529 was transmitted to the neighborhood security system 424B to allow the users/owners of the client device(s) 401 to monitor or track the progress of the security event.

Figure 20:
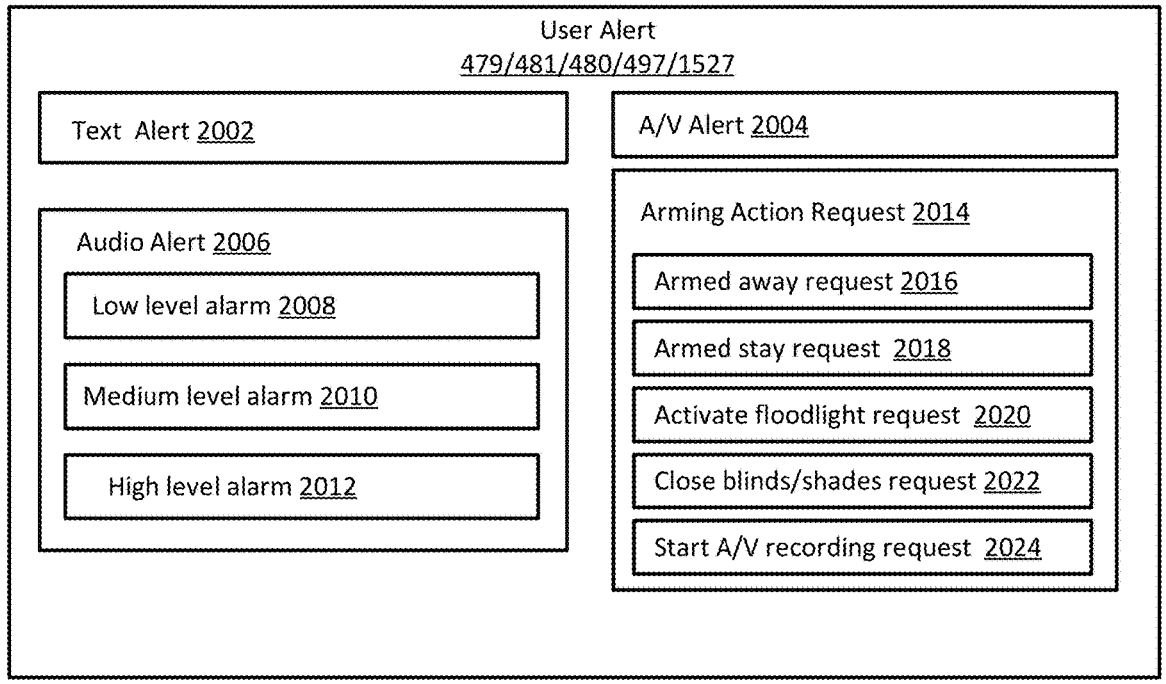
FIG. 20 is a functional block diagram of one embodiment of a user alert according to various aspects of the present disclosure.

In some of the present embodiments, the security event procedure 499 for some of the security systems may include an arming action request (e.g., the arming action request 2014 in FIG. 20). The process 1900, at block B1918, determines that the security event procedure is to select a user alert (e.g., an arming action request). When it is determined that the security event procedure 499 is an arming action request, the process 1900, at blocks B1922 and B1924, selects and transmits, to a client device associated with the second security system, a user alert, such as an arming action request. For example, the processor 502 of the backend server 430 may generate and transmit, using the network interface 520, the arming action request to the client device 405 associated with the second security system 424A.

In various embodiments of the present application, the processor 502 of the backend server 430 may receive from the client device (e.g., the client device 405 associated with the second security system 424A), an arming action. For example, in response to transmitting the arming action request to the client device 405, the processor 502 of the backend server 430, using the network interface 520, may receive the arming action 498 for the second security system 424A from the client device 405. The processor 502 of the backend server 430 may transmit to the second security system 424A, the arming action 498. For example, after receiving the arming action 498, the processor 502 of the backend server 430, using the network interface 520, may transmit the arming action 498 to the second hub device 412 and/or the second A/V recording and communication device 403.

The process 1900 of FIG. 19 may be implemented in a variety of embodiments, including those discussed below. However, the below-detailed embodiments are not intended to be limiting, and are provided merely as example embodiments of the present disclosure. Other embodiments similar to those outlined herein may also fall within the scope of the present disclosure.

With reference to FIGS. 20-24, in an example scenario, a burglar 740 (FIG. 22), who may have a weapon 742, triggers a security event at the property where the first security system 422 is located. In such a scenario, the first security system 422, the second security system 424A, and the neighborhood security system 424B may be part of a network of security systems (e.g., each of the security systems installed on the street 762, each of the security systems in a neighborhood, each of the security systems in a predetermined proximity to the security system where the security event is detected (e.g., security systems within the first proximity region 750, the second proximity region 752, etc.), each of the security systems that are opted into the network, etc.).

In response to the burglar 740 breaking into the first home 728, the first hub device 411 and/or the first A/V recording and communication device 402 of the first security system 422 may transmit the security event data 473 representative of the security event triggered by the burglar 740 to the backend server 430. That is, in response to the burglar 740 breaking into the first home 728, the backend server 430 may receive the security event data 473 representative of the security event triggered by the burglar 740 from the first security system 422 (at block B1912 in FIG. 19).

In some of the present embodiments, the backend server 430 may receive and analyze the security event data 473 to determine which security systems (e.g., the second security system 424A having the A/V recording and communication device 403, and the neighborhood security system 424B having one or more of the publicly-accessible security camera devices 433 (e.g., 433A, 433B, 433C, 433D in FIG. 23)) should be notified of the security event. The backend server 430 may determine the network(s) of home/private security systems in which the first security system 422 is included and/or associated with, and which of those home/private security systems in the determined network should receive notification, such as the user alerts 479/481 and/or automatic arming action 429/498.

For example, the backend server 430 may determine if the first security system 422 and the second security system 424A are included in the same network of security systems. As described above, in some of the present embodiments, the network of security systems may be based on location data (e.g., proximity). For example, it may be determined that each of the security systems within the third proximity region 754 (FIG. 23) should be notified of security events detected by the first security system 422. In some of the present embodiments, the network of security systems may be based on, in addition to or in lieu of the location data, opt-in determinations of security systems (e.g., the users/owners of the security systems opting into the network of security systems). For example, the user/owner of the second security system 424A may be able to opt into the network of security systems that may include all of the security systems in the neighborhood, town, and/or city. In other embodiments, the user/owner of the second security system 424A may desire to receive notification of security events from the first security system 422, but the user/owner of the first security system 422 may not desire to receive notification from the second security system 424A. Thus, the backend server 430 may make determinations while taking into consideration the opt-in/opt-out status of each of the home/private security systems.

In addition, the backend server 430 may also determine the network(s) of other security systems that are not part of the home/private security systems, such as the neighborhood security system 424B, having a plurality of publicly-accessible security camera devices 433, with which the first security system 422 may also be associated (e.g., within the proximity of the first security system 422), and which of those publicly-accessible security camera devices 433 in the determined network(s) should receive the user alerts 1527 and/or automatic arming action 1529.

In some of the present embodiments, the backend server 430 may determine a distance between the first home 728 and the second home 720, and determine, based on the distance, whether the security system 424A should be notified. Since the second home 720 is within the third proximity region 754 (FIG. 23) from the first home 728, the backend server 430 may decide to notify the user/owner of the second security system 424A associated with the second home 720 depending on, among other criteria, the threat level and the type of security event at the first home 728. If the second home 720 were outside of the third proximity region 754 (FIG. 23) from the first home 728, the backend server 430 may decide not to take actions to notify the user/owner of the second security system located/installed at the second home 720.

The backend server 430 may also determine a distance between the first home 728 and the publicly-accessible security camera device 433A, and determine, based on the distance, whether to notify the publicly-accessible security camera device 433A. As shown in FIG. 22, since the publicly-accessible security camera device 433A is located across the street from the first home 728, and since the type of security event is burglary (e.g., as determined using object recognition, or other computer vision, as described above), the backend server 430 may decide to notify the publicly-accessible security camera device 433A. The backend server 430 may also determine a distance between the first home 728 and other publicly-accessible security camera devices (e.g., 433B, 433C, 433D in FIG. 23), and determine, based on the distance, whether to notify those publicly-accessible security camera devices.

In some of the present embodiments, the backend server 430 may also determine the time frame in which the security event happened based on the analysis of the security event data 473. For example, the backend server 430 may determine if the burglary happened at the first home 728 during daytime or nighttime hours, before determining a security event procedure for the second security system 424A and/or the publicly-accessible security camera device(s) 433 of the neighborhood security system 424B.

In some of the present embodiments, the backend server 430 may determine a threat level of the security event based on the analysis of the security event data 473, and determine, based on the threat level, which network(s) of security systems to notify. For example, because the burglar 740 may have the weapon 742 (e.g., as determined using object recognition, or other computer vision, as described above), the threat level may be high. As a result, the third proximity region 754 may be determined, by the backend server 430, to be part of the network of security systems that should be notified, which may include the second security system 424A located at the second home 720 and the neighborhood security system 424B having the publicly-accessible security camera devices 433 located in various places in the third proximity region 754. By contrast, if the burglar 740 was only loitering on/near the first home 728 (e.g., no perimeter breach was detected and/or no weapon 742 was detected), the threat level may be low, and the determination may be that only the security systems in the first proximity region 750 (FIG. 23) should be notified, which may not include the second security system 424A. In some of the present embodiments although the loiterer/potential burglar 740 may pose a low threat to the first home 728 at the moment, the backend server 430 may nevertheless determine that the publicly-accessible security camera devices 433A, 433B, 433C, 433D of the neighborhood security system 424B, which are in the first proximity region 750 (FIG. 23) should be notified. As discussed below, the neighborhood security system 424B may receive an automatic arming action to turn on at least one of the publicly-accessible security camera devices 433A, 433B, 433C, 433D to monitor and/or track the loiterer/potential burglar 740.

In some of the present embodiments, the backend server 430 may also analyze the image data, motion data, sensor data, etc. of other security systems in the network of security systems. For example, the backend server 430 may determine other security systems and/or A/V recording and communication devices installed at homes and publicly-accessible security camera devices installed on the public streets in close proximity to the first security system 422 (e.g., using location data), such as the A/V recording and communication device 725 installed at the third home 730 and the publicly-accessible security camera device 433A installed across the street from the first home 728. For example, the backend server 430 may analyze the image data generated by the A/V recording and communication device 725 and/or the publicly-accessible security camera device 433A to determine if suspicious activity is detected. In an example where the third home 730 also includes a smart-home hub device, the image data, motion data, sensor data, etc. may be analyzed to determine if there is any indication of suspicious activity. In embodiments where it is determined that other security systems, A/V recording and communication devices, and/or publicly-accessible security camera devices, include an indication of suspicious activity, this indication may also be transmitted to the client device 405. For example, the user alert 479, 481 may recite, "Potential break in at 742 Evergreen Terrace at 10:30 a.m. and suspicious person detected at 744 Evergreen Terrace at 10:20 a.m." In such an example, computer vision, as described above, may be used to determine if the suspicious person is the same person that broke into the home at 742 Evergreen Terrace, for example. By providing the user of the client device 405 with the information from surrounding homes and publicly-accessible security camera devices, the user of the client device 405 may be more likely to view the threat as requiring action because the information may provide an indication that the potential threat may be moving from house to house and street to street.

In response to the determination that the users/owners of the second security systems 424A should be notified of the security event, the backend server 430 may determine a security event procedure for at least one of the second security systems 424A based on analyzing the security event data 473 from the first security system 422 (at block B1918 in FIG. 19). In some embodiments, the backend server 430 may determine a security event procedure for the second security system 424A based on analyzing the security event data 473 from the first security system 422, and/or the occupancy data and arming status of the second security system 424A. In some embodiments, the backend server 430 may determine a security event procedure for the neighborhood security system 424B based on analyzing the security event data 473 from the first security system 422, and/or the arming status of the neighborhood security system 424B.

In various embodiments of the present disclosure, once the determination is made that the second security system 424A should be notified of the security event, the backend server 430 may retrieve the occupancy data and the arming status of the second security system 424A. The backend server 430 may then determine the security event procedure 499 for the second security system 424A based on the security event data 473, the occupancy data, and/or the arming status.

In some of the present embodiments, the backend server 430 may select at least one user alert from a plurality of user alerts for each of the security systems (e.g., the first security system 422 and the second security systems 424A). As shown in FIG. 20, the user alert 479/481/480/497/1527 may include a text alert 2002, an A/V alert 2004, an audio alert 2006, and/or an arming action request 2014.

In some of the present embodiments, the backend server 430 may select the text alert 2002 to be transmitted to the client devices 404 and/or 406 associated with the first hub device 411 of the first security system 422, the client devices 405 and/or 407 associated with the second hub device 412 of the second security system 424A, and/or one or more of the client devices 401 associated with the neighborhood security system 424B. In some of the present embodiments, the text alert 2002 may display on the display 525 of the client device 405 as a notification, such as a push-notification, for interaction by the user of the client device 405. For example, the text alert 2002 may display as the text data 445, 477 describing the security event based on the security event data 473 (e.g., "Potential break in at 742 Evergreen Terrace" or "Suspicious activity detected at 742 Evergreen Terrace"). In some of the present embodiments, the text alert 2002 may recite or display the details of the security event at the first home 728. The text alert 2002 may also include one or more public access identifiers associated with one or more of the publicly-accessible security camera devices 433, for the users/owners of the client devices 401 to access (e.g., using the client devices 401) the image data 1517, audio data 1519, and/or motion data 1521 recorded/captured by the publicly-accessible security camera devices 433 and/or transmitted to the backend server 430.

In some of the present embodiments, the backend server 430 may select the audio alert 2006 to be transmitted to the client devices 404 and/or 406 associated with the first hub device 411 of the first security system 422, the client devices 405 and/or 407 associated with the second hub device 412 of the second security system 424A, and/or the client devices 401 associated with one or more of the publicly-accessible security camera devices 433 (e.g., 433A, 433B, 433C, 433D) of the neighborhood security system 424B. The audio alert 2006 may include a low level alarm 2008 (e.g., a short beep), a medium level alarm 2010 (e.g., a long beep or an intermittent siren), and/or a high level alarm 2012 (e.g., a loud and pressing siren), where the backend server 430 may select one of the levels of the audio alarm 2006 (e.g., based on the security event data 473, 491, 1514, the occupancy data, and/or the arming status of the security system(s)) to be transmitted to the client devices 404 and/or 406 associated with the first hub device 411 of the first security system 422, the client devices 405 and/or 407 associated with the second hub device 412 of the second security system 424A, and/or the client devices 401 associated with one or more of the publicly-accessible security camera devices 433 (e.g., 433A, 433B, 433C, 433D) of the neighborhood security system 424B. In various embodiments, each of the different levels of the audio alarm 2006 may be customizable by the users/owners of the client devices 401, 404, 406, 405 and/or 407.

For example, because the burglar 740 may have the weapon 742 (e.g., as determined using object recognition, or other computer vision, as described above), the threat level may be high. As a result, the high level alarm 2012 may be selected, by the backend server 430, to be transmitted to the client devices 404 and/or 406 associated with the first hub device 411 of the first security system 422, the client devices 405 and/or 407 associated with the second hub device 412 of the second security system 424A, and/or the client devices 401 associated with one or more of the publicly-accessible security camera devices 433 (e.g., 433A, 433B, 433C, 433D) of the neighborhood security system 424B. In another example, if the burglar 740 broke into the first home 728, but a weapon was not detected (e.g., as determined using object recognition, or other computer vision, as described above), the threat level may be high for the first security system 422, but medium for the second security system 424A. As a result, while the client devices 404 and/or 406 may still receive the high level alarm 2012 from the backend server 430, the client devices 405 and/or 407 associated with the second hub device 412 of the second security system 424A, and/or the client devices 401 associated with one or more of the publicly-accessible security camera devices 433 (e.g., 433A, 433B, 433C, 433D) of the neighborhood security system 424B, may receive the medium level alarm 2010, selected by the backend server 430. In some of the present embodiments, the audio alert 2006 may be accompanied by the text alert 2002 to inform the users/owners of the client devices 401, 404, 406, 405 and/or 407 of the security event.

In some of the present embodiments, the backend server 430 may select the A/V alert 2004 to be transmitted to the client devices 404 and/or 406 associated with the first hub device 411 of the first security system 422, the client devices 405 and/or 407 associated with the second hub device 412 of the second security system 424A, and/or the client devices 401 associated with one or more of the publicly-accessible security camera devices 433 (e.g., 433A, 433B, 433C, 433D) of the neighborhood security system 424B.

In some of the present embodiments, the A/V alert 2004 may include the video and/or images recorded by the first A/V recording and communication device 402 during the security event. In other embodiments, the A/V alert 2004 may include live streaming video of the first A/V recording and communication device 402 and/or other A/V recording and communication devices that are part of the first security system 422. Viewing the video and/or images may help the users/owners of the client devices 401, 404, 406, 405 and/or 407 determine if the security event is a threat and/or what actions should be taken. In other embodiments, the image data 462, 493 from the second security system 424A may be streamed to the client device 405 along with the user alert 479, 481. This way, the user of the client device 405 may view his or her property where the second security system 424A is located to determine if his or her property is safe and secure.

For example, because the burglar 740 may have the weapon 742 (e.g., as determined using object recognition, or other computer vision, as described above), the threat level may be high. Thus, the backend server 430 may decide to transmit the A/V content (e.g., the motion data 446, the image data 448/475, and/or the audio data 444/476) of the security event from the security event data 473, which may be recorded by the first A/V recording and communication device 402 or by the first hub device 411, to the client devices 404 and/or 406 associated with the first hub device 411 of the first security system 422, the client devices 405 and/or 407 associated with the second hub device 412 of the second security system 424A, and/or the client devices 401 associated with one or more of the publicly-accessible security camera devices 433 (e.g., 433A, 433B, 433C, 433D) of the neighborhood security system 424B. Sending the A/V alert 2004 to client devices 401, 404, 406, 405 and/or 407 may allow the users/owners of the client devices 401, 404, 406, 405 and/or 407 to have a chance to witness what security event has happened to the first home 728, and to make informed decisions on what arming actions to take on their respective properties.

In some of the present embodiments, the backend server 430 may select the arming action request 2014 to be transmitted to the client devices 404 and/or 406 associated with the first hub device 411 of the first security system 422, the client devices 405, 407 associated with the second hub device 412 of the second security system 424A, and/or one or more of the client devices 401 associated with the neighborhood security system 424B. As shown in FIG. 20, the arming action request 2014 may include an armed away request 2016, an armed stay request 2018, an activate floodlight request 2020, a close blinds/shades request 2022, and a start A/V recording request 2024. The arming action request 2014 may include one or more of the requests 2016, 2018, 2020, 2022, 2024, when sent to one or more of the client devices 401, 404, 406 405, 407, which allow the users/owners of the client devices 401, 404, 406 405, 407, to decide the arming actions they deem appropriate for their respective properties. In response to transmitting the arming action request 2014, the backend server 430 may receive the arming action 498 from the client devices 405, 407 (e.g., after a user of the client device 405/407 selects the arming action 498). After receiving the arming action 498, the backend server 430 may transmit the arming action 498 to the second security system 424A (e.g., to the second hub device 412 and/or the second A/V recording and communication device 403).

In addition, in some embodiments, the arming action request may include an additional arming action request 2014, such as activating or adjusting the settings of one or more of the automation devices 420 installed at the second property (e.g., turning on the indoor and/or outdoor lights of a lighting automation system) and/or activating one or more of the A/V recording and communication devices installed at the second property (e.g., activating the second A/V recording and communication device 403 to record the image data 462, activating other security cameras to record image data, and/or turning on floodlights and/or spotlights of A/V recording and communication devices that include floodlights and/or spotlights).

Figure 24:
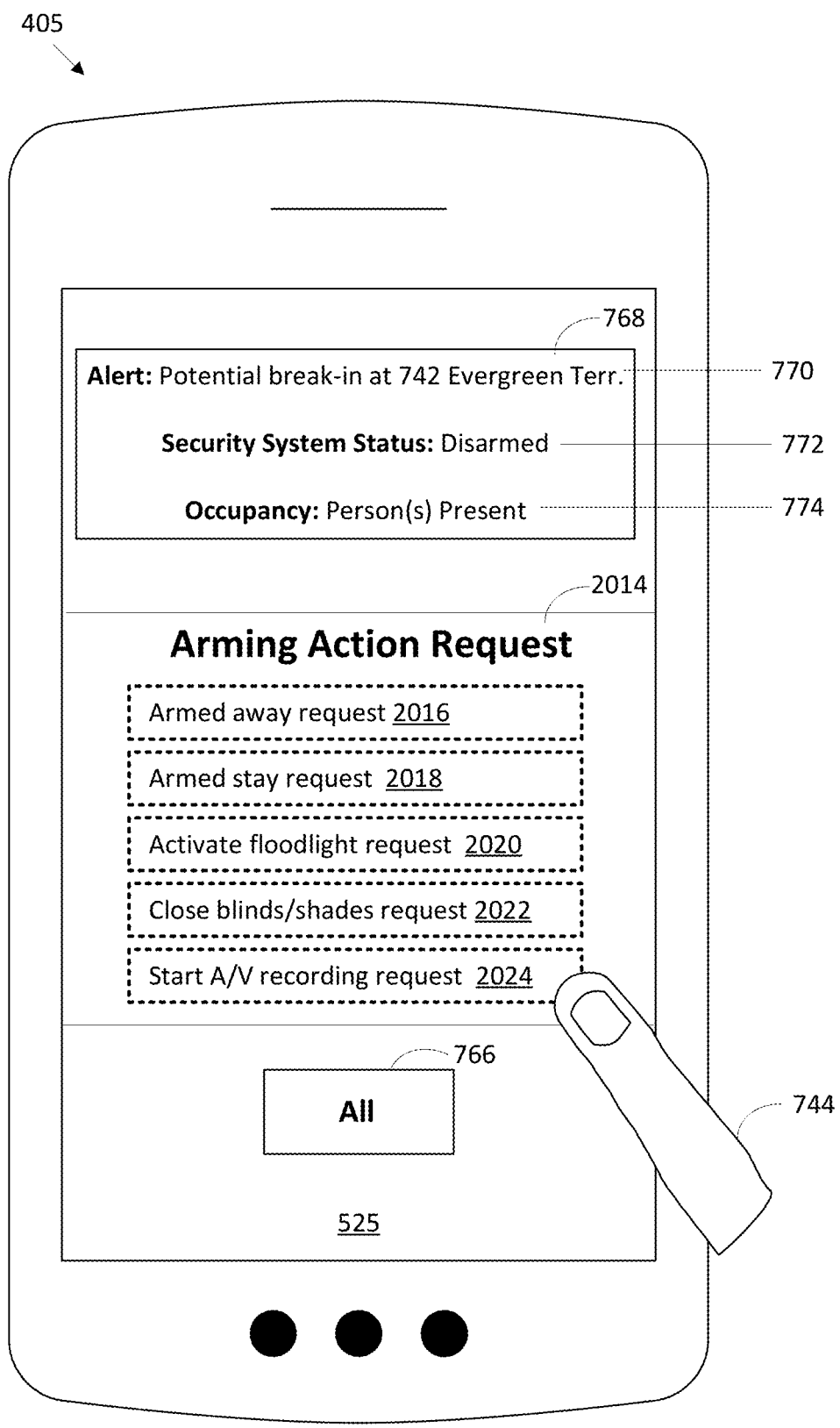
FIG. 24 is a screenshot of a graphical user interface (GUI) illustrating aspects of a process for arming security systems based on communications among a network of security systems according to various aspects of the present disclosure.

In response to receiving the user alert 479, 481, and/or the occupancy data and the arming status, the client device 405 may display the arming action request 2014 available to the user 744 of the client device 405 for arming the second security system 424. The arming action request 2014 may include recommended arming actions generated by the backend server 430 and received by the client device 405, for example. As described above, the arming action recommendation may be based on the occupancy data, the arming status, the security event data 473, and/or the security event procedures 499 for the second security system 424. In some of the present embodiments, as shown in FIG. 24, one or more of the arming action requests 2014, such as the armed away request 2016, the armed stay request 2018, the activate floodlight request 2020, the close blinds/shades request 2022, and the start A/V recording request 2024 may be displayed on the display 525 of the client device 405. In some embodiments, the user 744 may be able select and/or confirm the arming action requests 2014 on the display 525. In some embodiments, the user 744 may select all of the arming actions requests 2014 from the backend server 430 by using the activate all button 766, for example.

In some of the present embodiments, the display 525 of the client device 405 may display security event information 768 representative of the security event at the first home 728, the arming status indicator 772 of the second security system 424A associated with the client device 405, and/or the occupancy indicator 774 of the second home 720 at which the second security system 424A is installed. For example, the security event information 768 may include a description of the security event 770, which may be based on the security event data 473, 491, 1514 from the first security system 422. In addition, the security event information 768 may include the arming status indicator 772 indicative of the arming status of the second security system 424A. In some embodiments, the security event information 768 may include an occupancy indicator 774, which may be based on the occupancy data. The security event information 768 may aid the user 744 of the client device 405 in determining the proper actions to activate for the second security system 424.

In response to displaying the arming action request(s) 2014 and/or the security event information 768, the user 744 may select, and the client device 405 may receive, the arming action (which may be the arming action 498 from the arming action recommendation) for the second security system 424A. In response to receiving the selection, the client device 405 may transmit (in some embodiments via the backend server 430) the arming action 498 to the second hub device 412 and/or the second A/V recording and communication device 403 for arming the second security system 424A.

In various embodiments of the present disclosure, the backend server 430 may select and transmit the text alert 2002, the A/V alert 2004, the audio alert 2006, and the arming action request 2014, either singly or in any combination thereof, to one or more of the client devices 401, 404, 406 405, 407.

In some of the present embodiments, in addition to, or in lieu of, selecting and transmitting the user alerts (in blocks B1922 and B1924 in FIG. 19), the backend server 430 may transmit an automatic arming action 429/498/1529 to the client devices 404 and/or 406 associated with the first hub device 411 of the first security system 422, the client devices 405, 407 associated with the second hub device 412 of the second security system 424A, and/or one or more of the publicly-accessible security camera devices 433 of the neighborhood security system 424B (in block B1920 in FIG. 19).

Figure 21:
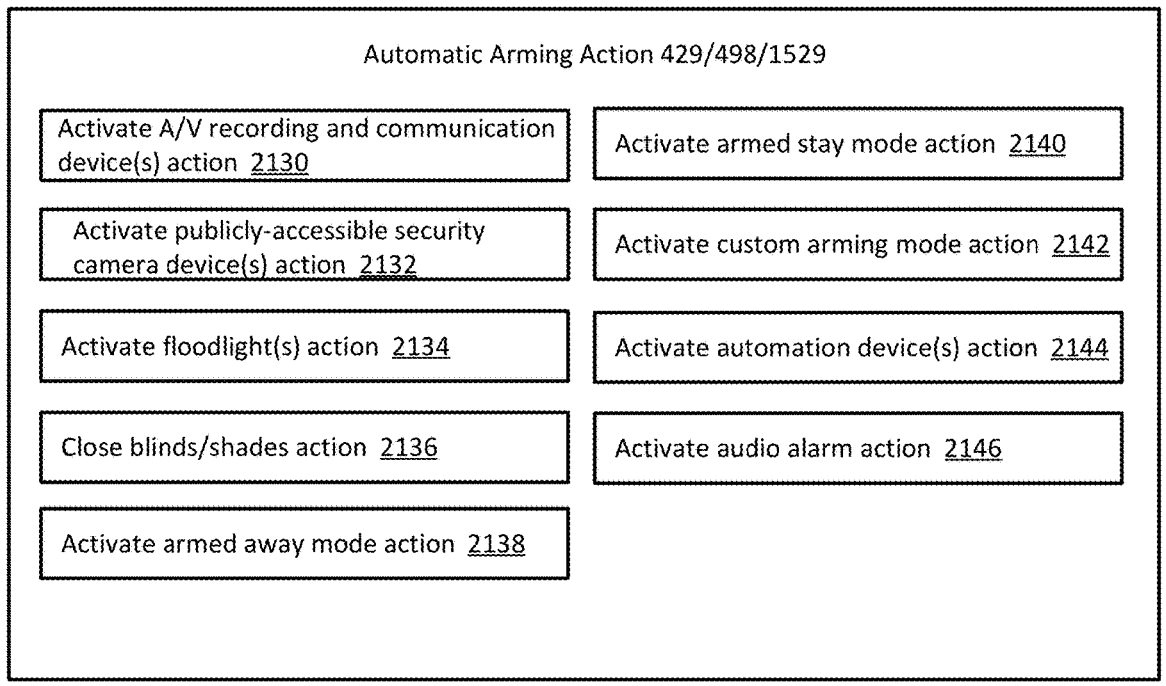
FIG. 21 is a functional block diagram of one embodiment of automatic arming actions according to various aspects of the present disclosure.

In FIG. 21, the automatic arming action 429/498/1529 may include an activating A/V recording and communication device(s) action 2130, an activating public-accessible security camera device(s) action 2132, an activating floodlight(s) action 2134, a closing blinds/shades action 2136, an activating armed away mode action 2138, an activating armed stay mode action 2140, an activating custom arming mode action 2142, an activating automation device(s) action 2144, and/or an activating audio alarm action 2146. The automatic arming action 429/498/1529 may be automatically selected by the backend server 430 based on the security event data 473, 491, 1514, the occupancy data, and/or the arming status of the security system(s) without requiring input from the user(s)/owner(s) of the security system(s), such as the user(s)/owner(s) of the client devices 401, 404, 406 405, 407.

For example, the security event data 473 may indicate that the burglar 740 has broken into the first home 728 and may have a weapon 742. As a result, the automatic arming action 498 to the second security system 424A may include activating armed away mode 2138 or armed stay mode 2140 (e.g., based on the occupancy data), and also may include closing the blinds/shades 2136 (e.g., using a blinds/shades automation system), the activating automation device action 2144 (e.g., to turn on an outdoor lighting automation system), the activating A/V recording and communication device(s) action 2130 (e.g., activating the second A/V recording and communication device 403 to record the image data 462), the activating audio alarm action 2146 of the second security system 424A (e.g., using a separate speaker, using the speaker 484 of the second hub device 412, and/or using the speaker 451 of the second A/V recording and communication device 403). In some of the present embodiments, the arming status may be used to determine which of the sensors 418, the automation devices 420, and/or the second A/V recording and communication devices 403 should be activated and/or have their status changed based on the arming action 498. For example, if the outdoor lighting automation system is activated already, the arming action 498 may not include any update to the outdoor lighting automation system. If the second security system 424A is in an armed vacation mode, the arming action 498 may update the second security system 424A to be in an armed away mode, which may be more secure than the armed vacation mode. In various embodiments, the automatic arming action 429 may also be applied to the first security system 422.

In addition, the backend server 430 may select and transmit the activating publicly-accessible security camera device(s) action 2132 to one or more of the publicly-accessible security camera devices 433 associated with the neighborhood security system 424B. For example, the security event data 473 may indicate that the burglar 740 has broken into the first home 728 and may have a weapon 742. As a result, the automatic arming action 1529 to the neighborhood security system 424B may include the activating publicly-accessible security camera device(s) action 2132 to one or more of the publicly-accessible security camera devices 433A, 433B, 433C, 433D of the neighborhood security system 424B, for example, to record the image data 1517, audio data 1519, and/or motion data 1521, to monitor and track the progress of the security event (e.g., the burglary at the first home 728).

The backend server 430 may also transmit a text alert 2002 to one or more of the client devices 401 associated with the publicly-accessible security camera devices 433, where the text alert 2002 may include one or more public access identifiers associated with one or more of the publicly-accessible security camera devices 433, to allow users/owners of the client devices 401 to access the image data 1517, the audio data 1519, and/or the motion data 1521, recorded/captured by the publicly-accessible security camera devices 433.

In various embodiments, the activating custom arming mode action 2142 allows the user/owners of the first security system 422 and the second security systems 424A to customize the automatic arming action they desire to receive from the backend server 430 when there is a security event in the network(s) of security systems.

In some of the present embodiments, as described above, the backend server 430 may also use the clock data to determine the security event procedure 499 for the second security system 424A. For example, the security event procedure 499 may be an automatic arming action during a first portion of the day (e.g., 11:00 p.m. to 4:00 a.m.), and/or on one or more certain days of the week (e.g., Saturdays), while the security event procedure 499 may be an arming action request during other portions of the day (e.g., 9:00 a.m. to 4:00 p.m.), and/or on other days of week (e.g., Mondays, Tuesdays, and Wednesdays). For example, as described herein, the user of the second security system 424A may be able to configure the security event procedures 499. In such examples, the user may set schedules (e.g., hourly schedules, daily schedules, weekly schedules, and so on) as part of the security event procedures 499, such that the backend server 430 may first determine the time and/or day using the clock data, and then use the time and/or day when analyzing the security event procedure 499 to determine the arming action 498 for the second security system 424A.

As described above, in some of the present embodiments, the clock data may be used along with the proximity information, the threat level, and/or the threat type. For example, based on the proximity and the time of day, the arming action 498 may include different types of alerts. In such an example, if the security event is detected by a security system within two-hundred-fifty yards of the second security system 424A, during daytime hours, the second security system 424A may sound an audible alarm and transmit an audible notification to the client device 405. If the security event is detected by a security system within two-hundred-fifty yards of the second security system 424A, during evening hours, the second security system 424A may sound a silent alarm, automatically arm, and the client device 405 may receive a vibration notification. In another example, if the threat level of the security event is high, and the security event occurs during daytime hours, the second security system 424A may sound an audible alarm and transmit an audible notification to the client device 405. If the threat level of the security event is high, and the security event occurs during evening hours, the second security system 424A may sound a silent alarm, automatically arm, and the client device 405 may receive a vibration notification.

Figure 25:
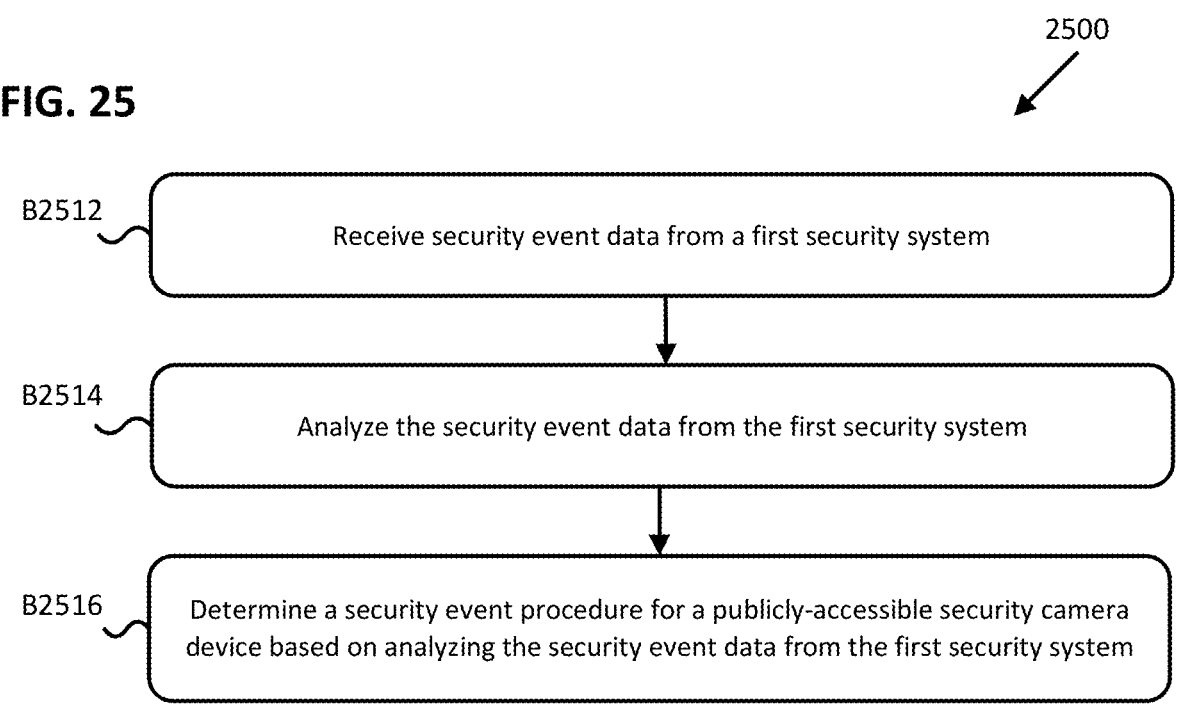
FIGS. 25 and 26 are flowcharts illustrating processes for a security network including a first security system installed at a first location and a publicly-accessible security camera device installed at a second location according to various aspects of the present disclosure.

Now referring to FIG. 25, FIG. 25 is a flowchart illustrating a process 2500 for a security network including a first security system installed at a first location and a publicly-accessible security camera device installed at a second location according to various aspects of the present disclosure. The process 2500, at block B2512, receives security event data from a first security system. For example, the processor 502 of the backend server 430 may receive the security event data 473 from the first security system 422 (e.g., the first hub device 411 and/or the first A/V recording and communication device 402). For example, the security event data 473 may be generated by the first hub device 411 and/or the first A/V recording and communication device 402 including the sensor data 474, the image data 448, 475 (e.g., video data captured by the camera 434 of the first A/V recording and communication device 402 at the time of the security event), the motion data 446, the audio data 444, 476, and/or the text data 445, 477. For example, the text data 445, 477 may include a description of the type of security alert detected by the first security system 422 (e.g., the first hub device 411 and/or the first A/V recording and communication device 402).

The process 2500, at block B2514, analyzes the security event data from the first security system. For example, the processor 502 of the backend server 430 may analyze the security event data 473 generated by the first security system 422. In various embodiments, the security event data 473 may include at least one of motion data 446 generated by the motion sensor 435, image data 448 generated by the camera 434, and audio data 444 using the microphone 436 of the first A/V recording and communication device 402. The security event data 473 may also include at least one of image data 475 captured by the camera 464 and audio data 476 captured by the microphone 465 of the first hub device 411. The security event data 473 may further include at least one of sensor data 474 from the sensors 414 and/or the automation devices 416 of the first security system 422. In various embodiments, the sensors may include at least one of a door sensor, a window sensor, a flood sensor, a glass break sensor, a contact sensor, a temperature sensor, a smoke detector, a carbon monoxide detector, and a lock/unlock sensor.

The process 2500, at block B2516, determines a security event procedure for one or more of the publicly-accessible camera devices 433 of the neighborhood security system 424B based on analyzing the security event data 473 from the first security system 422. In various embodiments of the present disclosure, the security event procedure may include transmitting an automatic arming action to one or more of the publicly-accessible camera devices 433, and/or transmitting a user alert to a client device associated with one or more of the publicly-accessible camera devices 433.

Figure 26:
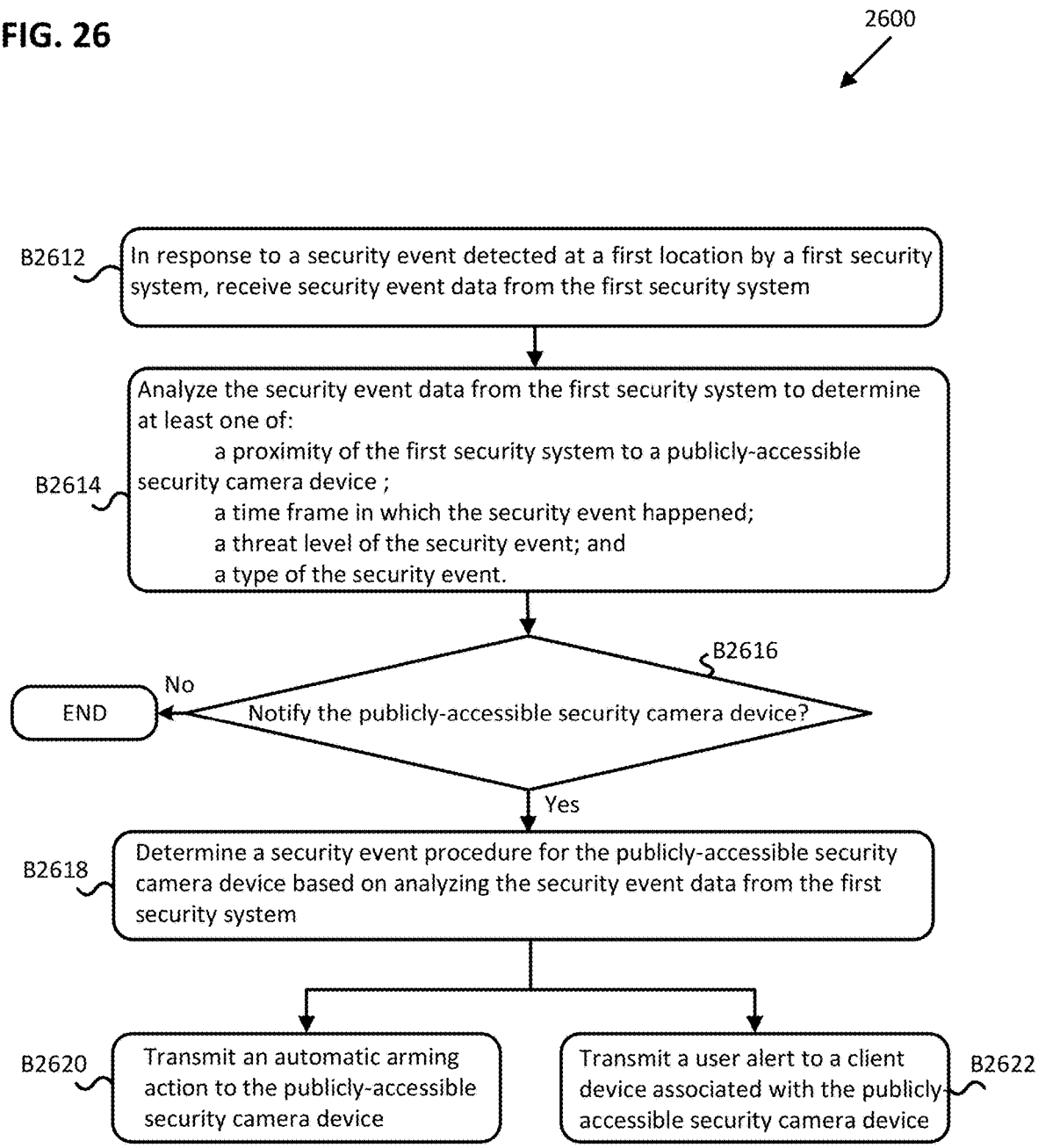

Now referring to FIG. 26, FIG. 26 is a flowchart illustrating a process 2600 for a security network including a first security system installed at a first location and a publicly-accessible security camera device installed at a second location according to various aspects of the present disclosure. The process 2600, at block B2612, receives security event data from a first security system, in response to a security event detected at a first location by the first security system. For example, the processor 502 of the backend server 430 may receive the security event data 473 representative of a security event from the first security system 422 (e.g., the first hub device 411 and/or the first A/V recording and communication device 402). The block B2612 may be substantially similar to block B1912 in FIG. 19. Thus, the detailed description of the block B2612 will be omitted for brevity.

The process 2600, at block B2614, analyzes the security event data from the first security system to determine at least one of: a proximity of the first security system to the publicly-accessible security camera device; a time frame in which the security event happened; a threat level of the security event; and a type of the security event.

In determining the proximity of the first security system 422 to the publicly-accessible security camera device of the neighborhood security system 424B, the backend server 430 may determine a distance between the first location at which the security event occurred and the second location where the publicly-accessible security camera device is located/installed.

In determining the time frame of the security event, the backend server 430 may consider whether the security event happened during daytime or nighttime hours.

In determining the threat level of the security event, the backend server 430 may determine whether the security network recognizes one or more people who triggered the security event detected by the first security system 422, and/or whether the first security system 422 recognizes any object carried by the intruder as a weapon or a burglary tool, for example.

In determining the type of the security event, the backend server 430 may determine what sensors of the first security system 422 were triggered during the security event. These analyses of the security event data 473 may aid the backend server 430 in determining which of the publicly-accessible security camera devices 433 of the neighborhood security system 424B should be notified of the security event.

For example, the processor 502 of the backend server 430 may analyze the security event data 473 generated by the first security system 422. In various embodiments, the security event data 473 may include at least one of motion data 446 generated by the motion sensor 435, image data 448 generated by the camera 434, and audio data 444 generated by the microphone 436 of the first A/V recording and communication device 402. The security event data 473 may also include at least one of image data 475 generated by the camera 464 and audio data 476 generated by the microphone 465 of the first hub device 411. The security event data 473 may further include at least one of sensor data 474 from the sensors 414 and/or the automation devices 416 of the first security system 422. In various embodiments, the sensors may include at least one of a door sensor, a window sensor, a flood sensor, a glass break sensor, a contact sensor, a temperature sensor, a smoke detector, a carbon monoxide detector, and a lock/unlock sensor.

In various embodiments, the backend server 430 may analyze the security event data 473 in order to determine a security event procedure for each of the publicly-accessible security camera devices that should be notified of the security event.

The process 2600, at block B2616, determines whether the publicly-accessible security camera device(s) should be notified. If the answer is no, the process 2600 may end. For example, if the distance between the first location at which the security event occurred and the second location where the publicly-accessible security camera device is located/installed is greater than a predetermined distance threshold, then the backend server 430 may determine that the publicly-accessible security camera device does not need to be notified. In another example, if the threat level of the security event is low or no threat (e.g., false alarm), then the backend server 430 may determine that the publicly-accessible security camera device does not need to be notified. In yet another example, if the type of the security event is not of the interest of the users associated with the publicly-accessible security camera devices in the neighborhood security system, then the backend server 430 may determine that the publicly-accessible security camera devices do not need to be notified. In various embodiments, the types of security events of the interest of the users associated with the publicly-accessible security camera devices may be customizable by the users. For example, the users associated with the neighborhood security system 424B may select through client devices 401 the types of security events that they are interested in receiving notification for, as well as the ones that they are not interested in. For example, the users associated with the neighborhood security system 424B may not want to receive notification when the security event from the first security system is temperature, flood, and/or carbon monoxide related. They can unselect these security event types on their client devices. In various embodiments, the determination in block B2616 can be made by the backend server 430 in consideration of any combination of the proximity of the first security system to the publicly-accessible security camera devices of the neighborhood security system, the time frame in which the security event happened, the threat level of the security event, and the type of the security event.

If, at block B2616, the determination is yes, the process 2600 may continue to block B2618. In block B2618, the process 2600 determines a security event procedure for the publicly-accessible security camera devices in the neighborhood security system based on analyzing the security event data from the first security system. The security event procedure 499 may include transmitting an automatic arming action to one or more of the publicly-accessible security camera devices, and/or transmitting a user alert to client device associated with one or more of the publicly-accessible security camera devices, as respectively indicated in blocks B2620 and B2622 in the process 2600.

In various embodiments, in block B2618, the processor 502 of the backend server 430 may determine the security event procedure 499 for the publicly-accessible security camera devices in the neighborhood security system 424B based on the security event data 473 from the first security system 422, and/or the arming status of the publicly-accessible security camera devices. For example, the security event data 473 may be used to determine if the security event is a verifiable security event, such as by analyzing the image data 448, 475 to determine if a suspicious person is present (e.g., using computer vision), by analyzing the sensor data 474 to determine if the perimeter has been breached (e.g., by analyzing the sensor data 474 from the door sensors, the window sensors, and/or the lock sensors), etc.

In some of the present embodiments, the security event may be verified based on the actions of the user of the client device 404, 406 associated with the first security system 422 in response to the security event. For example, if the user activated the first A/V recording and communication device 402, activated a lighting automation system, sounded an alarm, alerted law enforcement, etc. in response to the security event (e.g., in response to receiving the user alert 479, 481), the security event may be determined to be verified and the verification may be stored on the backend server 430. In another example, if the security event caused a notification to be sent to a security monitoring service that monitors the first security system 422, the security monitoring service may verify the security event, and the verification may be stored on the backend server 430. In addition, the security event data 473 may be analyzed to determine the threat level, as described above. In some of the present embodiments, the verification of the security event and/or the threat level may be used to determine the security event procedure 499. For example, the security event procedure 499 of one or more of the publicly-accessible security camera devices of the neighborhood security system 424B may require notification only when a security event is verified and/or only in response to a threshold threat level, as described above.

In some of the present embodiments, the security event procedure 499 for one or more of the publicly-accessible security camera devices 433 of the neighborhood security system 424B may include an automatic arming action. The process 2600, at block B2618, determines that the security event procedure is an automatic arming action. When it is determined that the security event procedure 499 is an automatic arming action, the process 2600, at block B2620, transmits the automatic arming action to the publicly-accessible security camera devices of the neighborhood security system. For example, the backend server 430 may transmit the arming action 1529 to the neighborhood security system 424B to arm one or more of the publicly-accessible security camera devices 433, for example, to start recording video footage, using the camera 1502 in the field of view of the camera 1502 of the publicly-accessible security camera devices 433. When the camera 1502 is activated, the publicly-accessible security camera device 433 is configured to generate an alert when a person of interest (e.g., the burglar 740) associated with the security event is detected using automatic identification and data capture (AIDC). The alert may be transmitted to the backend server 430, and/or the client devices 401, 404, 406, 405, and 407.

In some of the present embodiments, because the arming action 1529 may be transmitted automatically, input from the users associated with the neighborhood security system 424B may not be required. In various embodiments, the automatic arming action as indicated in block B2620 may be performed in conjunction with, or in lieu of, actions shown in block B2622 in the process 2600. For example, in some embodiments, in addition to transmitting the arming action 1529 to the neighborhood security system 424B, the backend server 430 may transmit a notification (e.g., the user alert 1527) to the client device(s) 401 associated with the publicly-accessible security camera devices 433 of the neighborhood security system 424B with an indication that the arming action 1529 was transmitted to the publicly-accessible security camera devices 433 in the neighborhood security system 424B and allow the users/owners of the client devices 401 to access the video footage recorded/captured by the one or more of the publicly-accessible security camera devices 433. This allows the users/owners of the client devices 401 to monitor or track the progress of the security event.

The process 2600 of FIG. 26 may be implemented in a variety of embodiments, including those discussed below. However, the below-detailed embodiments are not intended to be limiting, and are provided merely as example embodiments of the present disclosure. Other embodiments similar to those outlined herein may also fall within the scope of the present disclosure.

With reference to FIGS. 20-24, in an example scenario, a burglar 740 (who may have a weapon 742) triggers a security event at the property where the first security system 422 is located. In such a scenario, the first security system 422, the second security system 424A, and the neighborhood security system 424B may be part of a network of security systems (e.g., each of the security systems installed on the street 762, each of the security systems in a neighborhood, each of the security systems in a predetermined proximity to the security system where the security event is detected (e.g., security systems within the first proximity region 750, the second proximity region 752, etc.), each of the security systems that are opted into the network, etc.).

In response to the burglar 740 breaking into the first home 728, the first hub device 411 and/or the first A/V recording and communication device 402 of the first security system 422 may transmit the security event data 473 representative of the security event triggered by the burglar 740 to the backend server 430. That is, in response to the burglar 740 breaking into the first home 728, the backend server 430 may receive the security event data 473 representative of the security event triggered by the burglar 740 from the first security system 422 (at block B2612 in FIG. 26).

In some of the present embodiments, the backend server 430 may receive and analyze the security event data 473 to determine which security systems (e.g., the second security system 424A having the A/V recording and communication device 403, and the neighborhood security system 424B having one or more of the publicly-accessible security camera devices 433 (e.g., 433A, 433B, 433C, 433D in FIG. 23)) should be notified of the security event.

In addition, the backend server 430 may also determine, in addition to the second security system 424A, which of the publicly-accessible security camera devices 433 in the neighborhood security system 424B should receive the user alerts 1527 and/or automatic arming action 1529.

In some of the present embodiments, the backend server 430 may determine a distance between the first home 728 and the publicly-accessible security camera device 433A, and determine, based on the distance, whether to notify the publicly-accessible security camera device 433A. As shown in FIG. 22, since the publicly-accessible security camera device 433A is located across the street from the first home 728, and since the type of security event is burglary (e.g., as determined using object recognition, or other computer vision, as described above), the backend server 430 may decide to notify the publicly-accessible security camera device 433A. The backend server 430 may also determine the distances between the first home 728 and other publicly-accessible security camera devices (e.g., 433B, 433C, 433D in FIG. 23), and determine, based on the distances, whether to notify those publicly-accessible security camera devices.

In some of the present embodiments, the backend server 430 may also determine the time frame in which the security event happened based on the analysis of the security event data 473. For example, the backend server 430 may determine if the burglary happened at the first home 728 during daytime or nighttime hours, before determining a security event procedure for the publicly-accessible security camera device(s) 433 of the neighborhood security system 424B.

In some of the present embodiments, the backend server 430 may determine a threat level of the security event based on the analysis of the security event data 473, and determine, based on the threat level, which network(s) of security systems to notify. For example, because the burglar 740 may have the weapon 742 (e.g., as determined using object recognition, or other computer vision, as described above), the threat level may be high. As a result, the third proximity region 754 may be determined, by the backend server 430, to be part of the network of security systems that should be notified, which may include the neighborhood security system 424B having the publicly-accessible security camera devices 433 located in various places in the third proximity region 754. By contrast, if the burglar 740 was only loitering on/near the first home 728 (e.g., no perimeter breach was detected and/or no weapon 742 was detected), the threat level may be low, and the determination may be that only the publicly-accessible security camera device 433A, in the first proximity region 750 (FIG. 23) should be notified. In some of the present embodiments although the loiterer/potential burglar 740 may pose a low threat to the first home 728 at the moment, the backend server 430 may nevertheless determine that the publicly-accessible security camera devices 433A, 433B, 433C, 433D of the neighborhood security system 424B, which are in the first proximity region 750 (FIG. 23) should be notified. As discussed below, the neighborhood security system 424B may receive an automatic arming action to turn on at least one of the publicly-accessible security camera devices 433 to monitor and/or track the loiterer/potential burglar 740.

In some of the present embodiments, the backend server 430 may also analyze the image data, motion data, sensor data, etc. of other security systems in the network of security systems. For example, the backend server 430 may determine other security systems and/or A/V recording and communication devices installed at homes and publicly-accessible security camera devices installed on the public streets in close proximity to the first security system 422 (e.g., using location data), such as the publicly-accessible security camera device 433A installed across the street from the first home 728. For example, the backend server 430 may analyze the image data generated by the publicly-accessible security camera device 433A to determine if suspicious activity is detected. In embodiments where it is determined that other publicly-accessible security camera devices, include an indication of suspicious activity, this indication may also be transmitted to the client device(s) 401. For example, the user alert 1527 may recite, "Potential break in at 742 Evergreen Terrace at 10:30 a.m. and suspicious person detected at 744 Evergreen Terrace at 10:20 a.m." In such an example, computer vision, as described above, may be used to determine if the suspicious person is the same person that broke into the home at 742 Evergreen Terrace, for example. By providing the users of the client devices 401 with the information from surrounding publicly-accessible security camera devices, the users of the client device 401 may be more likely to view the threat as requiring action because the information may provide an indication that the potential threat may be moving from house to house and street to street.

In response to the determination that one or more of the users/owners of the client devices 401 of the neighborhood security system 424B should be notified of the security event, the backend server 430 may determine a security event procedure 499 for one or more of the publicly-accessible security camera devices based on analyzing the security event data 473 from the first security system 422 (at block B2618 in FIG. 26). In some embodiments, the backend server 430 may determine a security event procedure 499 for each of the publicly-accessible security camera devices 433 of the neighborhood security system 424B based on analyzing the security event data 473 from the first security system 422, and/or the arming status of the neighborhood security system 424B.

In some of the present embodiments, the backend server 430 may transmit the user alert 1527 to one or more client devices 401 associated with the publicly-accessible security camera devices 433. As shown in FIG. 20, the user alert 1527 may include a text alert 2002, an A/V alert 2004, an audio alert 2006, and/or an arming action request 2014.

In some of the present embodiments, the backend server 430 may select the text alert 2002 to be transmitted to one or more of the client devices 401 associated with one or more of the publicly-accessible security camera devices 433 of the neighborhood security system 424B. In some of the present embodiments, the text alert 2002 may display a notification, such as a push-notification, for interaction by the user(s)/owner(s) of the client device(s) 401. For example, the text alert 2002 may display as the text data 445, 477 describing the security event based on the security event data 473 (e.g., "Potential break in at 742 Evergreen Terrace" or "Suspicious activity detected at 742 Evergreen Terrace"). In some of the present embodiments, the text alert 2002 may recite or display the details of the security event at the first home 728. The text alert 2002 may also include one or more public access identifiers associated with one or more of the publicly-accessible security camera devices 433, for the user(s)/owner(s) of the client device(s) 401 to access the image data 1517, audio data 1519, and/or motion data 1521 recorded/captured by the publicly-accessible security camera devices 433 and/or transmitted to the backend server 430.

In some of the present embodiments, the backend server 430 may select the audio alert 2006 to be transmitted to the client devices 401 associated with one or more of the publicly-accessible security camera devices 433 (e.g., 433A, 433B, 433C, 433D) of the neighborhood security system 424B. The audio alert 2006 may include a low level alarm 2008 (e.g., a short beep), a medium level alarm 2010 (e.g., a long beep or an intermittent siren), and a high level alarm 2012 (e.g., a loud and pressing siren), where the backend server 430 may select one of the levels of the audio alarm 2006 (e.g., based on the security event data 473, 491, 1514, the occupancy data, and/or the arming status of the security system(s)) to be transmitted to the client devices 401 associated with one or more of the publicly-accessible security camera devices 433 (e.g., 433A, 433B, 433C, 433D) of the neighborhood security system 424B. In various embodiments, each of the different levels of the audio alarm 2006 may be customizable by the users/owners of the client devices 401.

For example, because the burglar 740 may have the weapon 742 (e.g., as determined using object recognition, or other computer vision, as described above), the threat level may be high. As a result, the high level alarm 2012 may be selected, by the backend server 430, to be transmitted to the client devices 401 associated with one or more of the publicly-accessible security camera devices 433 (e.g., 433A, 433B, 433C, 433D) of the neighborhood security system 424B. In another example, if the burglar 740 broke into the first home 728, but a weapon was not detected (e.g., as determined using object recognition, or other computer vision, as described above), the threat level may be high for the first security system 422, but medium for the neighborhood security system 424B. As a result, while the client devices 404 and/or 406 may still receive the high level alarm 2012 from the backend server 430, the client devices 401 associated with one or more of the publicly-accessible security camera devices 433 (e.g., 433A, 433B, 433C, 433D) of the neighborhood security system 424B, may receive the medium level alarm 2010, selected by the backend server 430. In some of the present embodiments, the audio alert 2006 may be accompanied by the text alert 2002 to inform the users/owners of the client devices 401, 404, 406, 405 and/or 407 of the security event.

In some of the present embodiments, the backend server 430 may select the A/V alert 2004 to be transmitted to the client devices 401 associated with one or more of the publicly-accessible security camera devices 433 (e.g., 433A, 433B, 433C, 433D) of the neighborhood security system 424B. In various embodiments, since the users associated with the publicly-accessible security camera devices 433 may not own a private security system, or be part of a private security network, receiving the A/V alert 2004 (having motion data, image data, audio data, etc.) from the first security system 422 may be subject to the user/owner of the first security system 422 granting permission to the users associated with the publicly-accessible security camera devices 433. In some of the present embodiments, the A/V alert 2004 may include the video and/or images recorded by the first A/V recording and communication device 402 during the security event. In other embodiments, the A/V alert 2004 may include live streaming video of the first A/V recording and communication device 402 and/or other A/V recording and communication devices that are part of the first security system 422. Viewing the video and/or images may aid the user(s)/owner(s) of the client device(s) 401, in determining if the security event is a threat and/or what actions should be taken.

For example, because the burglar 740 may have the weapon 742 (e.g., as determined using object recognition, or other computer vision, as described above), the threat level may be high. Thus, the backend server 430 may decide to transmit the A/V content (e.g., the motion data 446, the image data 448/475, and/or the audio data 444/476) of the security event from the security event data 473, which may be recorded by the first A/V recording and communication device 402 or by the first hub device 411, to the client devices 401 associated with one or more of the publicly-accessible security camera devices 433 (e.g., 433A, 433B, 433C, 433D) of the neighborhood security system 424B. Sending the A/V alert 2004 to client devices 401 may allow the users/owners of the client devices 401 to have a chance to witness what security event has happened to the first home 728, and to make informed decisions on what arming actions to take on their respective properties.

In various embodiments of the present disclosure, the backend server 430 may select and transmit the text alert 2002, the A/V alert 2004, and the audio alert 2006, either singly or in any combination thereof, to the client devices 401.

In some of the present embodiments, in addition to, or in lieu of, selecting and transmitting the user alerts (in block B2622 in FIG. 26), the backend server 430 may transmit an automatic arming action 1529 to one or more of the publicly-accessible security camera devices 433 of the neighborhood security system 424B (in block B2620 in FIG. 26).

In FIG. 21, the automatic arming action 1529 may include an activating public-accessible security camera device(s) action 2132. The automatic arming action 1529 may be automatically selected by the backend server 430 based on the security event data 473, 491, 1514, the occupancy data, and/or the arming status of the security systems without requiring input from the users/owners of the security systems, such as the users/owners of the client devices 401.

In various embodiments of the present disclosure, the backend server 430 may transmit the activating publicly-accessible security camera device(s) action 2132 to one or more of the publicly-accessible security camera devices 433 associated with the neighborhood security system 424B. For example, the security event data 473 may indicate that the burglar 740 has broken into the first home 728 and may have a weapon 742. As a result, the automatic arming action 1529 to the neighborhood security system 424B may include the activating publicly-accessible security camera device(s) action 2132 to one or more of the publicly-accessible security camera devices 433A, 433B, 433C, 433D of the neighborhood security system 424B, for example, to record the image data 1517, audio data 1519, and/or motion data 1521, to monitor and track the progress of the security event (e.g., the burglary at the first home 728).

The backend server 430 may also transmit a text alert 2002 to one or more of the client devices 401 associated with the publicly-accessible security camera devices 433, where the text alert 2002 may include one or more public access identifiers associated with the publicly-accessible security camera devices 433, to allow users/owners of the client devices 401 to access the image data 1517, audio data 1519, and/or motion data 1521, recorded/captured by the publicly-accessible security camera devices 433.

In some of the present embodiments, as described above, the backend server 430 may also use the clock data to determine the security event procedure 499 for the neighborhood security system 424B. For example, the security event procedure 499 may be an automatic arming action during a first portion of the day (e.g., 11:00 p.m. to 4:00 a.m.), and/or on one or more certain days of the week (e.g., Saturdays), while the security event procedure 499 may be an arming action request during other portions of the day (e.g., 9:00 a.m. to 4:00 p.m.), and/or on other days of week (e.g., Mondays, Tuesdays, and Wednesdays). For example, as described herein, the user associated with the neighborhood security system 424B may be able to configure the security event procedures 499. In such examples, the user may set schedules (e.g., hourly schedules, daily schedules, weekly schedules, and so on) as part of the security event procedures 499, such that the backend server 430 may first determine the time and/or day using the clock data, and then use the time and/or day when analyzing the security event procedure 499 to determine the arming action 1529 for the neighborhood security system 424B.

As described above, in some of the present embodiments, the clock data may be used along with the proximity information, the threat level, and/or the threat type. For example, the based on the proximity and the time of day, the arming action 1529 may include different types of alerts. In such an example, if the security event is detected by a security system within two-hundred-fifty yards of one or more of the publicly-accessible security camera devices 433, during daytime hours, the users associated with the one or more of the publicly-accessible security camera devices 433 may receive the medium level alarm 2010 or the high level alarm 2012 on their client devices 401, and the one or more of the publicly-accessible security camera devices 433 may automatically arm and provide an audible alert (e.g., a loud siren). If the security event is detected by a security system within two-hundred-fifty yards of one or more of the publicly-accessible security camera devices 433, during evening hours, the users associated with the one or more of the publicly-accessible security camera devices 433 may receive the low level alarm 2008 or medium level alarm 2010 on their client devices 401, and the one or more of the publicly-accessible security camera devices 433 may automatically arm. In another example, if the threat level of the security event is high, and the security event occurs during daytime hours, the users associated with one or more of the publicly-accessible security camera devices 433 may receive the high level alarm 2012 on their client devices 401, and the one or more of the publicly-accessible security camera devices 433 may automatically arm and provide an audible alert (e.g., a loud siren). If the threat level of the security event is high, and the security event occurs during evening hours, the users associated with the one or more of the publicly-accessible security camera devices 433 may receive the low level alarm 2008 or the medium level alarm 2010 on their client devices 401, and the one or more of the publicly-accessible security camera devices 433 may automatically arm.

Many of the descriptions above of the embodiments of the present processes (e.g., FIGS. 18-26) refer to the client device 405. It is to be understood, however, that aspects of any method described herein may be performed by any other client device, such as the client devices 401, 404, 406, 407, either alone or in combination with any other of these devices.

In addition, many of the descriptions above of the embodiments of the present processes (e.g., FIGS. 18-26) refer to one of the first hub device 411, the second hub device 412, or the backend server 430. It is to be understood, however, that aspects of any method described herein may be performed by any of these devices, either alone or in combination with any other of these devices.

As a result of the processes described herein, property owners may be made aware of threats to the security of their homes and/or businesses before the threat enters their property. In addition, the property owners may be able to proactively secure their property using their home security systems to prevent the threat from extending onto their property. Ultimately, the safety and security of individual properties, neighborhoods, towns, and cities may be increased thereby contributing to public safety as a whole.

As discussed above, the present disclosure provides numerous examples of methods and systems including A/V recording and communication doorbells, but the present embodiments are equally applicable for A/V recording and communication devices other than doorbells. For example, the present embodiments may include one or more A/V recording and communication security cameras instead of, or in addition to, one or more A/V recording and communication doorbells. An example A/V recording and communication security camera may include substantially all of the structure and functionality of the doorbell 130 (FIG. 3-4), but without the front button 148, the button actuator, and/or the light pipe 232.

Figure 27:
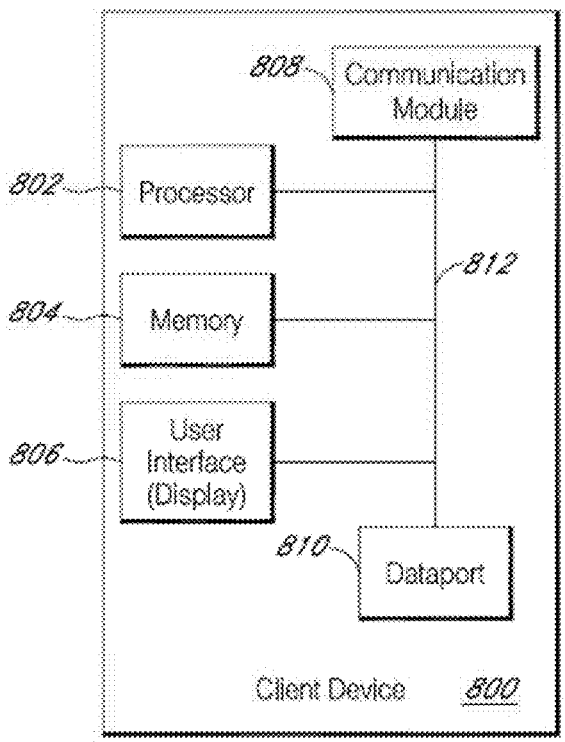
FIG. 27 is a functional block diagram of a client device on which the present embodiments may be implemented according to various aspects of the present disclosure.

FIG. 27 is a functional block diagram of a client device 800 on which the present embodiments may be implemented according to various aspects of the present disclosure. The user's client device 114 described with reference to FIG. 1 may include some or all of the components and/or functionality of the client device 800. The client device 800 may comprise, for example, a smartphone.

With reference to FIG. 27, the client device 800 includes a processor 802, a memory 804, a user interface 806, a communication module 808, and a dataport 810. These components are communicatively coupled together by an interconnect bus 812. The processor 802 may include any processor used in smartphones and/or portable computing devices, such as an ARM processor (a processor based on the RISC (reduced instruction set computer) architecture developed by Advanced RISC Machines (ARM)). In some embodiments, the processor 802 may include one or more other processors, such as one or more conventional microprocessors, and/or one or more supplementary co-processors, such as math co-processors.

The memory 804 may include both operating memory, such as random-access memory (RAM), as well as data storage, such as read-only memory (ROM), hard drives, flash memory, or any other suitable memory/storage element. The memory 804 may include removable memory elements, such as a CompactFlash card, a MultiMediaCard (MMC), and/or a Secure Digital (SD) card. In some embodiments, the memory 804 may comprise a combination of magnetic, optical, and/or semiconductor memory, and may include, for example, RAM, ROM, flash drive, and/or a hard disk or drive. The processor 802 and the memory 804 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 802 may be connected to the memory 804 via the dataport 810.

The user interface 806 may include any user interface or presentation elements suitable for a smartphone and/or a portable computing device, such as a keypad, a display screen, a touchscreen, a microphone, and a speaker. The communication module 808 is configured to handle communication links between the client device 800 and other, external devices or receivers, and to route incoming/outgoing data appropriately. For example, inbound data from the dataport 810 may be routed through the communication module 808 before being directed to the processor 802, and outbound data from the processor 802 may be routed through the communication module 808 before being directed to the dataport 810. The communication module 808 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 810 may be any type of connector used for physically interfacing with a smartphone and/or a portable computing device, such as a mini-USB port or an IPHONER/IPODR 30-pin connector or LIGHTNINGR connector. In other embodiments, the dataport 810 may include multiple communication channels for simultaneous communication with, for example, other processors, servers, and/or client terminals.

The memory 804 may store instructions for communicating with other systems, such as a computer. The memory 804 may store, for example, a program (e.g., computer program code) adapted to direct the processor 802 in accordance with the present embodiments. The instructions also may include program elements, such as an operating system. While execution of sequences of instructions in the program causes the processor 802 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 28:
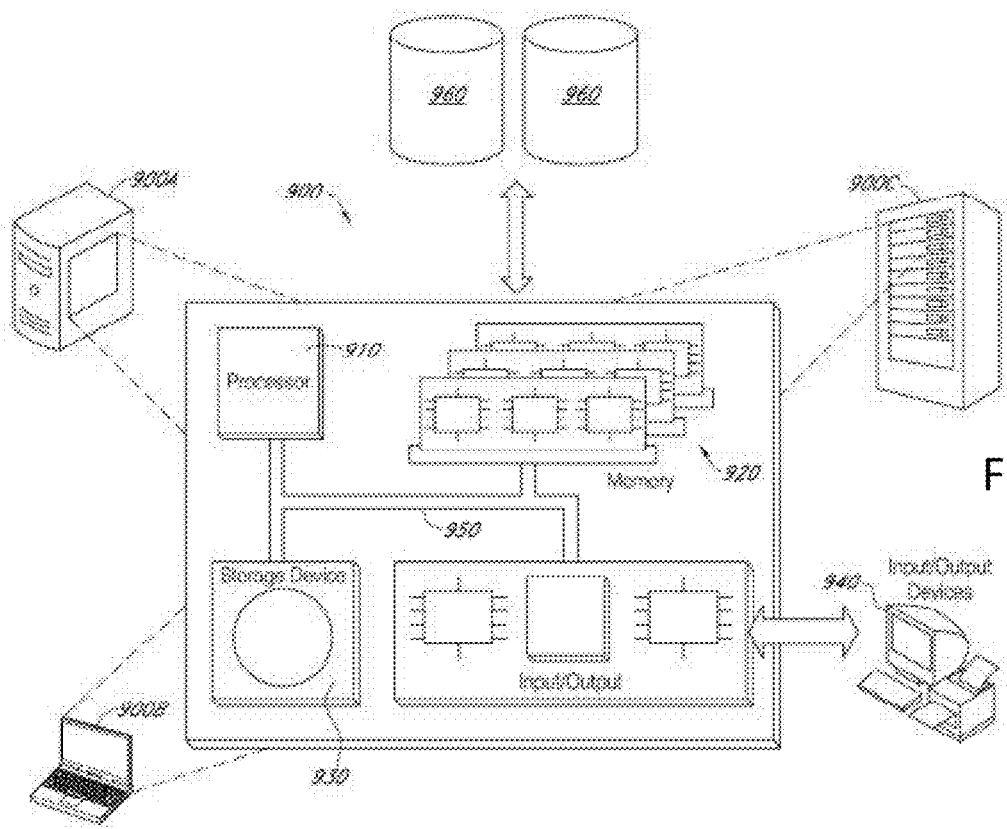
FIG. 28 is a functional block diagram of a general-purpose computing system on which the present embodiments may be implemented according to various aspects of present disclosure.

FIG. 28 is a functional block diagram of a general-purpose computing system on which the present embodiments may be implemented according to various aspects of present disclosure. The computer system 900 may execute at least some of the operations described above. The computer system 900 may be embodied in at least one of a personal computer (also referred to as a desktop computer) 900A, a portable computer (also referred to as a laptop or notebook computer) 900B, and/or a server 900C. A server is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 900 may include at least one processor 910, memory 920, at least one storage device 930, and input/output (I/O) devices 940. Some or all of the components 910, 920, 930, 940 may be interconnected via a system bus 950. The processor 910 may be single- or multi-threaded and may have one or more cores. The processor 910 may execute instructions, such as those stored in the memory 920 and/or in the storage device 930. Information may be received and output using one or more I/O devices 940.

The memory 920 may store information, and may be a computer-readable medium, such as volatile or non-volatile memory. The storage device(s) 930 may provide storage for the system 900, and may be a computer-readable medium. In various aspects, the storage device(s) 930 may be a flash memory device, a hard disk device, an optical disk device, a tape device, or any other type of storage device.

The I/O devices 940 may provide input/output operations for the system 900. The I/O devices 940 may include a keyboard, a pointing device, and/or a microphone. The I/O devices 940 may further include a display unit for displaying graphical user interfaces, a speaker, and/or a printer. External data may be stored in one or more accessible external databases 960.

The present embodiments link together security systems at multiple properties, where each property is protected by a security system and/or an A/V recording and communication device. When a security event (e.g., an intrusion) is detected by a security system and/or an A/V recording and communication device at one of the properties in the network of properties, the present embodiments analyze the location/proximity, time frame, type, and threat level of detected security events, and determine a security event procedure for one or more property owners nearby, who would benefit from the security event procedure to better protect their properties. Such security event procedure (e.g., warnings/alerts/arming action requests) may provide the users with opportunity to take corrective action, such as by arming their own alarm systems, before the potential threat at the nearby property becomes an actual threat at that user's property. As a result, the safety of that user's property is increased, as well as the safety of the other properties in the network, thereby contributing to public safety.

The present embodiments also link together home/private security systems installed on private properties with public security systems installed on public properties, where each public property is protected by a security system and/or an A/V recording and communication device (e.g., a publicly-accessible security camera device). Each of the publicly-accessible security camera devices is configured to provide access to video footage to any member of the public using a public access identifier. When a security event (e.g., an intrusion) is detected by a home/private security system and/or an A/V recording and communication device at one of the private properties in the network of properties, the public security systems installed on public properties may receive notifications to arm (e.g., start recording audio and video) the publicly-accessible security camera devices, and generate an alert when a person of interest (e.g., a fleeing suspect) associated with the security event is detected using, for example, automatic identification and data capture (AIDC). The publicly-accessible security camera devices also enable members of the public to access the video footage (and sensor data, image data, motion data, etc.) recorded by them. By making the video footage recorded by security cameras accessible to any member of the public, the embodiments of the present disclosure improve the functionality of such cameras by expanding the audience for such video footage, thereby increasing the likelihood that perpetrators of crimes caught on video might be recognized by one or more persons viewing the video footage, which may thereby assist law enforcement in identifying and apprehending such perpetrators.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random-access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

Example Clauses

In a first aspect, a method for a security network including a first security system installed at a first location and a second security system installed at a second location is provided, the method comprising in response to a security event detected at the first location by the first security system, receiving security event data from the first security system; analyzing the security event data from the first security system to determine at least one of: a proximity of the first security system to the second security system; a time frame in which the security event happened; a threat level of the security event; and a type of the security event; determining a security event procedure for the second security system based on analyzing the security event data from the first security system; wherein the security event procedure includes at least one of the following: selecting a user alert from a plurality of user alerts, and transmitting the selected user alert to a client device associated with the second security system; and transmitting an automatic arming action to the second security system.

In an embodiment of the first aspect, the selected user alert includes an arming action request to prompt a user of the client device to arm the second security system.

In another embodiment of the first aspect, the automatic arming action includes activating one or more camera devices at the second location.

In another embodiment of the first aspect, the second security system includes a plurality of publicly-accessible security camera devices.

In another embodiment of the first aspect, the automatic arming action includes activating at least one of the plurality of publicly-accessible security camera devices at the second location.

In another embodiment of the first aspect, determining the threat level of the security event includes at least one of image analysis of image data and computer vision analysis of video data captured by one or more camera devices at the first location.

In another embodiment of the first aspect, determining the type of the security event includes at least one of image analysis of image data and computer vision analysis of video data captured by one or more camera devices at the first location.

In another embodiment of the first aspect, determining the proximity of the first security system to the second security system includes determining a distance between the first location and the second location.

In another embodiment of the first aspect, determining the time frame in which the security event happened includes determining whether the security event happened during daytime or nighttime hours.

In another embodiment of the first aspect, determining the threat level of the security event includes determining whether the security network recognizes one or more people who triggered the security event detected by the first security system.

In another embodiment of the first aspect, the determining the type of the security event includes determining what sensors of the first security system were triggered during the security event.

In another embodiment of the first aspect, the user alert is transmitted to the client device by a backend device.

In another embodiment of the first aspect, the backend device is a server.

In another embodiment of the first aspect, the security event data includes at least one of motion data generated by a motion sensor of the first security system, image data generated by a camera of the first security system, and sensor data generated by a sensor of the first security system.

In another embodiment of the first aspect, the sensor includes at least one of a door sensor, a window sensor, a flood sensor, a glass break sensor, a contact sensor, a temperature sensor, a smoke detector, a carbon monoxide detector, and a lock/unlock sensor.

In another embodiment of the first aspect, the automatic arming action includes one of activating an armed stay mode, activating an armed away mode, and activating a custom arming mode of the second security system.

In another embodiment of the first aspect, the automatic arming action further includes activating at least one audio/video (A/V) recording and communication device located at the second location.

In another embodiment of the first aspect, the at least one A/V recording and communication device includes at least one of a video doorbell, an outdoor security camera, an indoor security camera, a floodlight security camera, and a spotlight security camera.

In another embodiment of the first aspect, the automatic arming action further includes activating at least one automation device located at the second location.

In another embodiment of the first aspect, the at least one automation device includes one of an indoor lighting system, an outdoor lighting system, a temperature control system, a shade/blinds control system, and an entertainment system.

In a second aspect, a network device configured to be communicatively coupled to a first security system installed at a first location and a second security system installed at a second location is provided, the network device comprising: a communication module; one or more processors; and a non-transitory machine-readable memory storing a program, the program executable by at least one of the one or more processors, the program comprising sets of instructions for: in response to a security event detected at the first location by the first security system, receiving security event data from the first security system; analyzing the security event data from the first security system to determine at least one of: a proximity of the first security system to the second security system; a time frame in which the security event happened; a threat level of the security event; and a type of the security event; determining a security event procedure for the second security system based on analyzing the security event data from the first security system; wherein the security event procedure includes at least one of the following: selecting a user alert from a plurality of user alerts, and transmitting the selected user alert to a client device associated with the second security system; and transmitting an automatic arming action to the second security system.

In an embodiment of the second aspect, the selected user alert includes an arming action request to prompt a user of the client device to arm the second security system.

In another embodiment of the second aspect, the automatic arming action includes activating one or more camera devices at the second location.

In another embodiment of the second aspect, the second security system includes a plurality of publicly-accessible security camera devices.

In another embodiment of the second aspect, the automatic arming action includes activating at least one of the plurality of publicly-accessible security camera devices at the second location.

In another embodiment of the second aspect, determining the threat level of the security event includes at least one of image analysis of image data and computer vision analysis of video data captured by one or more camera devices at the first location.

In another embodiment of the second aspect, determining the type of the security event includes at least one of image analysis of image data and computer vision analysis of video data captured by one or more camera devices at the first location.

In another embodiment of the second aspect, determining the proximity of the first security system to the second security system includes determining a distance between the first location and the second location.

In another embodiment of the second aspect, determining the time frame in which the security event happened includes determining whether the security event happened during daytime or nighttime hours.

In another embodiment of the second aspect, determining the threat level of the security event includes determining whether the security network recognizes one or more people who triggered the security event detected by the first security system.

In another embodiment of the second aspect, determining the type of the security event includes determining what sensors of the first security system were triggered during the security event.

In another embodiment of the second aspect, the network device is a backend device.

In another embodiment of the second aspect, the backend device is a server.

In another embodiment of the second aspect, the security event data includes at least one of motion data generated by a motion sensor of the first security system, image data generated by a camera of the first security system, and sensor data generated by a sensor of the first security system.

In another embodiment of the second aspect, the sensor includes at least one of a door sensor, a window sensor, a flood sensor, a glass break sensor, a contact sensor, a temperature sensor, a smoke detector, a carbon monoxide detector, and a lock/unlock sensor.

In another embodiment of the second aspect, the automatic arming action includes one of activating an armed stay mode, activating an armed away mode, and activating a custom arming mode of the first security system.

In another embodiment of the second aspect, the automatic arming action further includes activating at least one audio/video (A/V) recording and communication device located at the first location.

In another embodiment of the second aspect, the at least one A/V recording and communication device includes at least one of a video doorbell, an outdoor security camera, an indoor security camera, a floodlight security camera, and a spotlight security camera.

In another embodiment of the second aspect, the automatic arming action further includes activating at least one automation device located at the first location.

In another embodiment of the second aspect, the at least one automation device includes one of an indoor lighting system, an outdoor lighting system, a temperature control system, a shade/blinds control system, and an entertainment system.

In a third aspect, a method for a security network including a first security system installed at a first location and a second security system installed at a second location is provided, the method comprising: receiving security event data from the first security system; analyzing the security event data from the first security system; determining a security event procedure for the second security system, based on analyzing the security event data from the first security system.

In an embodiment of the third aspect, analyzing the security event data includes determining a distance between the first location and the second location to determine a proximity of the first security system to the second security system.

In another embodiment of the third aspect, analyzing the security event data includes determining whether the security event happened during daytime or nighttime hours to determine a time frame of the security event.

In another embodiment of the third aspect, analyzing the security event data includes determining a threat level of the security event by determining whether the security network recognizes one or more people who triggered the security event detected by the first security system.

In another embodiment of the third aspect, determining the threat level of the security event includes at least one of image analysis of image data and computer vision analysis of video data captured by one or more camera devices at the first location.

In another embodiment of the third aspect, analyzing the security event data includes determining what sensors of the first security system were triggered during the security event to determine the type of the security event.

In another embodiment of the third aspect, determining the type of the security event includes at least one of image analysis of image data and computer vision analysis of video data captured by one or more camera devices at the first location.

In another embodiment of the third aspect, the security event procedure comprises at least one of the following: selecting a user alert from a plurality of user alerts, and transmitting the selected user alert to a client device associated with the second security system; and transmitting an automatic arming action to the second security system.

In another embodiment of the third aspect, the selected user alert includes an arming action request to prompt a user of the client device to arm the second security system.

In another embodiment of the third aspect, the automatic arming action includes activating one or more camera devices at the second location.

In another embodiment of the third aspect, the second security system includes a plurality of publicly-accessible security camera devices.

In another embodiment of the third aspect, the automatic arming action includes activating at least one of the plurality of publicly-accessible security camera devices at the second location.

In another embodiment of the third aspect, the user alert is transmitted to the client device by a backend device.

In another embodiment of the third aspect, the backend device is a server.

In another embodiment of the third aspect, the security event data includes at least one of motion data generated by a motion sensor of the first security system, image data generated by a camera of the first security system, and sensor data generated by a sensor of the first security system.

In another embodiment of the third aspect, the sensor includes at least one of a door sensor, a window sensor, a flood sensor, a glass break sensor, a contact sensor, a temperature sensor, a smoke detector, a carbon monoxide detector, and a lock/unlock sensor.

In another embodiment of the third aspect, the automatic arming action includes one of activating an armed stay mode, activating an armed away mode, and activating a custom arming mode of the first security system.

In another embodiment of the third aspect, the at least one A/V recording and communication device includes at least one of a video doorbell, an outdoor security camera, an indoor security camera, a floodlight security camera, and a spotlight security camera.

In another embodiment of the third aspect, the automatic arming action further includes activating at least one automation device located at the first location.

In another embodiment of the third aspect, the at least one automation device includes one of an indoor lighting system, an outdoor lighting system, a temperature control system, a shade/blinds control system, and an entertainment system.

In a fourth aspect, a network device configured to be communicatively coupled to a first security system installed at a first location and a second security system installed at a second location is provided, the network device comprising: a communication module; one or more processors; and a non-transitory machine-readable memory storing a program, the program executable by at least one of the one or more processors, the program comprising sets of instructions for: receiving security event data from the first security system; analyzing the security event data from the first security system; determining a security event procedure for the second security system, based on analyzing the security event data from the first security system.

In an embodiment of the fourth aspect, analyzing the security event data includes determining a distance between the first location and the second location to determine a proximity of the first security system to the second security system.

In another embodiment of the fourth aspect, analyzing the security event data includes determining whether the security event happened during daytime or nighttime hours to determine a time frame of the security event.

In another embodiment of the fourth aspect, analyzing the security event data includes determining a threat level of the security event by determining whether the security network recognizes one or more people who triggered the security event detected by the first security system.

In another embodiment of the fourth aspect, determining the threat level of the security event includes at least one of image analysis of image data and computer vision analysis of video data captured by one or more camera devices at the first location.

In another embodiment of the fourth aspect, analyzing the security event data includes determining what sensors of the first security system were triggered during the security event to determine the type of the security event.

In another embodiment of the fourth aspect, determining the type of the security event includes at least one of image analysis of image data and computer vision analysis of video data captured by one or more camera devices at the first location.

In another embodiment of the fourth aspect, the security event procedure comprises at least one of the following: selecting a user alert from a plurality of user alerts, and transmitting the selected user alert to a client device associated with the second security system; and transmitting an automatic arming action to the second security system.

In another embodiment of the fourth aspect, the selected user alert includes an arming action request to prompt a user of the client device to arm the second security system.

In another embodiment of the fourth aspect, the automatic arming action includes activating one or more camera devices at the second location.

In another embodiment of the fourth aspect, the second security system includes a plurality of publicly-accessible security camera devices.

In another embodiment of the fourth aspect, the automatic arming action includes activating at least one of the plurality of publicly-accessible security camera devices at the second location.

In another embodiment of the fourth aspect, the user alert is transmitted to the client device by a backend device.

In another embodiment of the fourth aspect, the backend device is a server.

In another embodiment of the fourth aspect, the security event data includes at least one of motion data generated by a motion sensor of the first security system, image data generated by a camera of the first security system, and sensor data generated by a sensor of the first security system.

In another embodiment of the fourth aspect, the sensor includes at least one of a door sensor, a window sensor, a flood sensor, a glass break sensor, a contact sensor, a temperature sensor, a smoke detector, a carbon monoxide detector, and a lock/unlock sensor.

In another embodiment of the fourth aspect, the automatic arming action includes one of activating an armed stay mode, activating an armed away mode, and activating a custom arming mode of the first security system.

In another embodiment of the fourth aspect, the at least one A/V recording and communication device includes at least one of a video doorbell, an outdoor security camera, an indoor security camera, a floodlight security camera, and a spotlight security camera.

In another embodiment of the fourth aspect, the automatic arming action further includes activating at least one automation device located at the first location.

In another embodiment of the fourth aspect, the at least one automation device includes one of an indoor lighting system, an outdoor lighting system, a temperature control system, a shade/blinds control system, and an entertainment system.

In a fifth aspect, a method for a security network including a security system installed at a first location and a publicly-accessible security camera device installed at a second location is provided, the method comprising: in response to a security event detected at the first location by the security system, receiving security event data from the security system; analyzing the security event data from the security system to determine at least one of: a proximity of the security system to the publicly-accessible security camera device; a time frame in which the security event happened; a threat level of the security event; and a type of the security event; determining a security event procedure for the publicly-accessible security camera device based on analyzing the security event data from the security system; wherein the security event procedure includes at least one of the following: transmitting a user alert to a client device associated with the publicly-accessible security camera device; and transmitting an automatic arming action to the publicly-accessible security camera device.

In an embodiment of the fifth aspect, the automatic arming action includes activating a camera of the publicly-accessible security camera device.

In another embodiment of the fifth aspect, when the camera is activated, the publicly-accessible security camera device is configured to generate an alert when a person of interest associated with the security event is detected using automatic identification and data capture (AIDC).

In another embodiment of the fifth aspect, the publicly-accessible security camera device includes a public access identifier for enabling members of the public to access, using a client device, image data recorded by a camera of the publicly-accessible security camera device and transmitted to a backend server.

In another embodiment of the fifth aspect, determining the proximity of the security system to the publicly-accessible security camera device includes determining a distance between the first location and the second location.

In another embodiment of the fifth aspect, determining the time frame in which the security event happened includes determining whether the security event happened during daytime or nighttime hours.

In another embodiment of the fifth aspect, determining the threat level of the security event includes determining whether the security network recognizes one or more people who triggered the security event detected by the security system.

In another embodiment of the fifth aspect, analyzing the security event data includes determining what sensors of the security system were triggered during the security event to determine the type of the security event.

In another embodiment of the fifth aspect, determining the threat level of the security event and the type of the security event includes at least one of image analysis of image data and computer vision analysis of video data captured by one or more camera devices at the first location.

In another embodiment of the fifth aspect, determining the type of the security event includes at least one of image analysis of image data and computer vision analysis of video data captured by one or more camera devices at the first location.

In another embodiment of the fifth aspect, the user alert is transmitted to the client device by a backend device.

In another embodiment of the fifth aspect, the backend device is a server.

In another embodiment of the fifth aspect, the security event data includes at least one of motion data generated by a motion sensor of the security system, image data generated by a camera of the security system, and sensor data generated by a sensor of the security system.

In another embodiment of the fifth aspect, the sensor includes at least one of a door sensor, a window sensor, a flood sensor, a glass break sensor, a contact sensor, a temperature sensor, a smoke detector, a carbon monoxide detector, and a lock/unlock sensor.

In another embodiment of the fifth aspect, the publicly-accessible security camera device includes at least one of a video doorbell, an outdoor security camera, an indoor security camera, a floodlight security camera, and a spotlight security camera.

In a sixth aspect, a network device configured to be communicatively coupled to a first security system installed at a first location and a second security system installed at a second location is provided, the network device comprising: a communication module; one or more processors; and a non-transitory machine-readable memory storing a program, the program executable by at least one of the one or more processors, the program comprising sets of instructions for: in response to a security event detected at the first location by the security system, receiving security event data from the security system; analyzing the security event data from the security system to determine at least one of: a proximity of the security system to the publicly-accessible security camera device; a time frame in which the security event happened; a threat level of the security event; and a type of the security event; determining a security event procedure for the publicly-accessible security camera device based on analyzing the security event data from the security system; wherein the security event procedure includes at least one of the following: transmitting a user alert to a client device associated with the publicly-accessible security camera device; and transmitting an automatic arming action to the publicly-accessible security camera device.

In an embodiment of the sixth aspect, the automatic arming action includes activating a camera of the publicly-accessible security camera device.

In another embodiment of the sixth aspect, when the camera is activated, the publicly-accessible security camera device is configured to generate an alert when a person of interest associated with the security event is detected using automatic identification and data capture (AIDC).

In another embodiment of the sixth aspect, the publicly-accessible security camera device includes a public access identifier for enabling members of the public to access, using a client device, image data recorded by a camera of the publicly-accessible security camera device and transmitted to a backend server.

In another embodiment of the sixth aspect, determining the proximity of the security system to the publicly-accessible security camera device includes determining a distance between the first location and the second location.

In another embodiment of the sixth aspect, determining the time frame in which the security event happened includes determining whether the security event happened during daytime or nighttime hours.

In another embodiment of the sixth aspect, determining the threat level of the security event includes determining whether the security network recognizes one or more people who triggered the security event detected by the security system.

In another embodiment of the sixth aspect, analyzing the security event data includes determining what sensors of the security system were triggered during the security event to determine the type of the security event.

In another embodiment of the sixth aspect, determining the threat level of the security event and the type of the security event includes at least one of image analysis of image data and computer vision analysis of video data captured by one or more camera devices at the first location.

In another embodiment of the sixth aspect, determining the type of the security event includes at least one of image analysis of image data and computer vision analysis of video data captured by one or more camera devices at the first location.

In another embodiment of the sixth aspect, the user alert is transmitted to the client device by a backend device.

In another embodiment of the sixth aspect, the backend device is a server.

In another embodiment of the sixth aspect, the security event data includes at least one of motion data generated by a motion sensor of the security system, image data generated by a camera of the security system, and sensor data generated by a sensor of the security system.

In another embodiment of the sixth aspect, the sensor includes at least one of a door sensor, a window sensor, a flood sensor, a glass break sensor, a contact sensor, a temperature sensor, a smoke detector, a carbon monoxide detector, and a lock/unlock sensor.

In another embodiment of the sixth aspect, the publicly-accessible security camera device includes at least one of a video doorbell, an outdoor security camera, an indoor security camera, a floodlight security camera, and a spotlight security camera.

In a seventh aspect, a method for a security network including a security system installed at a first location and a publicly-accessible security camera device installed at a second location is provided, the method comprising: receiving security event data from the security system; analyzing the security event data from the security system; and determining a security event procedure for the publicly-accessible security camera device, based on analyzing the security event data from the security system.

In an embodiment of the seventh aspect, analyzing the security event data includes determining a distance between the first location and the second location to determine a proximity of the security system to the publicly-accessible security camera device.

In another embodiment of the seventh aspect, analyzing the security event data includes determining whether the security event happened during daytime or nighttime hours to determine a time frame of the security event.

In another embodiment of the seventh aspect, analyzing the security event data includes determining a threat level of the security event by determining whether the security network recognizes one or more people who triggered the security event detected by the security system.

In another embodiment of the seventh aspect, determining the threat level of the security event and the type of the security event includes at least one of image analysis of image data and computer vision analysis of video data captured by one or more camera devices at the first location.

In another embodiment of the seventh aspect, analyzing the security event data includes determining what sensors of the security system were triggered during the security event to determine the type of the security event.

In another embodiment of the seventh aspect, determining the type of the security event includes at least one of image analysis of image data and computer vision analysis of video data captured by one or more camera devices at the first location.

In another embodiment of the seventh aspect, the security event procedure comprises at least one of the following: transmitting a user alert to a client device associated with the publicly-accessible security camera device; and transmitting an automatic arming action to the publicly-accessible security camera device.

In another embodiment of the seventh aspect, the user alert includes an arming action request to prompt a user of the client device to arm the publicly-accessible security camera system.

In another embodiment of the seventh aspect, the automatic arming action includes activating a camera of the publicly-accessible security camera device.

In another embodiment of the seventh aspect, when the camera is activated, the publicly-accessible security camera device is configured to generate an alert when a person of interest associated with the security event is detected using automatic identification and data capture (AIDC).

In another embodiment of the seventh aspect, the publicly-accessible security camera device includes a public access identifier for enabling members of the public to access, using a client device, image data recorded by a camera of the publicly-accessible security camera device and transmitted to a backend server.

In another embodiment of the seventh aspect, the user alert is transmitted to the client device by a backend device.

In another embodiment of the seventh aspect, the backend device is a server.

In another embodiment of the seventh aspect, the security event data includes at least one of motion data generated by a motion sensor of the security system, image data generated by a camera of the security system, and sensor data generated by a sensor of the security system.

In another embodiment of the seventh aspect, the sensor includes at least one of a door sensor, a window sensor, a flood sensor, a glass break sensor, a contact sensor, a temperature sensor, a smoke detector, a carbon monoxide detector, and a lock/unlock sensor.

In another embodiment of the seventh aspect, the publicly-accessible security camera device includes at least one of a video doorbell, an outdoor security camera, an indoor security camera, a floodlight security camera, and a spotlight security camera.

In an eighth aspect, a network device configured to be communicatively coupled to a first security system installed at a first location and a second security system installed at a second location is provided, the network device comprising: a communication module; one or more processors; and a non-transitory machine-readable memory storing a program, the program executable by at least one of the one or more processors, the program comprising sets of instructions for: receiving security event data from the security system; analyzing the security event data from the security system; and determining a security event procedure for the publicly-accessible security camera device, based on analyzing the security event data from the security system.

In an embodiment of the eighth aspect, analyzing the security event data includes determining a distance between the first location and the second location to determine a proximity of the security system to the publicly-accessible security camera device.

In another embodiment of the eighth aspect, analyzing the security event data includes determining whether the security event happened during daytime or nighttime hours to determine a time frame of the security event.

In another embodiment of the eighth aspect, analyzing the security event data includes determining a threat level of the security event by determining whether the security network recognizes one or more people who triggered the security event detected by the security system.

In another embodiment of the eighth aspect, determining the threat level of the security event and the type of the security event includes at least one of image analysis of image data and computer vision analysis of video data captured by one or more camera devices at the first location.

In another embodiment of the eighth aspect, analyzing the security event data includes determining what sensors of the security system were triggered during the security event to determine the type of the security event.

In another embodiment of the eighth aspect, determining the type of the security event includes at least one of image analysis of image data and computer vision analysis of video data captured by one or more camera devices at the first location.

In another embodiment of the eighth aspect, the security event procedure comprises at least one of the following: transmitting a user alert to a client device associated with the publicly-accessible security camera device; and transmitting an automatic arming action to the publicly-accessible security camera device.

In another embodiment of the eighth aspect, the user alert includes an arming action request to prompt a user of the client device to arm the publicly-accessible security camera system.

In another embodiment of the eighth aspect, the automatic arming action includes activating a camera of the publicly-accessible security camera device.

In another embodiment of the eighth aspect, when the camera is activated, the publicly-accessible security camera device is configured to generate an alert when a person of interest associated with the security event is detected using automatic identification and data capture (AIDC).

In another embodiment of the eighth aspect, the publicly-accessible security camera device includes a public access identifier for enabling members of the public to access, using a client device, image data recorded by a camera of the publicly-accessible security camera device and transmitted to a backend server.

In another embodiment of the eighth aspect, the user alert is transmitted to the client device by a backend device.

In another embodiment of the eighth aspect, the backend device is a server.

In another embodiment of the eighth aspect, the security event data includes at least one of motion data generated by a motion sensor of the security system, image data generated by a camera of the security system, and sensor data generated by a sensor of the security system.

In another embodiment of the eighth aspect, the sensor includes at least one of a door sensor, a window sensor, a flood sensor, a glass break sensor, a contact sensor, a temperature sensor, a smoke detector, a carbon monoxide detector, and a lock/unlock sensor.

In another embodiment of the eighth aspect, the publicly-accessible security camera device includes at least one of a video doorbell, an outdoor security camera, an indoor security camera, a floodlight security camera, and a spotlight security camera.

What is claimed is:

1. A method comprising:
    storing first data associated with a first security system, the first data indicating:
        a first procedure associated with a first time period, the first procedure including at least sending a request when a security event is detected by one or more security systems,
        a second procedure associated with a second time period, the second procedure including at least operating the first security system in a first mode when a security event is detected by one or more security systems, and
        one or more types of security events;
    receiving second data generated by a second security system, the second data indicating that the second security system detected a first security event;
    determining that the second security system is associated with a first location;
    determining that a second location associated with the first security system is near the first location;
    determining that a first security event type associated with the first security event matches one of the one or more types of security events;
    determining a user device associated with the first security system;
    determining a first time associated with the first security event;
    determining that the first time corresponds to the first time period;
    sending, to the user device, information associated with the security event;
    based at least in part on the determining that the first time corresponds to the first time period and on the determining that the first security event type associated with the first security event matches one of the one or more types of security events, sending, to the user device, a request to operate the first security system in the first mode;
    receiving, from the user device, an indication to operate the first security system in the first mode; and
    sending third data that causes the first security system to operate in the first mode.

2. A method comprising:
    receiving first data associated with a first security system, the first data indicating a first proximity region associated with the first security system;
    receiving second data associated with the first security system, the second data indicating a procedure to perform when a first event is detected by one or more security systems within the first proximity region;
    storing region data indicating a plurality of proximity regions, each proximity region being associated with a respective security system, the plurality of proximity regions including the first proximity region associated with the first security system;
    storing procedure data indicating the procedure to perform when the first event is detected within the first proximity region;
    receiving third data associated with a second security system;
    determining, based at least in part on the third data, that the second security system detected the first event;
    determining that the second security system is associated with a first location;
    determining one or more proximity regions of the plurality of proximity regions that the first location is located within, the one or more proximity regions including the first proximity region; and
    based at least in part on the determining of the one or more proximity regions and on the procedure data, sending fourth data that causes the first security system to operate in a first mode.

3. The method of claim 2, further comprising:
    determining that the first security system is associated with a user device;
    sending, to the user device, a request to operate the first security system in the first mode; and
    receiving, from the user device, an indication to operate the first security system in the first mode,
    wherein the sending of the fourth data is further based at least in part on the receiving of the indication.

4. The method of claim 2, further comprising at least one of:
    determining, using the third data, a time frame of the first event; or
    determining, using the third data, a threat level associated with the first event.

5. The method of claim 2, wherein the receiving of the third data comprises receiving at least one of:
    sensor data generated by a sensor associated with the second security system;
    image data generated by an electronic device associated with the second security system; or
    security system data indicating that an alarm associated with the second security system has been activated.

6. A system comprising:
    one or more processors; and
    one or more computer-readable media storing instructions that, when executed by the one or more processors, cause the system to perform operations comprising:
        receiving first data associated with a first security system, the first data representing settings indicating a procedure to perform when an event is detected by one or more security systems;

receiving second data associated with a second security system;

determining, based at least in part on the second data, that the second security system detected the event;

determining a threat level associated with the event;

determining that the second security system is associated with a first location;

determining a region around the first location, a size of the region around the first location being dependent upon the threat level and the settings;

determining that a second location associated with the first security system is within the region;

based at least in part on the determining that the second location is within the region, determining that the second security system is operating in a first mode; and based at least in part on the procedure, sending, to a user device associated with the first security system, a request to operate the first security system in a second mode.

7. The method of claim 2, further comprising:
determining that a property associated with the second location is unoccupied,
wherein the sending of the fourth data is further based at least in part on the determining that the property is unoccupied.

8. The method of claim 2, further comprising:
receiving fifth data associated with the second security system;
determining, based at least in part on the fifth data, that the second security system detected a second event;
determining a first type associated with the second event;
determining, based on the first type, a second proximity region associated with a third security system;
determining that the first location is located within the second proximity region; and
based at least in part on the determining that the first location is located within the second proximity region, sending sixth data that causes the third security system to operate in the first mode.

9. The method of claim 2, further comprising:
determining a type associated with the first event; and
determining, based at least in part on the type, a threat level associated with the first event,
wherein the determining of the first proximity region is based at least in part on the threat level.

10. The method of claim 2, further comprising:
storing fifth data that associates a type with a size; and
determining that the first event is associated with the type,
wherein the determining of the first region around the first location is further determined based on the fifth data.

11. The method of claim 2, further comprising:
storing fifth data that associates a threat level with a size;
determining a type associated with the first event; and
determining a threat level associated with the first event;
wherein the size is determined using the fifth data.

12. The method of claim 2, wherein the sending of the fourth data comprises sending the third data that causes the first security system to operate in at least one of:
a disarmed mode;
an away mode;
a home mode; or
a vacation mode.

13. The method of claim 2, further comprising:
determining that the second security system is operating in a second mode,
wherein the sending of the fourth data is further based at least in part on the determining that the second security system is operating in the second mode.

14. The system of claim 6, wherein:
the first mode of the first security system is associated with disarming one or more sensors of the first security system; and
the second mode of the first security system is associated with arming the one or more sensors.

15. The method of claim 2, wherein:
the procedure is to be performed when the first security system is operating in a second mode; and
the method further comprises determining that the first security system is operating in the second mode.

16. The method of claim 2, wherein:
the procedure includes sending a request when the first event is detected by the one or more security systems;
the method further comprises:
sending, to a user device, the request to operate the first security system in the first mode; and
receiving, from the user device, an indication to operate the first security system in the first mode; and
the sending of the fourth data is further based at least in part on the receiving of the indication.

17. The method of claim 2, wherein:
the first data represents that the procedure is to be performed when the first event is detected by the one or more security systems located within the first region; and
determining the first region around the first location is based at least in part on the first data.

18. The method of claim 9, wherein the type associated with the first event is determined based on information about at least one sensor of the second security system triggered during the first event.

19. The method of claim 9, wherein the information associated with the security event is sent to the user device upon determining that one or more user settings associated with the user device indicate to send notifications in relation to security events of the type.

20. The system of claim 6, wherein the second data comprises sensor data generated by a sensor associated with the second security system.

21. The system of claim 6, wherein the second data comprises image data generated by an electronic device associated with the second security system.

22. The system of claim 6, wherein the second data comprises security system data indicating that an alarm associated with the second security system has been activated.

23. The system of claim 6, wherein the one or more computer-readable media store instructions that, when executed by the one or more processors, cause the system to perform operations comprising determining a type associated with the event, wherein the determining of the threat level is based on the type.

24. The method of claim 1, wherein notification settings are received from the user device associated with the first security system.

25. The method of claim 1, wherein the determining that a second location associated with the first security system is near the first location is based on determining a first proximity region around the first location, and determining that the second location is within the first proximity region.

26. The method of claim 1, wherein the determining that a second location associated with the first security system is near the first location is based on determining a first proximity region.

27. The method of claim 1, wherein the determining that a second location associated with the first security system is near the first location is based on determining a first distance between the first location and the second location and comparing the first distance to a threshold.

28. The method of claim 2, wherein a size of the first proximity region is based on proximity region settings stored in relation to the first security system.

* * * * *